(12) United States Patent  (10) Patent No.: US 8,781,965 B2
Huster  (45) Date of Patent: Jul. 15, 2014

(54) ELECTRONIC COMMERCE SYSTEM

(71) Applicant: Phyllis A. Huster, Seattle, WA (US)

(72) Inventor: Phyllis A. Huster, Seattle, WA (US)

( * ) Notice: Subject to any disclaimer, the term of this patent is extended or adjusted under 35 U.S.C. 154(b) by 0 days.

(21) Appl. No.: 13/650,033

(22) Filed: Oct. 11, 2012

(65) Prior Publication Data

US 2013/0091058 A1  Apr. 11, 2013

Related U.S. Application Data

(60) Provisional application No. 61/545,801, filed on Oct. 11, 2011.

(51) Int. Cl.
*G06Q 40/00* (2012.01)

(52) U.S. Cl.
USPC .......................................................... 705/44

(58) Field of Classification Search
USPC ...................................................... 705/35–45
See application file for complete search history.

(56) References Cited

U.S. PATENT DOCUMENTS

| | | | | |
|---|---|---|---|---|
| 6,948,656 | B2 * | 9/2005 | Williams | 235/380 |
| 7,330,871 | B2 * | 2/2008 | Barber | 709/201 |
| 7,669,759 | B1 * | 3/2010 | Zettner | 235/380 |
| 7,669,760 | B1 * | 3/2010 | Zettner | 235/382 |
| 7,810,729 | B2 | 10/2010 | Morley, Jr. | |
| 7,819,322 | B2 * | 10/2010 | Hammad et al. | 235/449 |
| 8,185,443 | B2 * | 5/2012 | Marcus | 705/26.1 |
| 8,255,303 | B2 * | 8/2012 | Scipioni | 705/35 |
| 8,489,506 | B2 * | 7/2013 | Hammad et al. | 705/44 |
| 2002/0130176 | A1 * | 9/2002 | Suzuki | 235/380 |
| 2003/0135463 | A1 * | 7/2003 | Brown et al. | 705/44 |
| 2003/0182194 | A1 * | 9/2003 | Choey et al. | 705/16 |
| 2005/0165684 | A1 * | 7/2005 | Jensen et al. | 705/44 |
| 2006/0085333 | A1 * | 4/2006 | Wah et al. | 705/40 |
| 2006/0089906 | A1 * | 4/2006 | Rowley | 705/40 |
| 2007/0034682 | A1 * | 2/2007 | Williams | 235/379 |
| 2007/0084913 | A1 * | 4/2007 | Weston | 235/380 |
| 2007/0267479 | A1 * | 11/2007 | Nix et al. | 235/379 |
| 2008/0048025 | A1 * | 2/2008 | Fitzgerald et al. | 235/380 |
| 2008/0162347 | A1 | 7/2008 | Wagner | |
| 2009/0112768 | A1 * | 4/2009 | Hammad et al. | 705/44 |
| 2010/0106620 | A1 * | 4/2010 | Marcus | 705/27 |
| 2010/0262506 | A1 * | 10/2010 | Zargahi et al. | 705/26 |

(Continued)

OTHER PUBLICATIONS

Angwin, Julia; Valentino-DeVries, Jennifer, "What They Know: A Wall Street Journal Investigation: Race is on to 'Fingerprint' Phones, PCs", Wall Street Journal, Eastern Edition [New York, N.Y], Dec. 1, 2010, p. A.1.*

(Continued)

*Primary Examiner* — Mohammad Z Shaikh
(74) *Attorney, Agent, or Firm* — Lori Gordon; Michelle Zhang

(57) ABSTRACT

Embodiments of the present invention provide methods, systems, and computer readable storage media to facilitate a transaction in an electronic commerce system. Aspects of the embodiments include receiving a request at a network-connected transaction server to transfer one or more transaction items involving a first user account on the transaction server, selecting a delivery instrument from one or more available delivery instruments associated with the first user account on the transaction server, authorizing the request based at least upon a unique transaction identifier associated with the request and a unique user device identifier associated with a user access device, transferring a quantity of the one or more transaction items into or out of the selected delivery instrument, wherein the quantity is determined at least based upon the authorized request.

34 Claims, 83 Drawing Sheets

(56) References Cited

U.S. PATENT DOCUMENTS

| | | | |
|---|---|---|---|
| 2011/0004526 A1* | 1/2011 | Hammad et al. | 705/16 |
| 2011/0022484 A1* | 1/2011 | Smith et al. | 705/17 |
| 2011/0047075 A1* | 2/2011 | Fourez | 705/44 |
| 2011/0099200 A1* | 4/2011 | Blount et al. | 707/770 |
| 2011/0251892 A1* | 10/2011 | Laracey | 705/14.51 |
| 2011/0258049 A1* | 10/2011 | Ramer et al. | 705/14.66 |
| 2012/0055983 A1* | 3/2012 | Wellborn et al. | 235/375 |
| 2012/0209730 A1* | 8/2012 | Garrett | 705/15 |
| 2012/0221463 A1* | 8/2012 | Nuzzi | 705/39 |
| 2012/0290376 A1* | 11/2012 | Dryer et al. | 705/14.23 |

OTHER PUBLICATIONS

Fest, Glen, "Authentication: Can Your Protect Me Now?"; Calling audibles on mobile multi-factor ID, Bank Technology News 20.10 (Oct. 2007), p. 1.*

"Chipotle Ordering By Chipotle Mexican Grill," iTunes Preview, iTunes.com, as published on Jan. 8, 2011 at http://itunes.apple.com/us/app/chipotle-ordering/id327228455?mt=8, accessed via Wayback Machine Internet Archive—web.archive.org on Jun. 11, 2013.

"Grameen Bank—Bank for the poor—Home," copyright Grameen Communications 1998, accessed at http://www.grameen-info.org/ on Jun. 10, 2013.

"Kiva Cards," Kiva Organization, Kiva.org, as published on Oct. 20, 2011 at http://www.kiva.org/gifts/kiva-cards, accessed via Wayback Machine Internet Archive—web.archive.org on Jun. 11, 2013.

"Mobile Applications," Starbucks Coffee Company, www.starbucks.com, as published on Apr. 1, 2011 at http://www.starbucks.com/coffeehouse/mobile-apps, accessed via Wayback Machine Internet Archive—web.archive.org on Jun. 11, 2013.

Heim, Anna, "PayPal set to suspend domestic transactions in Argentina," The Next Web, nextweb.com, published Sep. 13, 2012, accessed at http://thenextweb.com/la/2012/09/13/paypal-set-suspend-domestic-transactions-argentina/ on Jun. 10, 2013.

Oliverez-Giles, Nathan, "Isis Mobile-Payment Service Delayed," Wired.com, published Sep. 14, 2012, accessed at http://www.wired.com/gadgetlab/2012/09/isis-mobile-payments-launch-delayed-att-t-mobile-verizon on Jun. 10, 2013.

Sterling, Greg, "Placecast Launches Geo-SMS 'ShopAlerts'," Opus Research, published Feb. 25, 2010, accessed at http://www.internet2go.net/news/ad-networks/placecast-launches-geo-tri on Jun. 10, 2013.

* cited by examiner

FIG. 31E

Sensing Zone Router Configuration

Administration | Access Rights | AAA Servers | Authentication | Add or Modify

These screens let you add or modify administration authentication servers.

Figure 9-9 Administration | Access Rights | AAA Servers | Add or Modify Screens

Configure and add a administrator authentication server

Sensing Zone Server [Sensing.deblume.com] — *Geofence boundary server*

Authentication Server  Ditnum.deblume.com   Enter IP address or hostname.

Server Port   0        Enter the server TCP port number (0 for default).

Timeout       4        Enter the timeout for this server (seconds).

Retries       2        Enter the number of retries for this server.

Server Secret          Enter the server secret.

Verify                 Re-enter the server secret.

Add   Cancel

Geofence Boundary Table
http://sensing.deblume.com

FIG. 31G

| | Sensing Zone Key SZKey | A Coordinate | B Coordinate | C Coordinate | D Coordinate | Status |
|---|---|---|---|---|---|---|
| Merchant #1 | 1 | Long x, lat y | Long x, lat y | Long x, lat y | Long x, lat y | Active |
| Merchant #2 | 2 | Long x, lat y | Long x, lat y | Long x, lat y | Long x, lat y | Inactive |
| Merchant #3 | 3 | Long x, lat y | Long x, lat y | Long x, lat y | Long x, lat y | Active |

Access Approve / Deny @ Router Based on Geofence Table

| # | Time | Source | Destination | Ditnum | Status | SZKey(Status) |
|---|---|---|---|---|---|---|
| 705 | 17:35:23 | ip1 | ip2 | ### | Approve | 1(active) |
| 706 | 17:35:24 | ip3 | ip4 | ### | Deny | 2(Inactive) |
| 707 | 17:35:24 | ip5 | ip6 | ### | Approve | 3(active) |
| 708 | 17:35:25 | ip5 | ip8 | | Approve | 3(active) |
| 709 | 17:35:26 | ip7 | ip9 | ### | Approve | 3(active) |

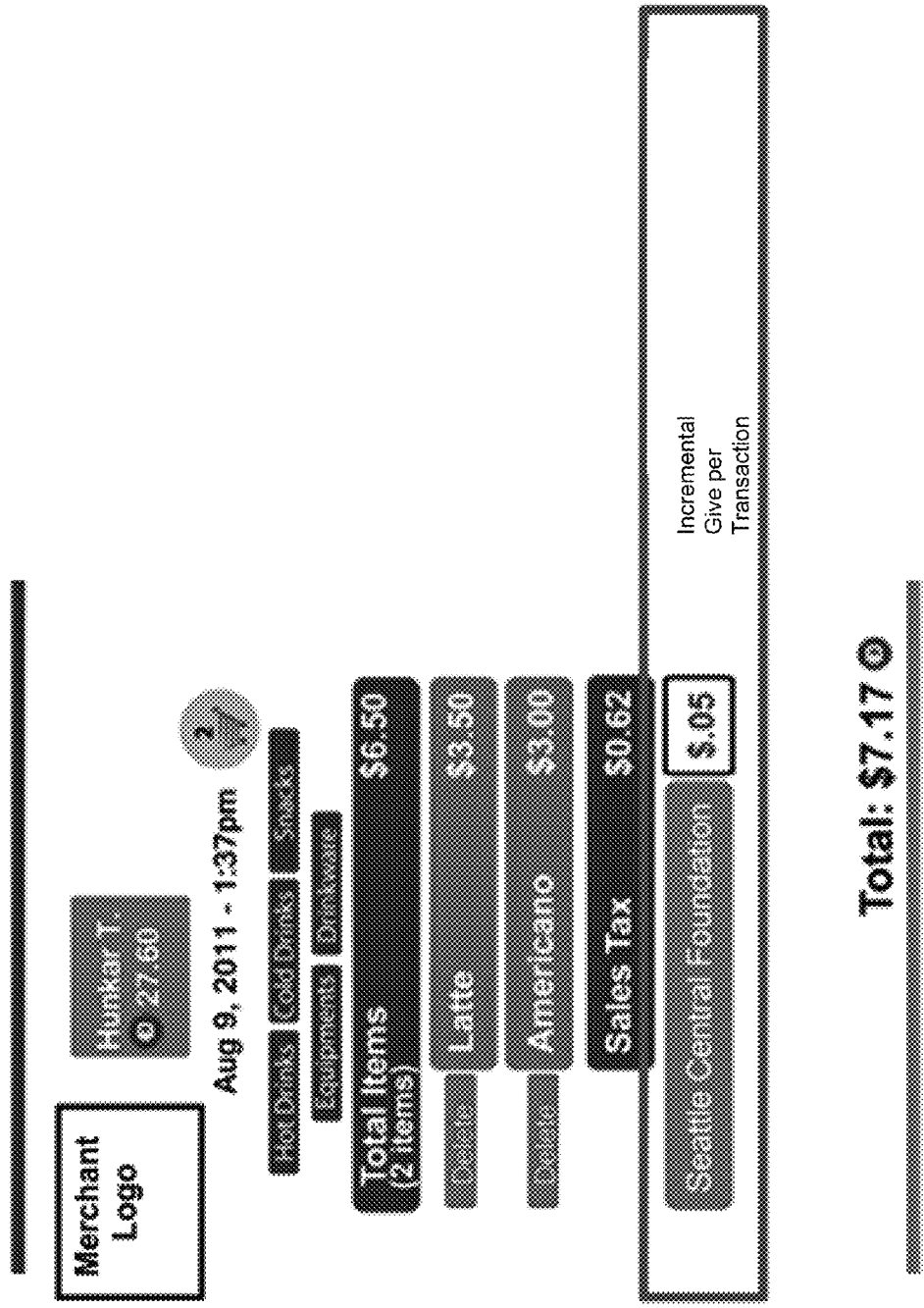

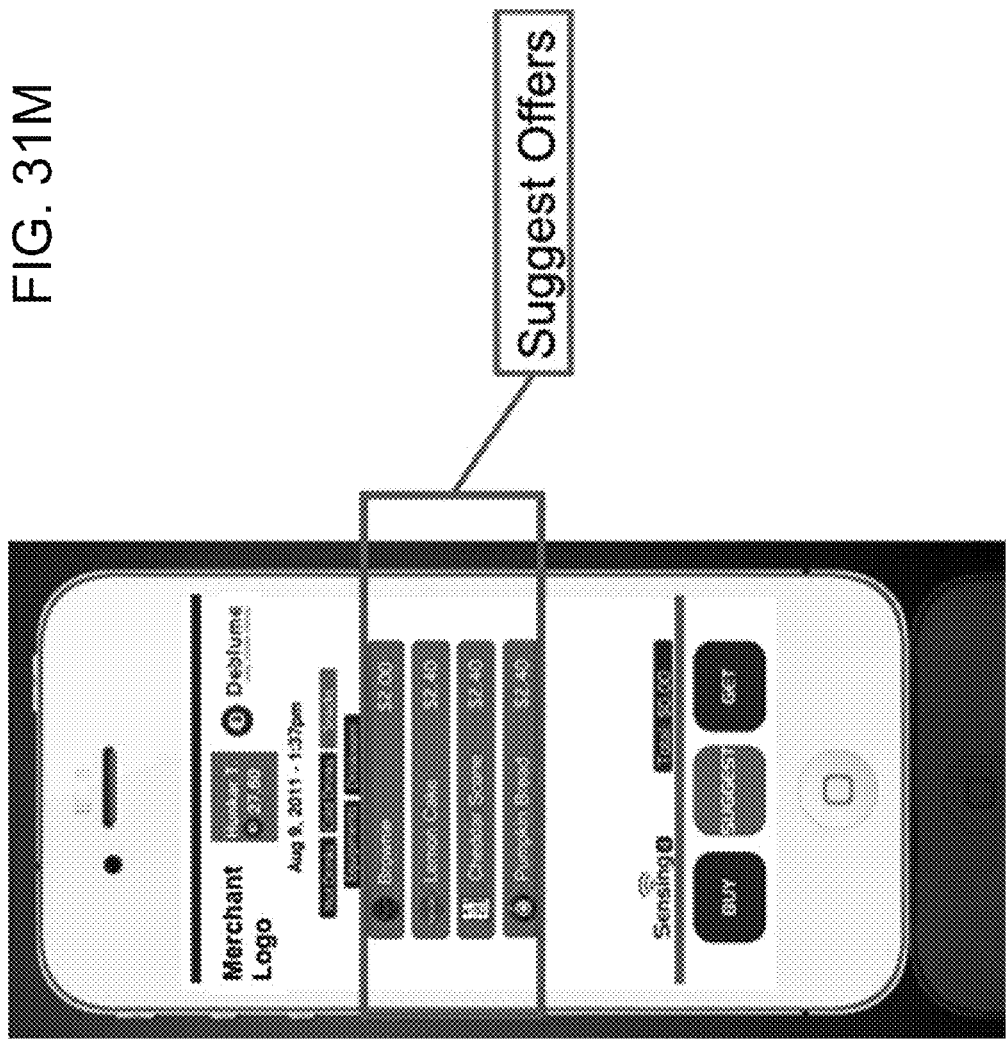

Grocery Store Withdrawal

Toll Road

Tolling Interface Choices Screen
Smartphone Example

Tolling-Non Smartphone USSD
Interactive Menu Sample

Tolling SMS Text Message Sample

Enrollment Options, Non – Smartphone

Enrolling Financial Instrument (Payment) Options

Enrollment Options, Smartphone

Enrolling Financial Instrument (Payment) Options

1. Secure Web Page by 3rd party secure vendor
2. Foto- take a photo of your credit/debit card or check
3. Speech IVR, 800# call providing way for user to speak their data
4. SMS or Text message Pure Web Version - 2 Payment instruments within 1 account

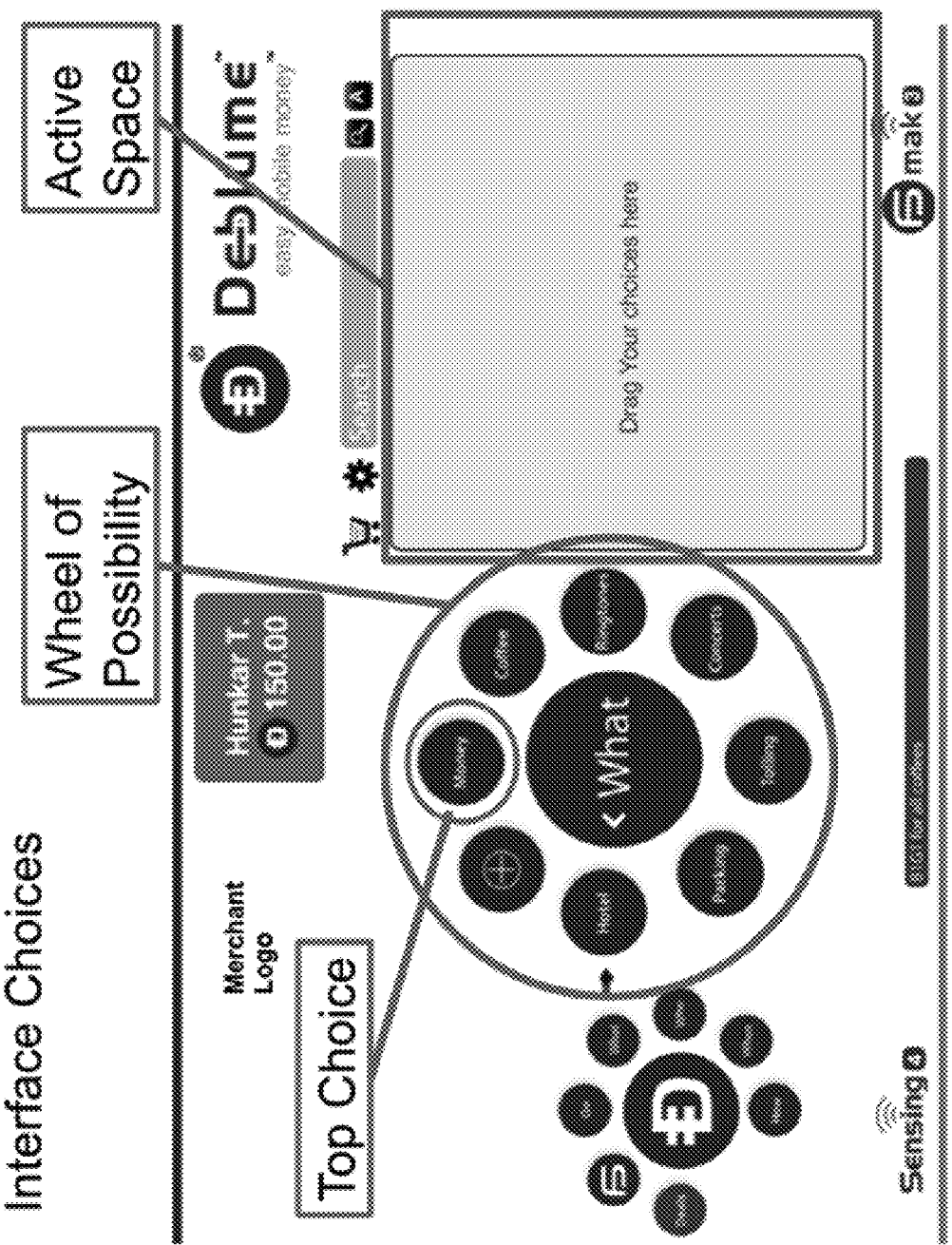
FIG. 34B – Wheel of Possibility & Active Space Interface Choices

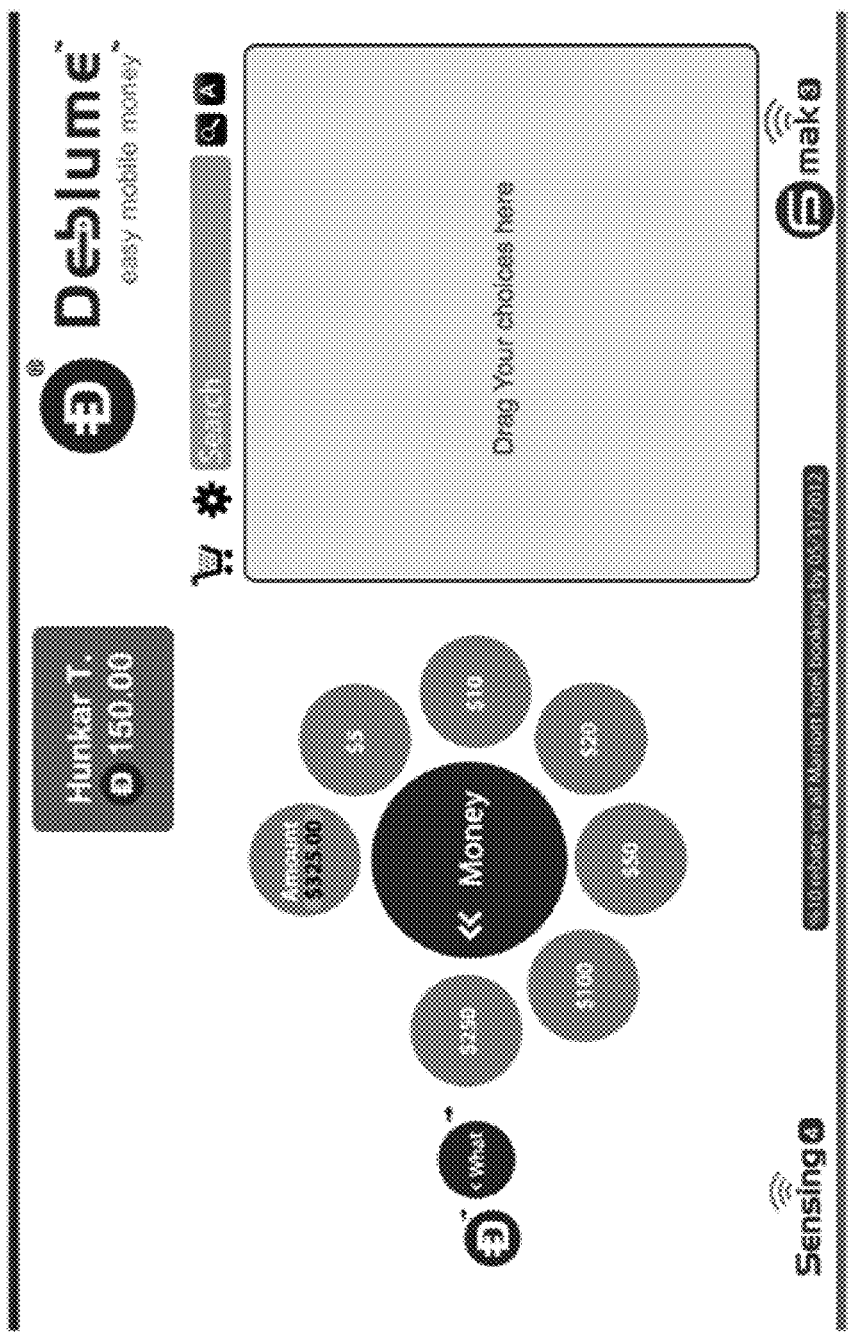
FIG. 34C – Money Choices

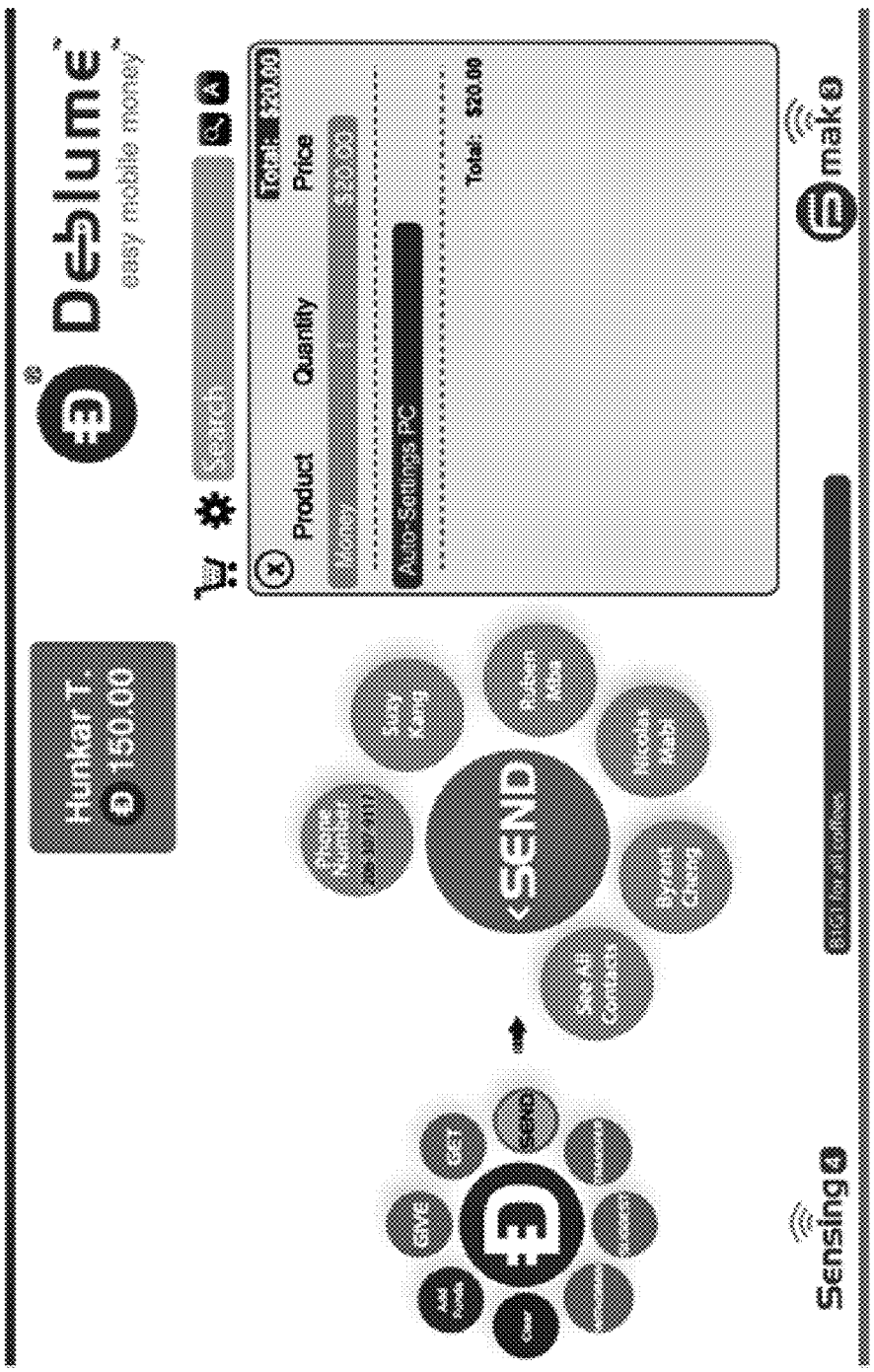
FIG. 34D – Transaction Action = Send

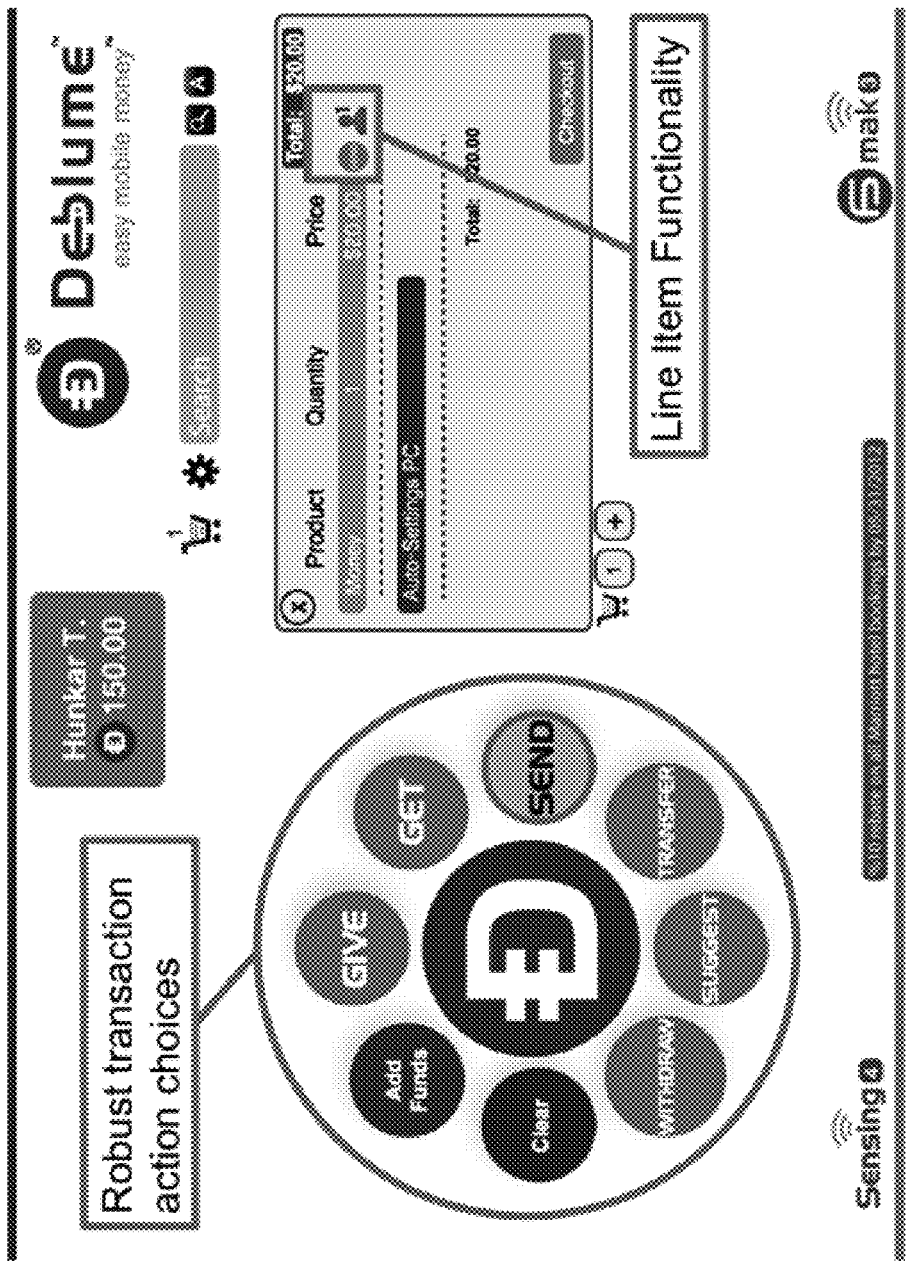
FIG. 34E – Transaction Action Choices

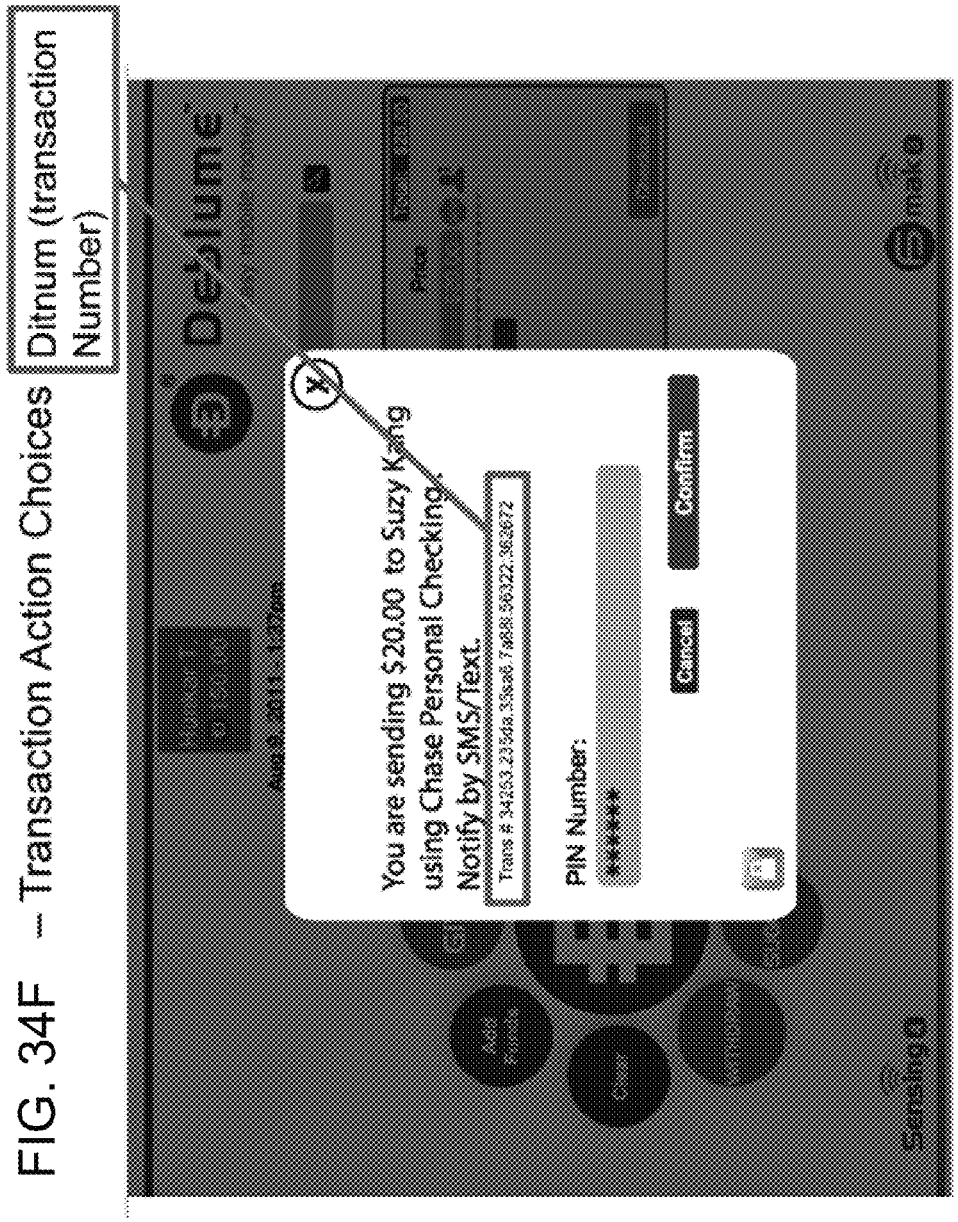
FIG. 34F – Transaction Action Choices

Gas Station

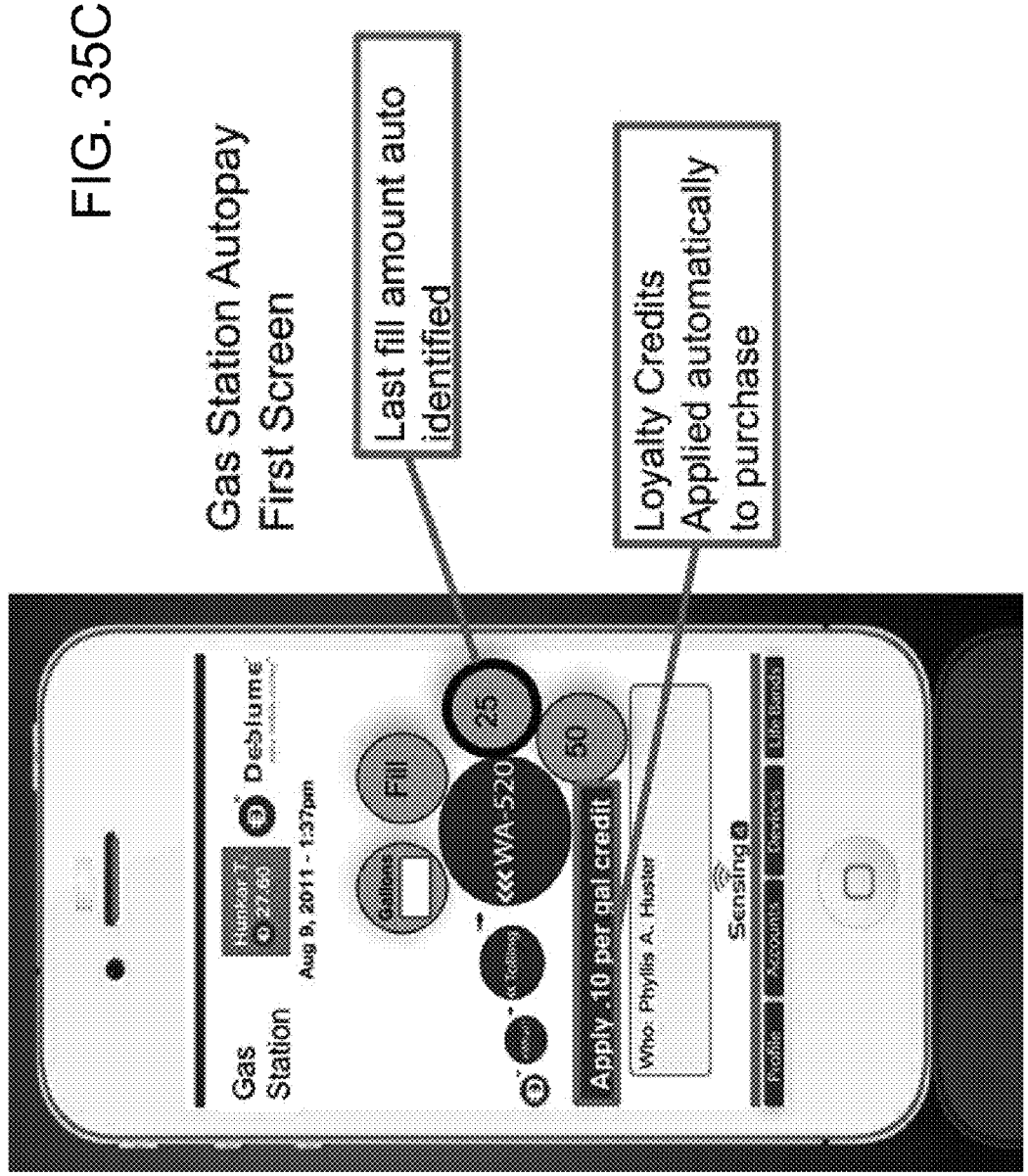

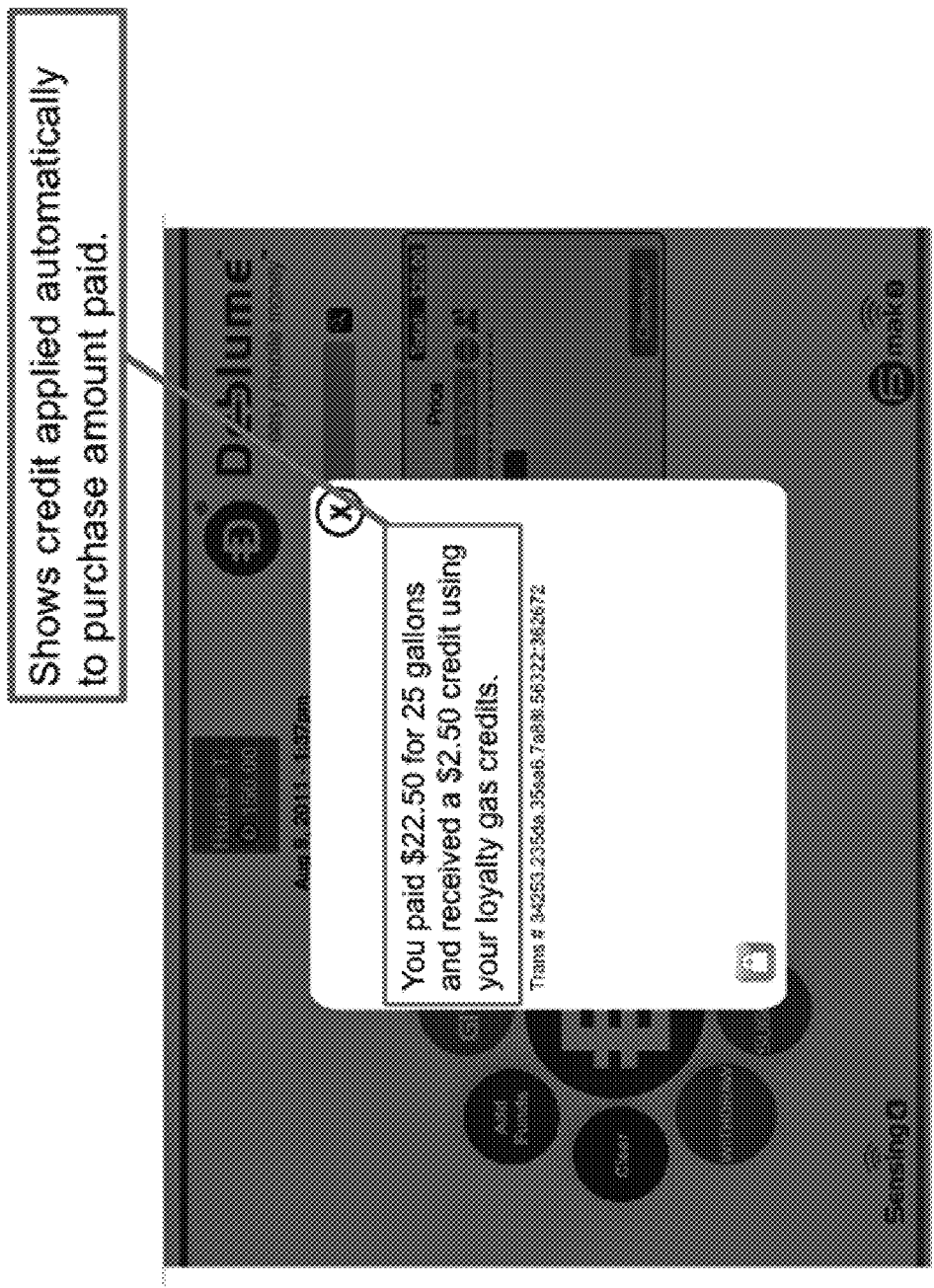
FIG. 35D – Transaction Notify With Loyalty

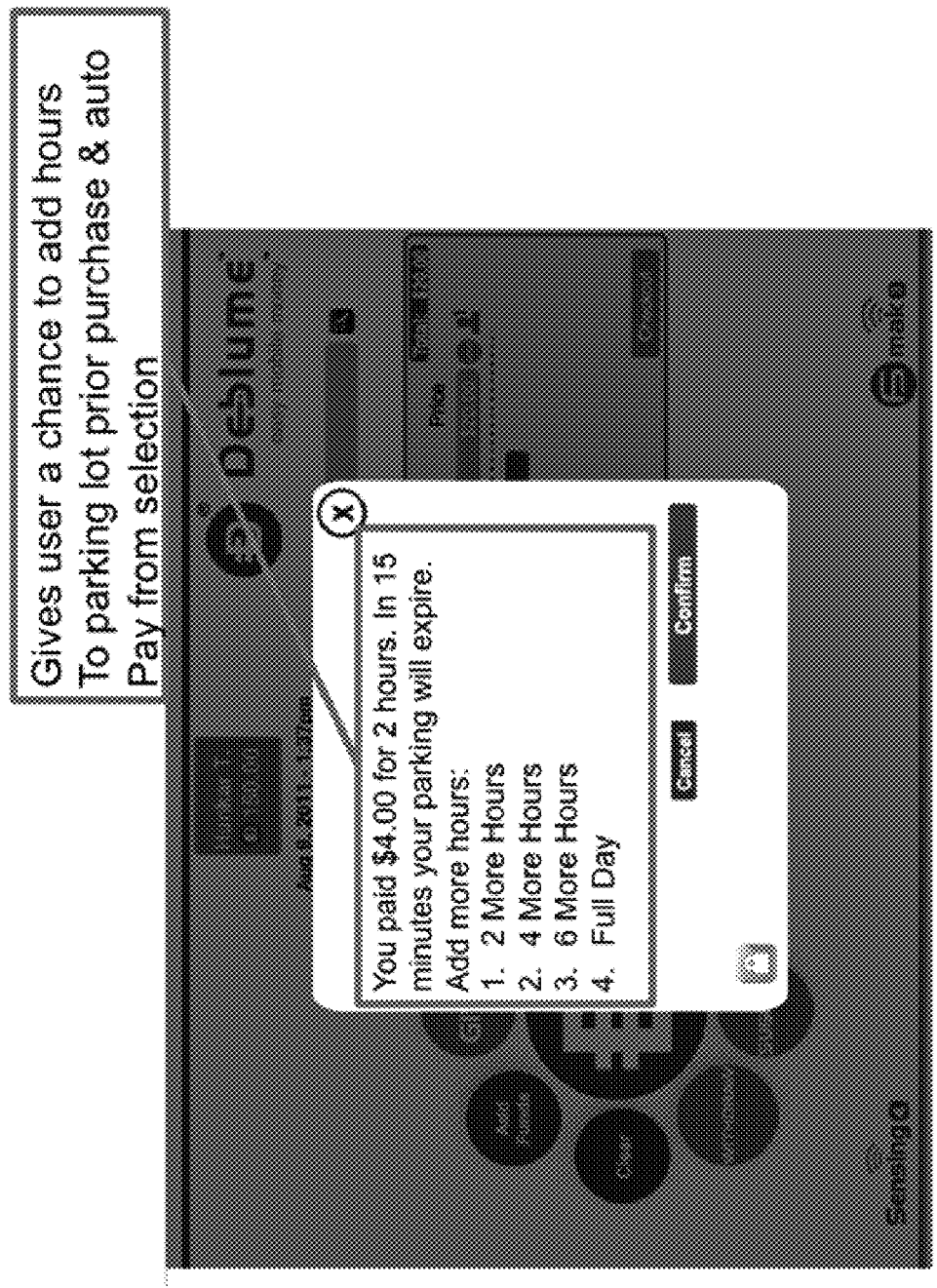
FIG. 36B – Parking Lot Expired Parking Hours Notification

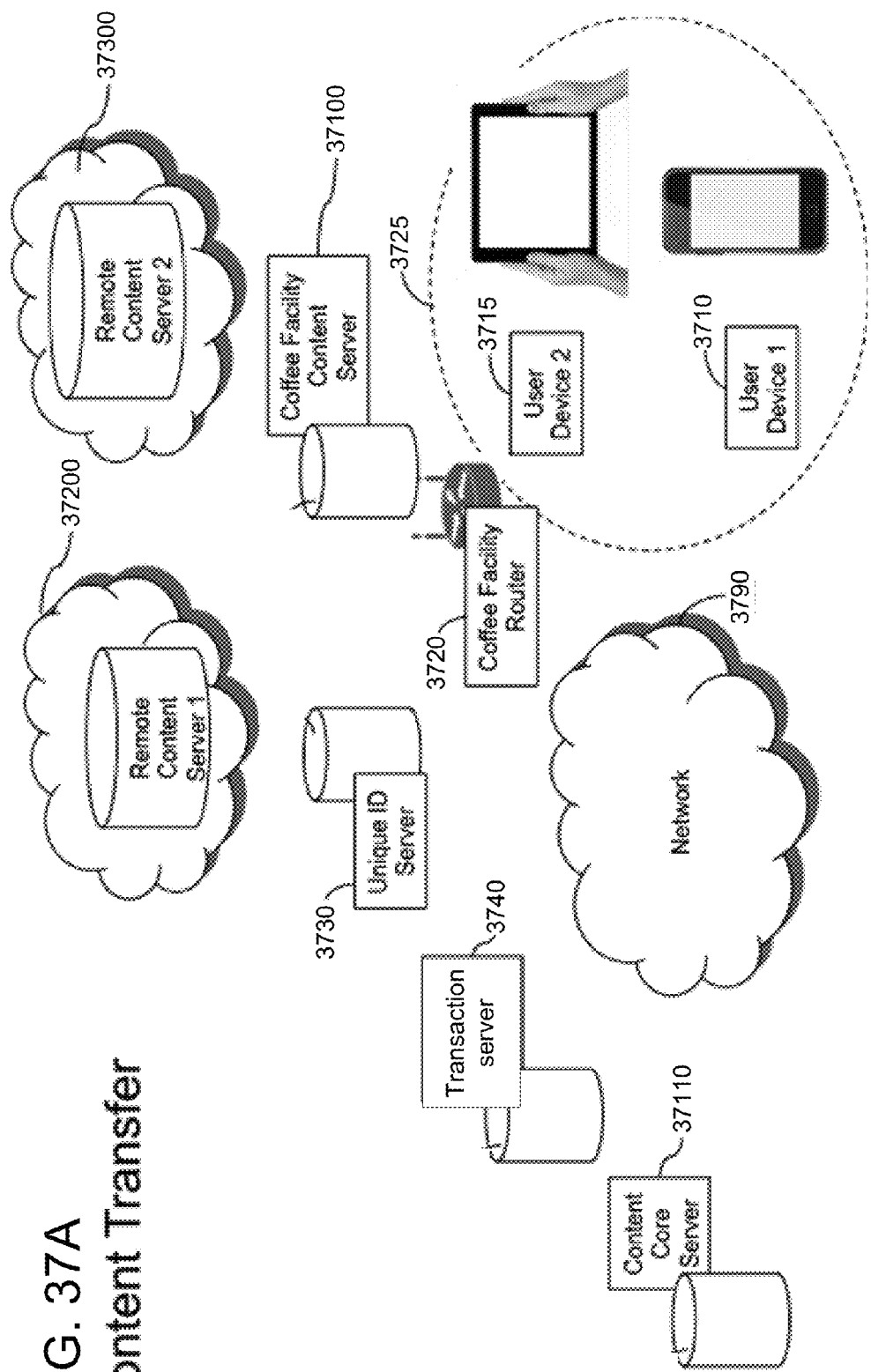

Auto Content Purchase & Auto Download

ELECTRONIC COMMERCE SYSTEM

CROSS REFERENCE TO RELATED APPLICATIONS

This application claims the benefit under 35 U.S.C. §119(e) of U.S. Provisional Appl. No. 61/545,801, filed Oct. 11, 2011, which is hereby incorporated by reference in its entirety.

BACKGROUND OF THE INVENTION

1. Field of the Invention

The present invention relates generally to processing electronic commerce transactions.

2. Background Art

Current electronic commerce systems often lack in user-friendliness, security, and merchant-friendly features. Problems include slow navigation, dissimilar web and mobile interfaces, requiring users to download applications, requiring every user of the system to have an account on the electronic commerce system and a bank account, lack of support for in-store product sales, limited withdrawal and deposit options, limited access device options for users, use of email accounts for verifying account creation, and each user being required to create and manage separate online bank accounts and investment accounts for each financial entity with whom she has accounts.

In conventional electronic commerce systems, users are often required to traverse a complex web of pull-down menus and page navigations to enroll and then interact with the commerce system. A series of complex menus would slow user interaction. It is also frequently required that the user downloads an application to the user access device for the specific purpose of interacting with the electronic commerce system. Having a user install an application for each merchant or other entity with whom the user wants to transact with is cumbersome and may discourage user participation in such electronic commerce systems.

Moreover, by requiring that any merchant who receives payments from the electronic commerce system maintains an account in the transaction server, conventional electronic commerce systems discourage many merchants from participating in the system. Other impediments to merchant participation in these conventional systems include that lack of support for existing point of sale (POS) devices, disallowing users to transfer funds directly to merchants, and the like.

Additionally, conventional venue-based mobile electronic commerce systems suffer from imprecise location and boundary detection, limited range, and lack of on device enablers for venue-based applications. These weaknesses, among others, of the conventional systems hamper the growth of mobile electronic commerce systems.

Thus, with conventional electronic commerce systems, there are no perceivable cost or speed differentiators for merchants to use such commerce options versus credit cards, and no current systems promise mass consumer mobile commerce adoption. Moreover, for users or consumers, the conventional electronic commerce systems do not offer compelling advantages over conventional interactions with the web sites of each individual merchant. Thus, it is desired to have electronic commerce systems that address at least the above noted shortcomings of the conventional electronic commerce systems.

BRIEF SUMMARY OF THE INVENTION

Embodiments of the present invention provide for methods, systems, and computer readable storage media to facilitate a transaction in an electronic commerce system. Aspects of the embodiments include receiving a request at a network-connected transaction server to transfer one or more transaction items involving a first user account on the transaction server, selecting a delivery instrument from one or more available delivery instruments associated with the first user account on the transaction server, authorizing the request based at least upon a unique transaction identifier associated with the request and a unique user device identifier associated with a user access device, transferring a quantity of the one or more transaction items into or out of the selected delivery instrument, wherein the quantity is determined at least based upon the authorized request.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

FIGS. 1A-B illustrate example electronic commerce environments, in accordance with some embodiments of the present invention.

FIGS. 2A-B illustrate example transaction servers, in accordance with some embodiments of the present invention.

FIGS. 29A-D illustrates example transaction dashboards, in accordance with an embodiment.

Figure 30:
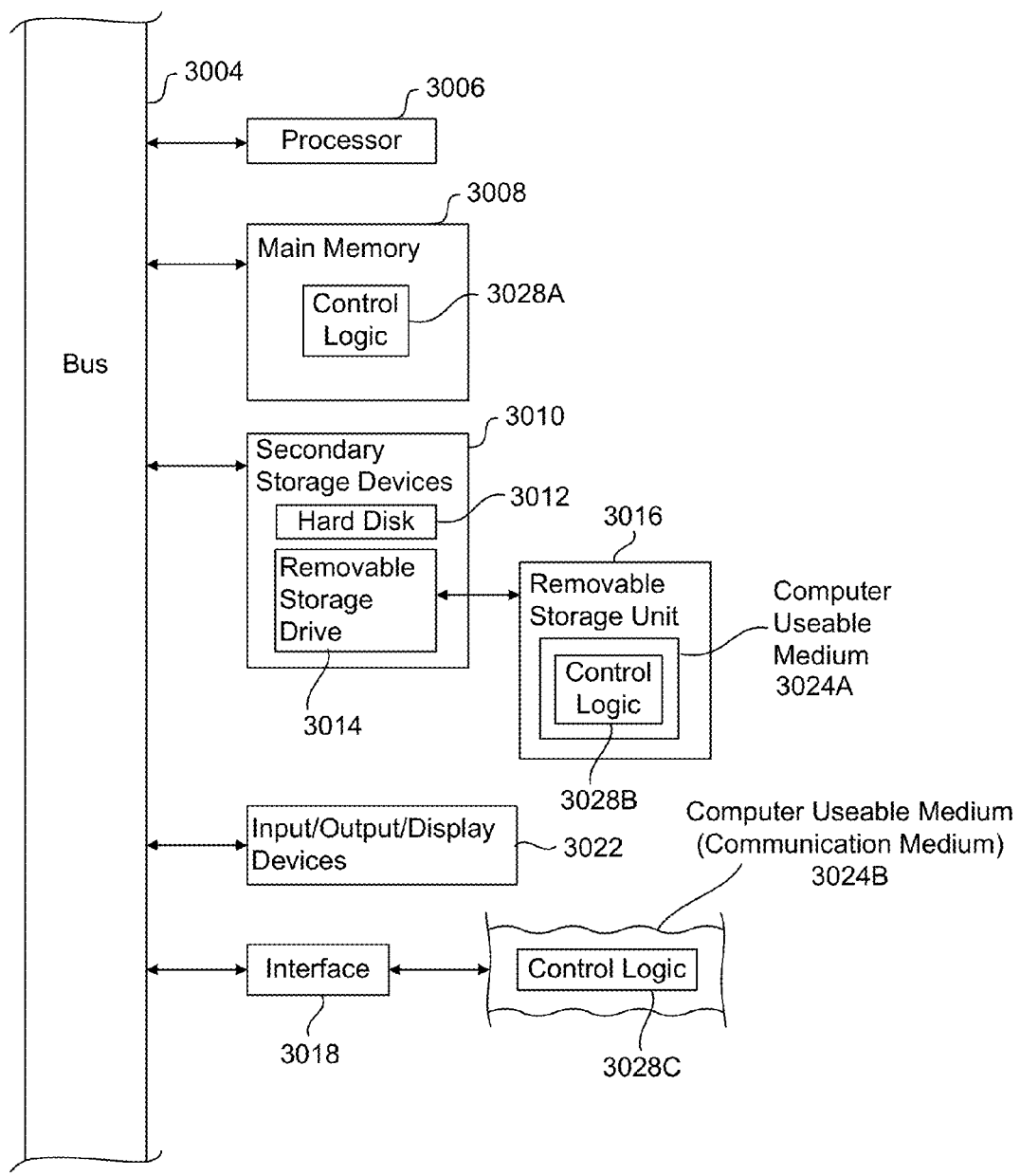

FIG. 30 illustrates an example computer system that can be configured according to some embodiments.

Figure 31A:
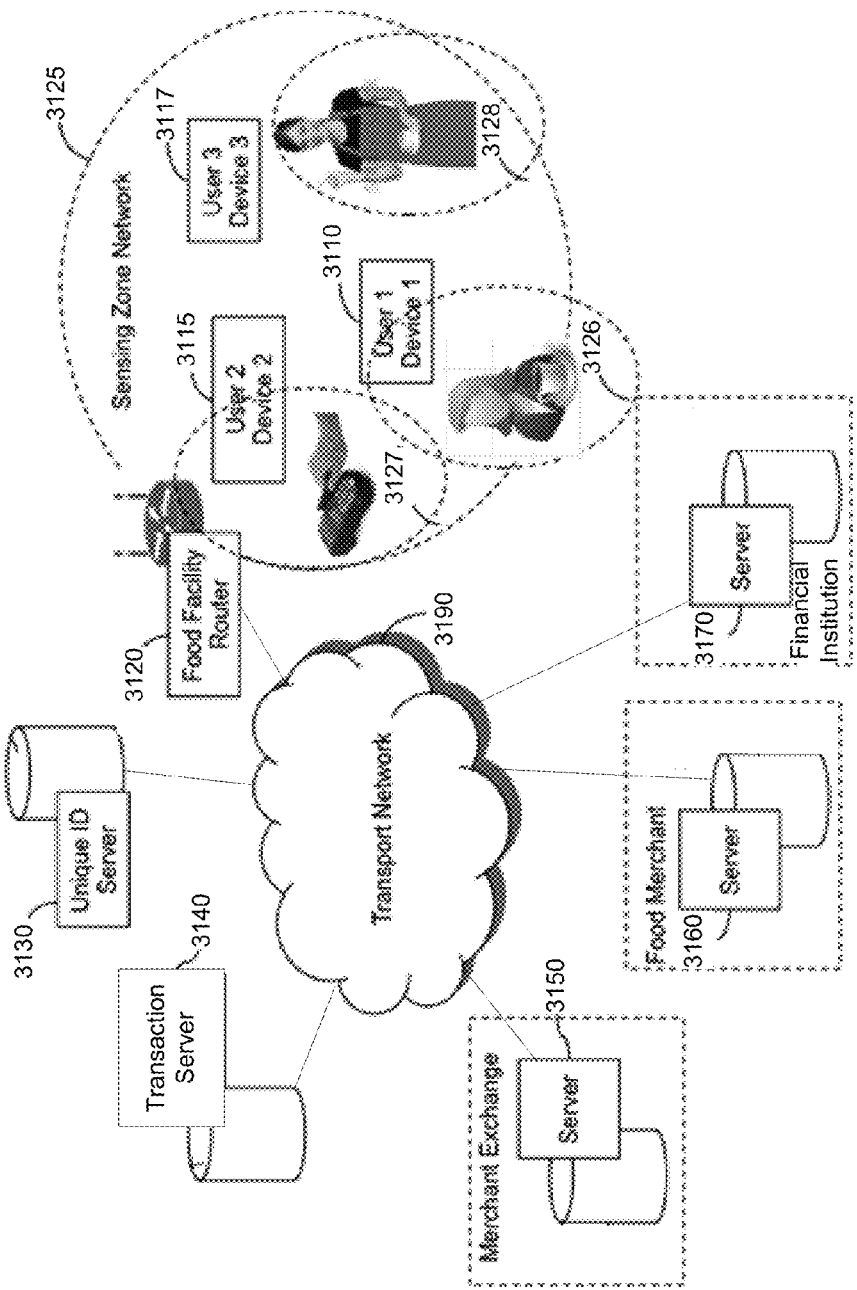
Figures 31B, 31C:
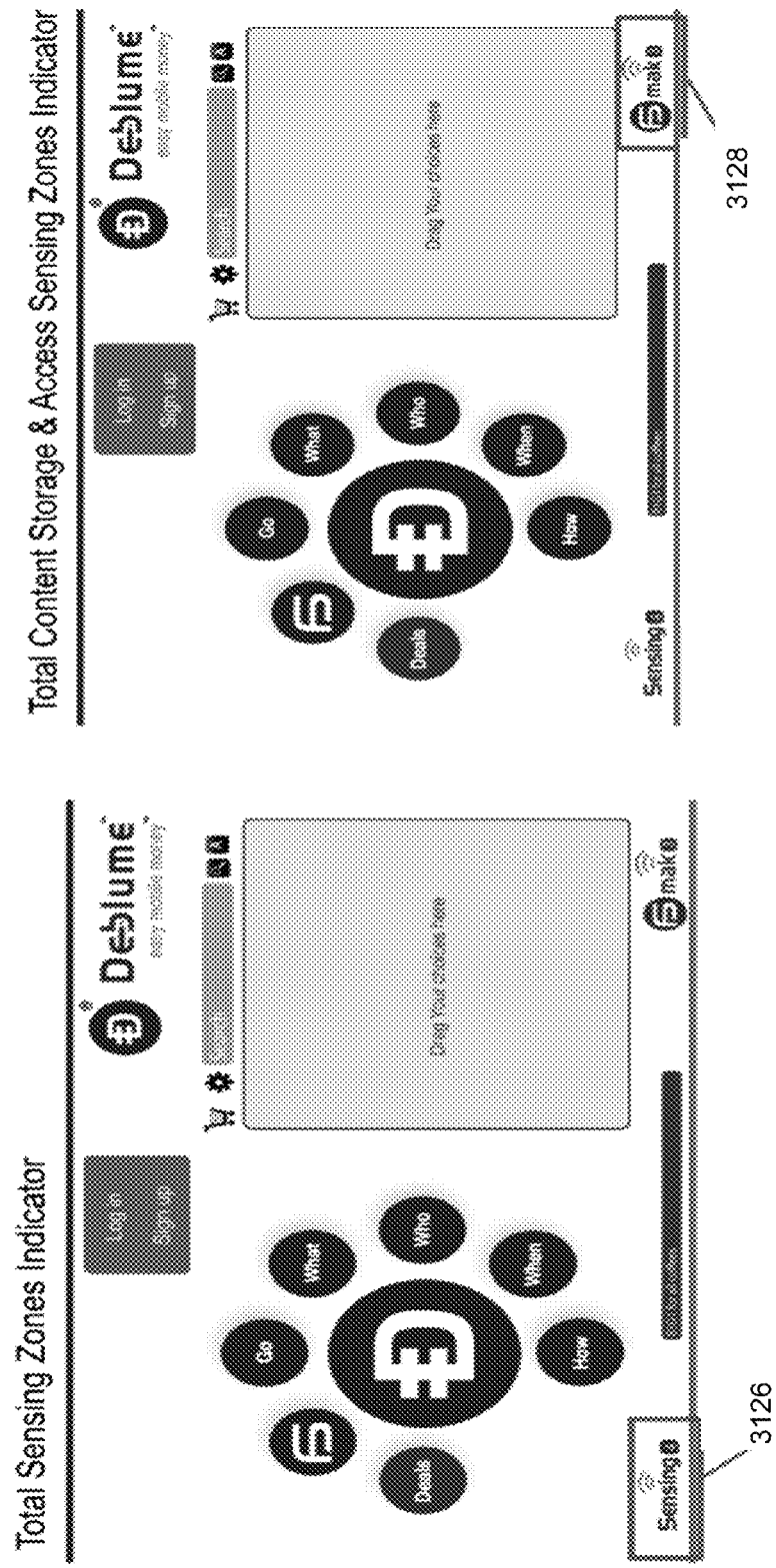
Figure 31D:
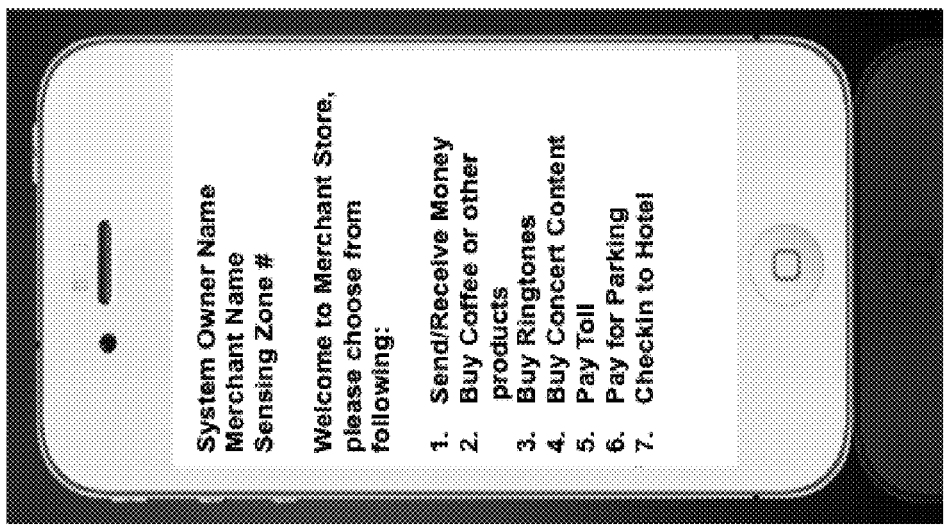
Figure 31F:
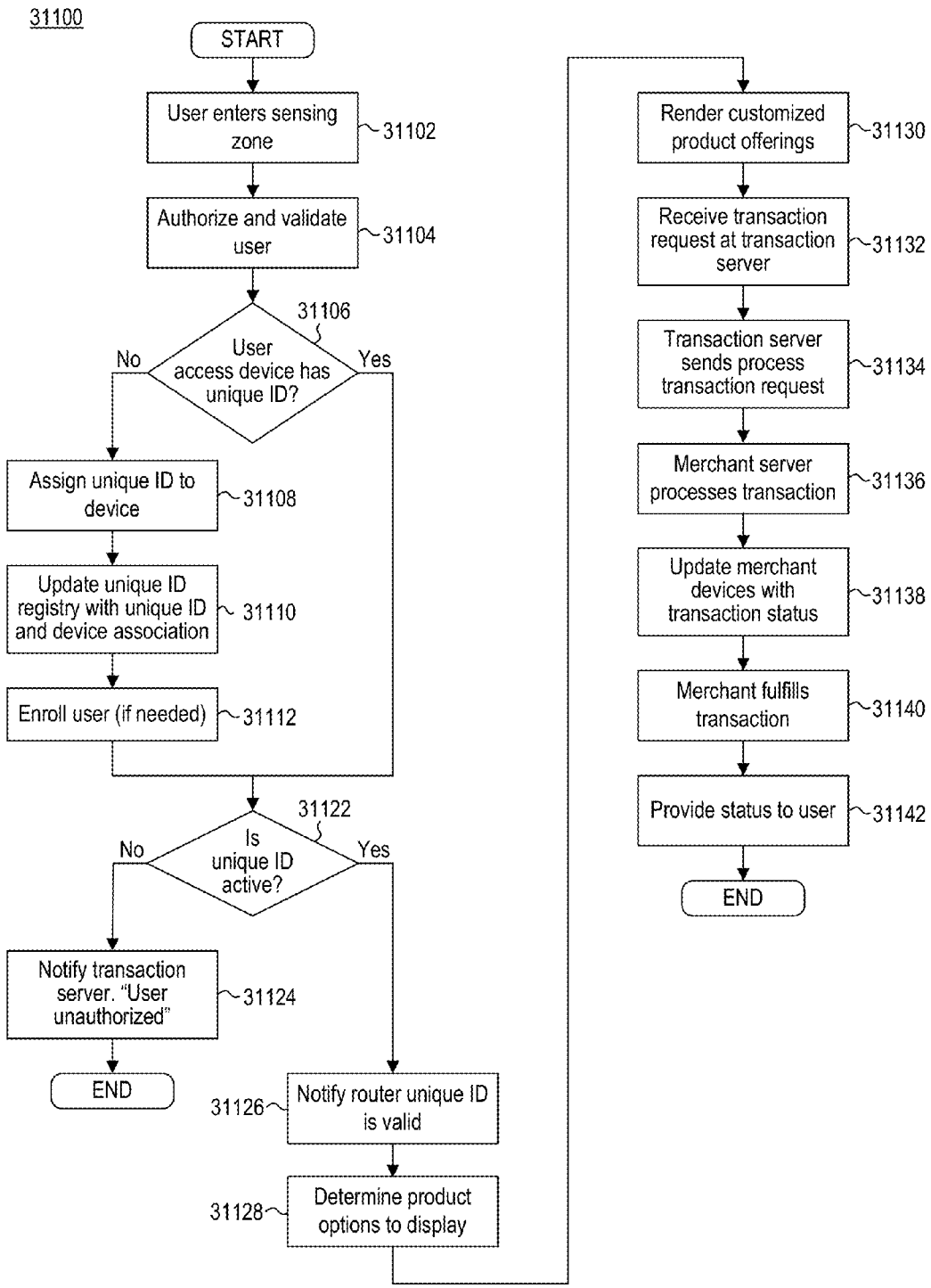
Figure 31H:
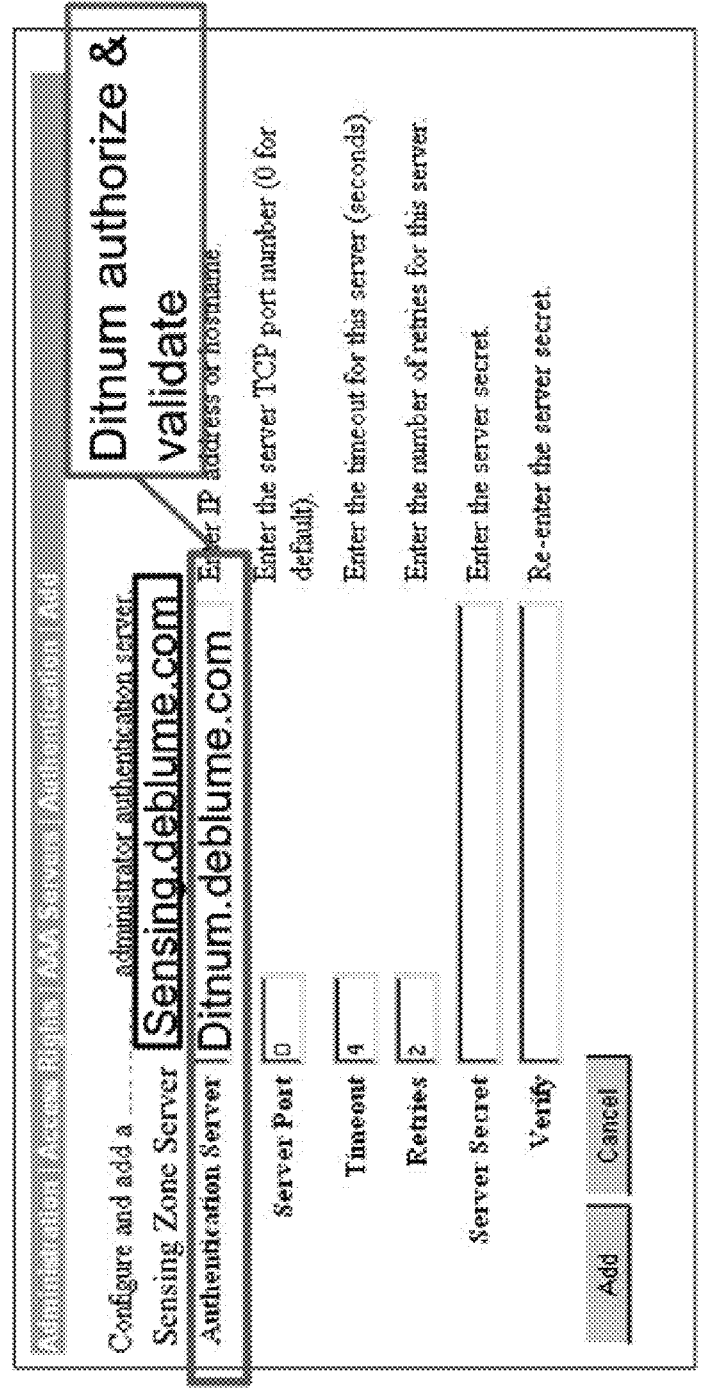
Figure 31I:
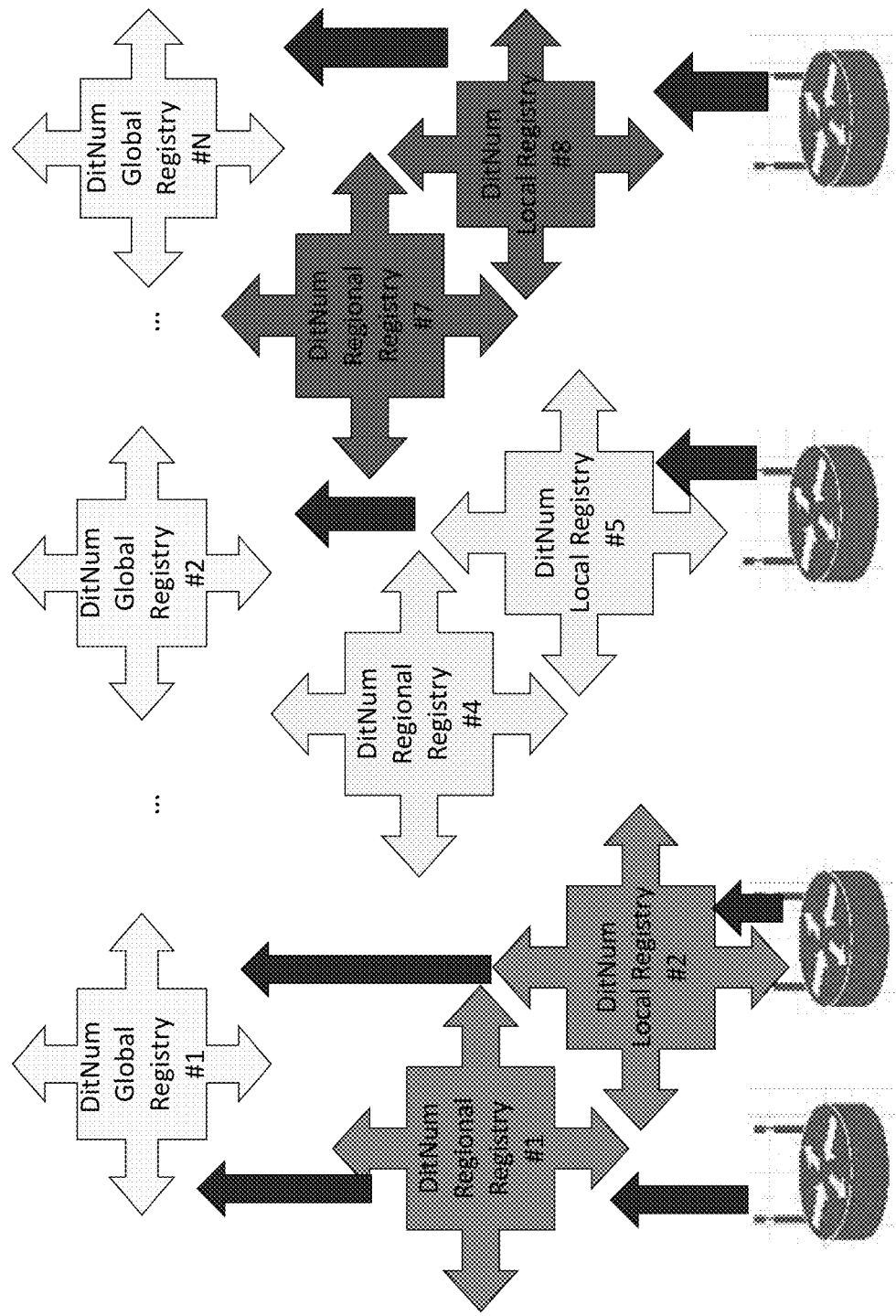
Figure 31J:
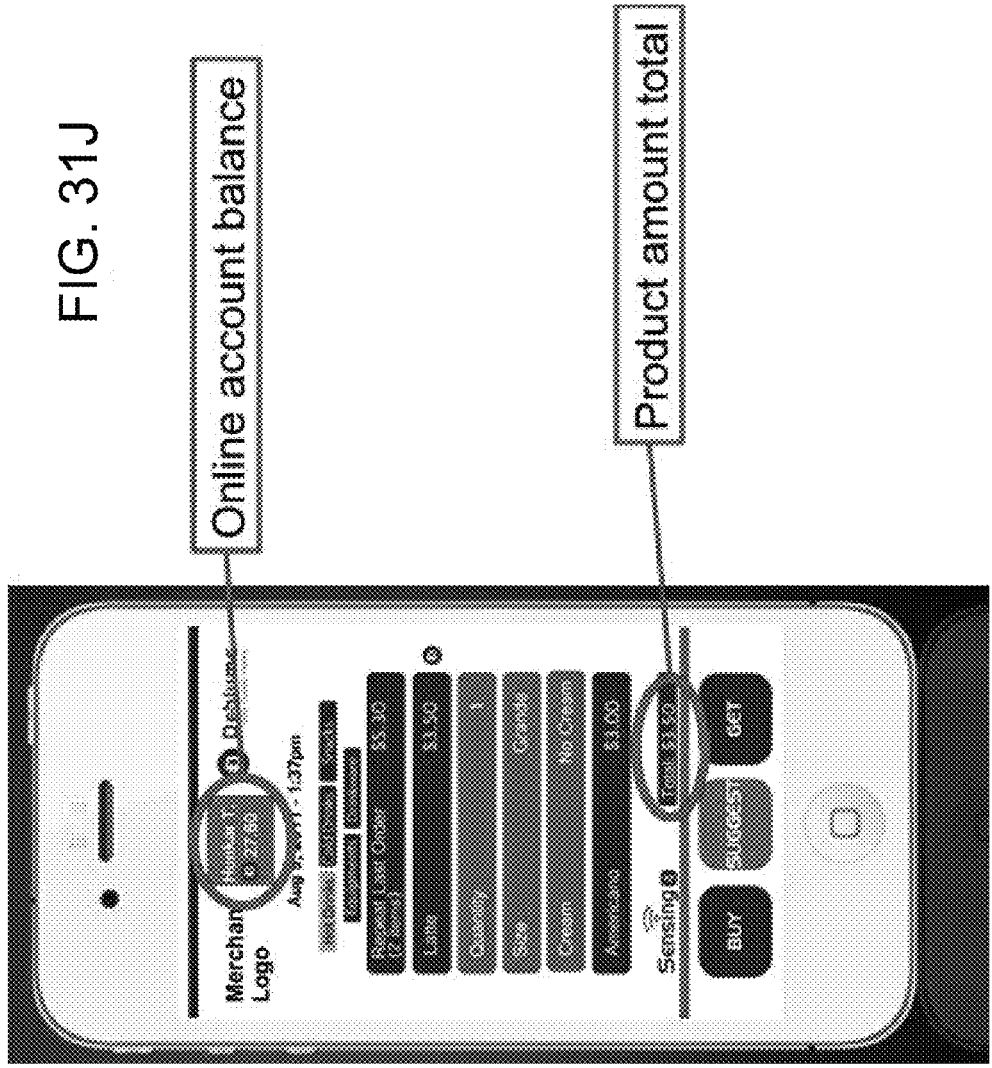
Figure 31L:
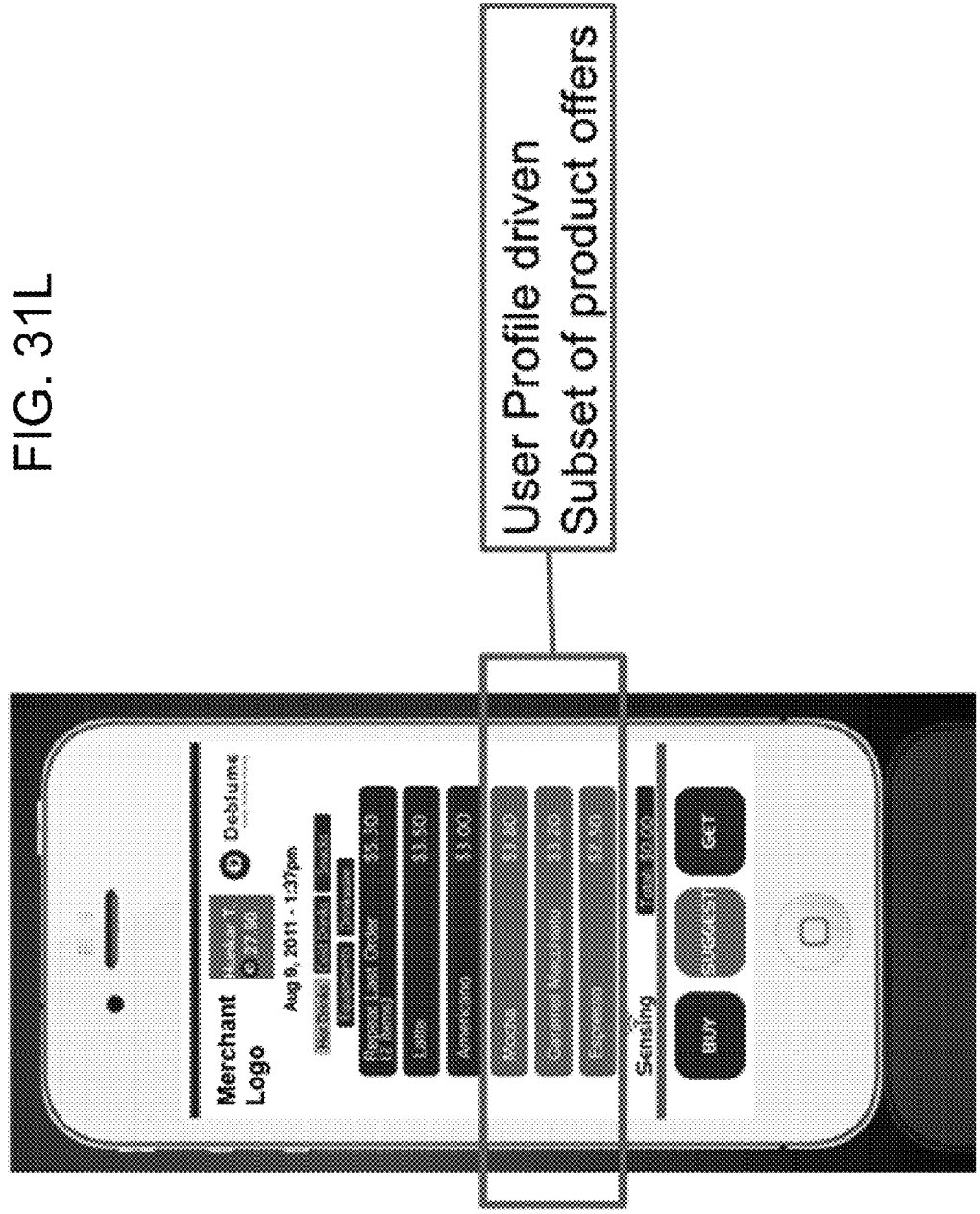
Figure 31N:
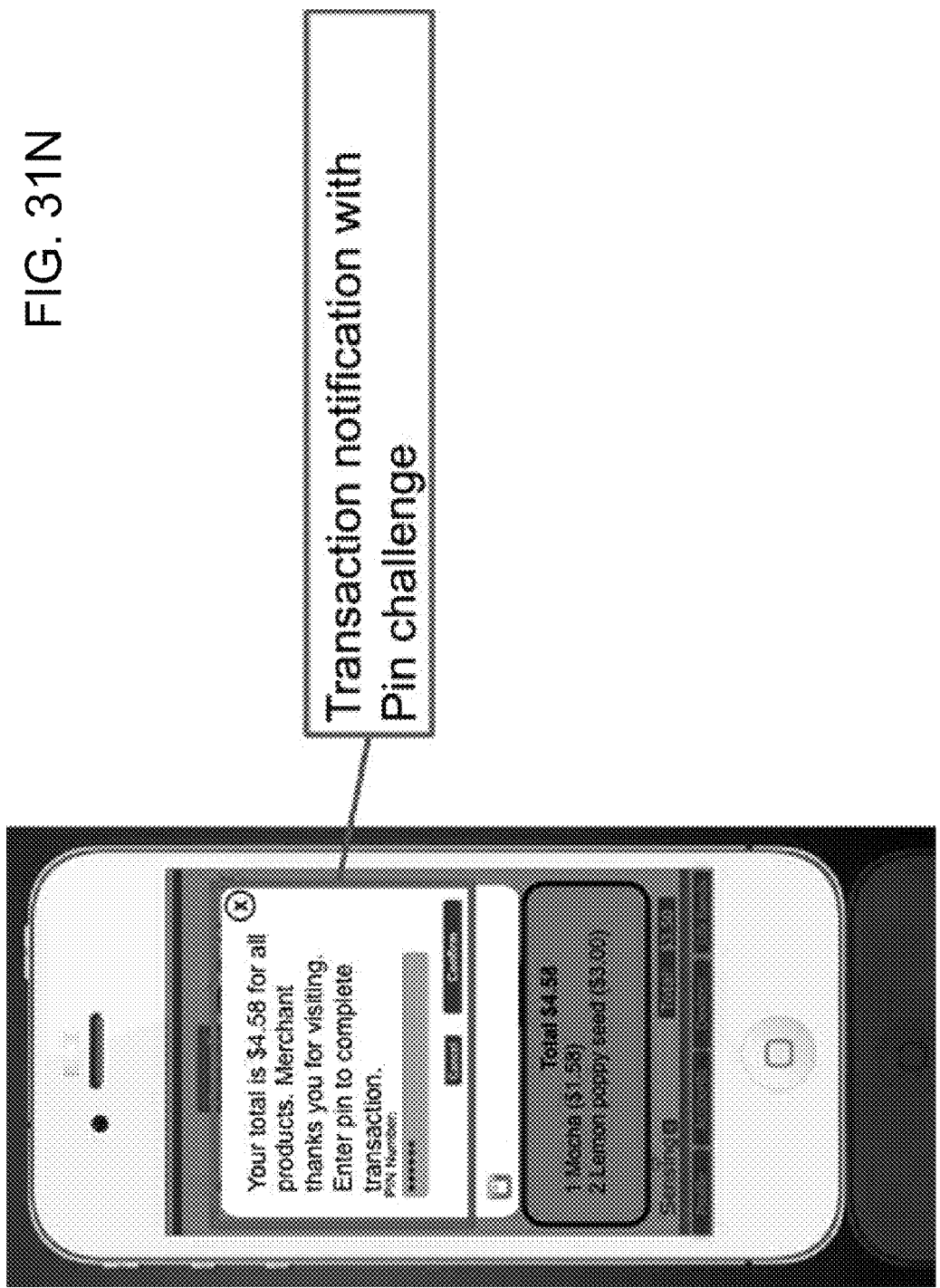
Figure 31O:
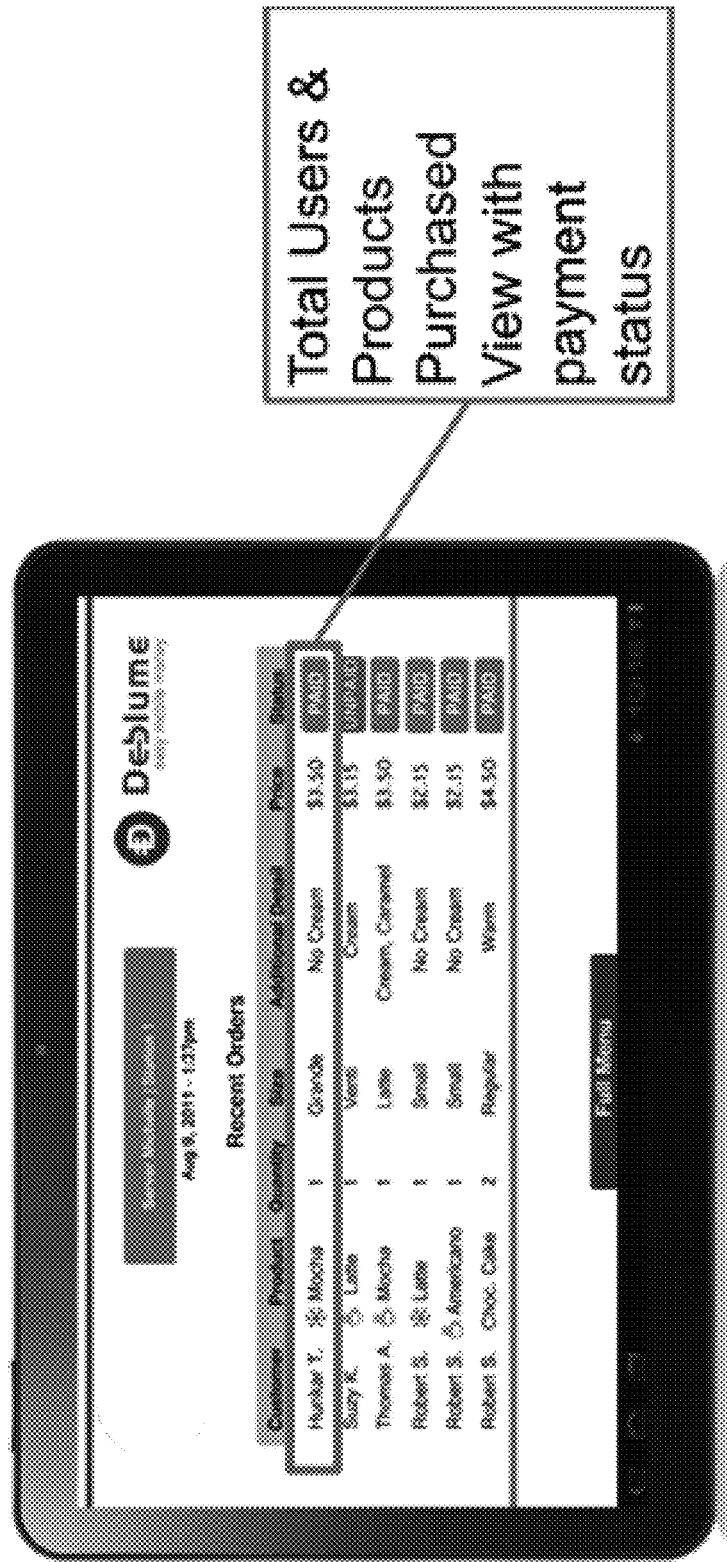
Figure 31P:
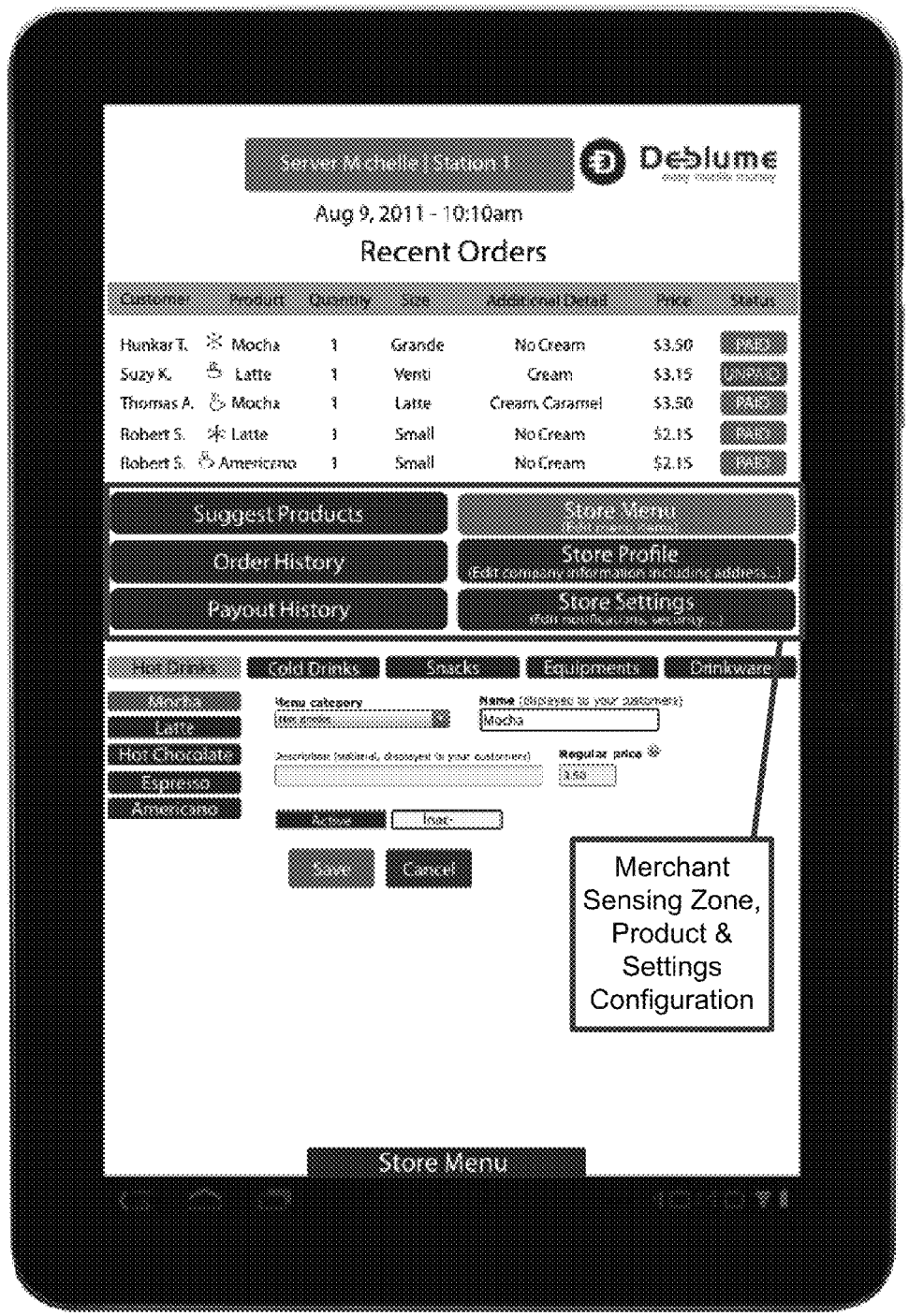
Figure 31Q:
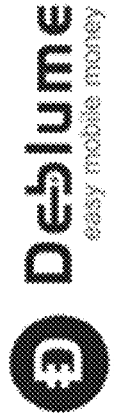

FIGS. 31A-Q illustrate a transaction associated with a food facility, according to an embodiment.

Figure 32A:
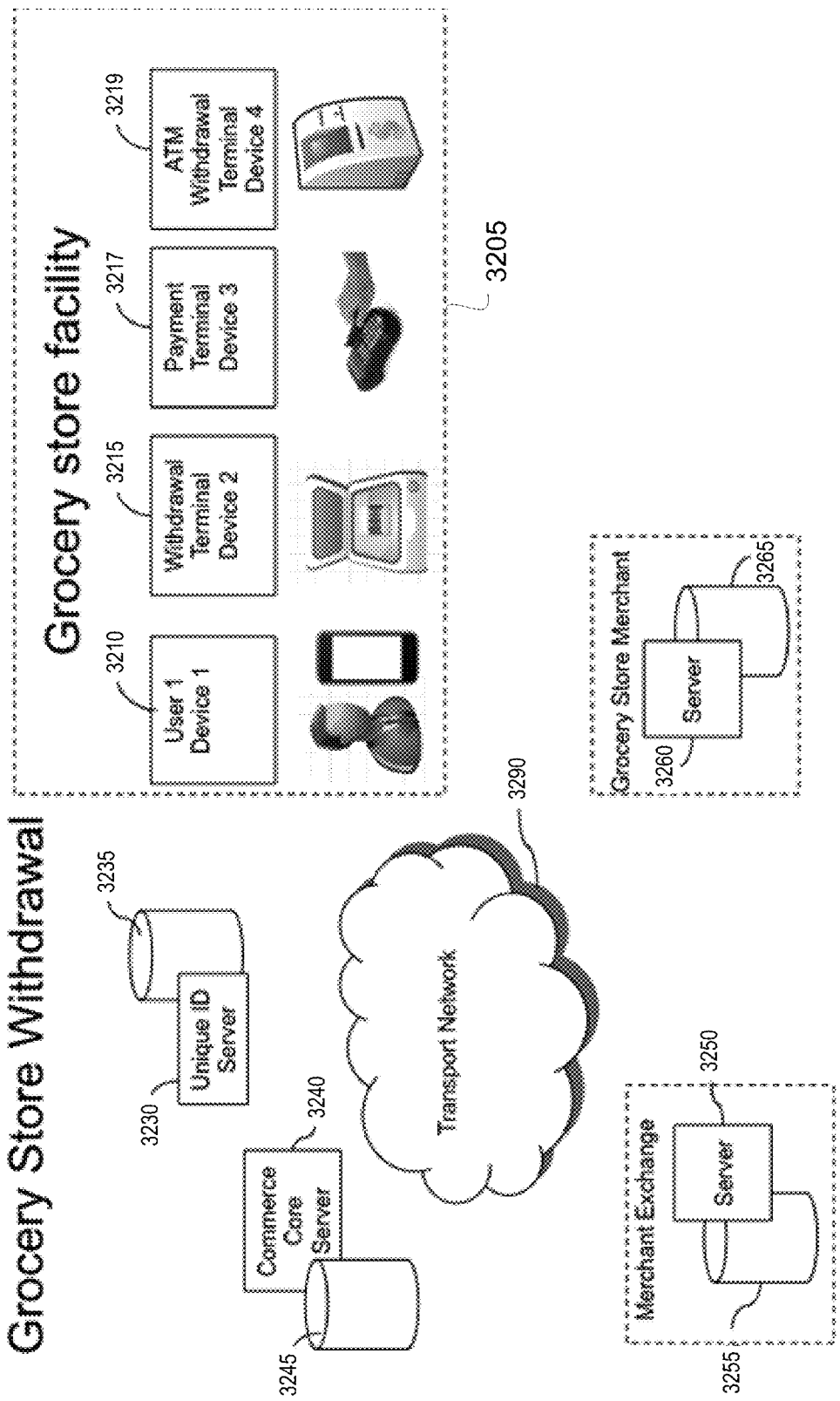
Figure 32B:
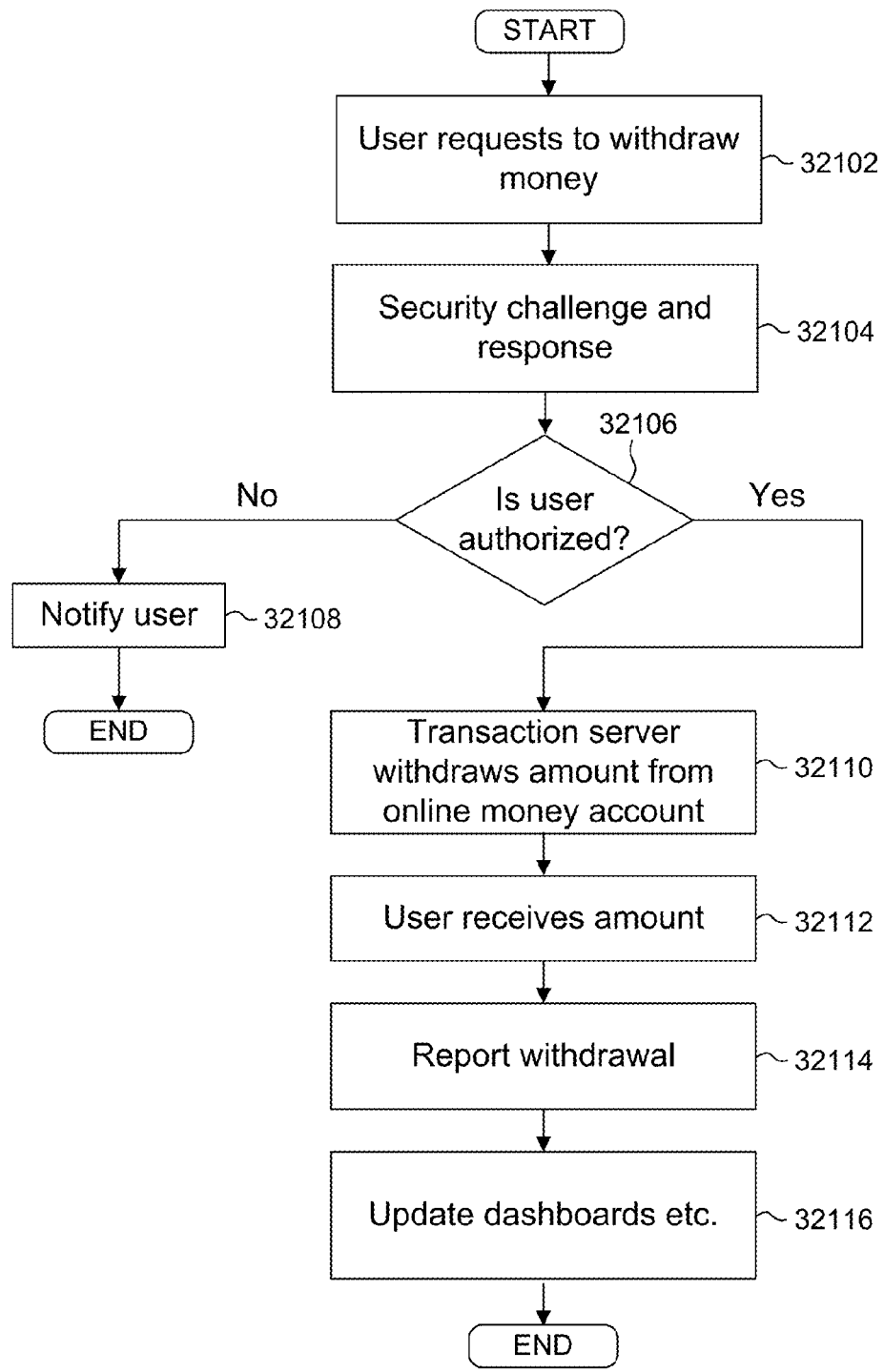

FIGS. 32A-B illustrate a transaction associated with a grocery store withdrawal, according to an embodiment.

FIGS. 33A-H illustrate a transaction associated with a toll road, according to an embodiment.

FIGS. 34A-F illustrate a transaction associated with a single user send/give, according to an embodiment.

FIGS. 35A-D illustrate a transaction associated with a gas station automatic payment ("autopay"), according to an embodiment.

Figure 36A:
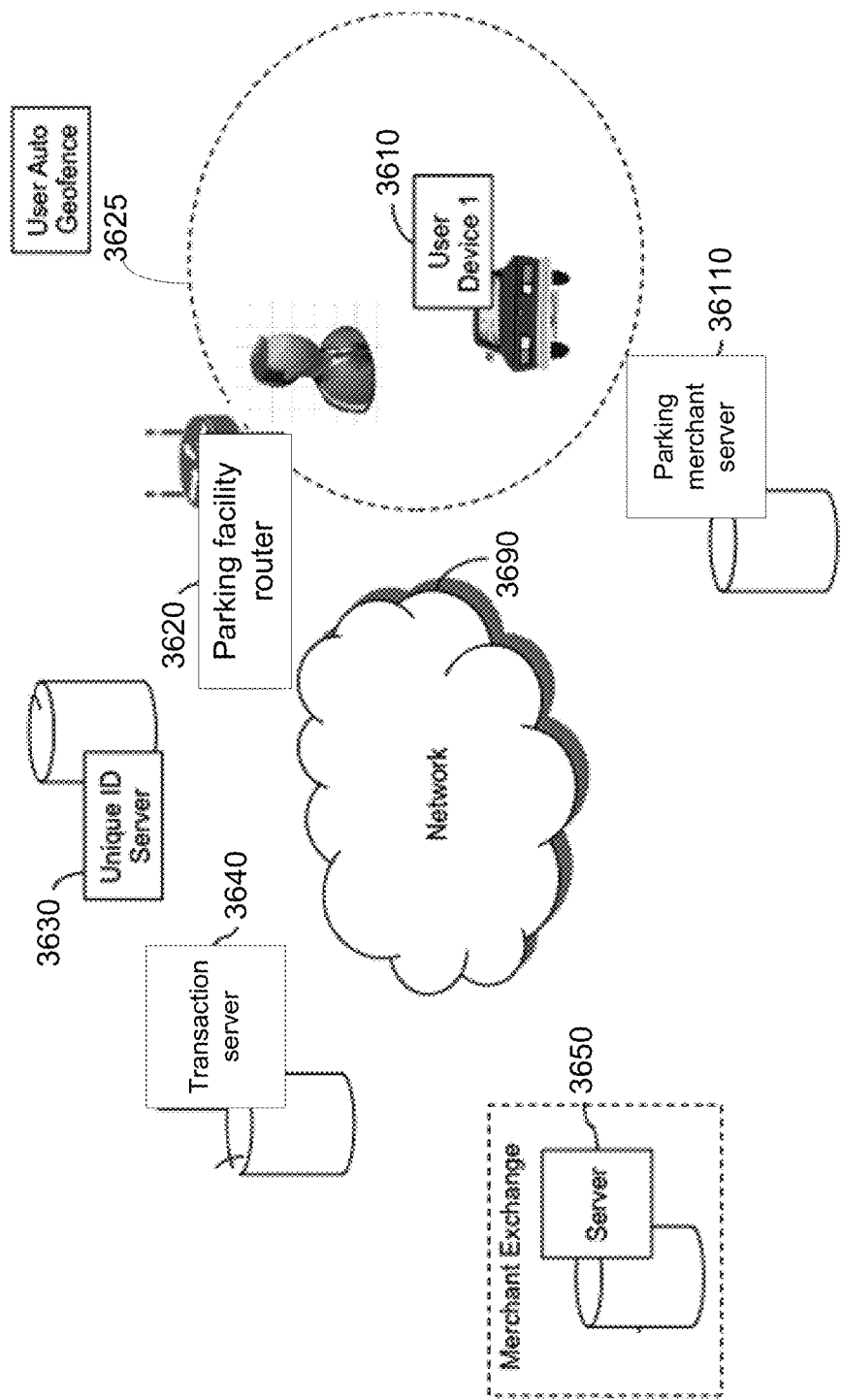

FIGS. 36A-B illustrate a transaction associated with a parking lot autopay, according to an embodiment.

FIGS. 37A-F illustrate a transaction associated with a content transfer, according to an embodiment.

Figure 38:
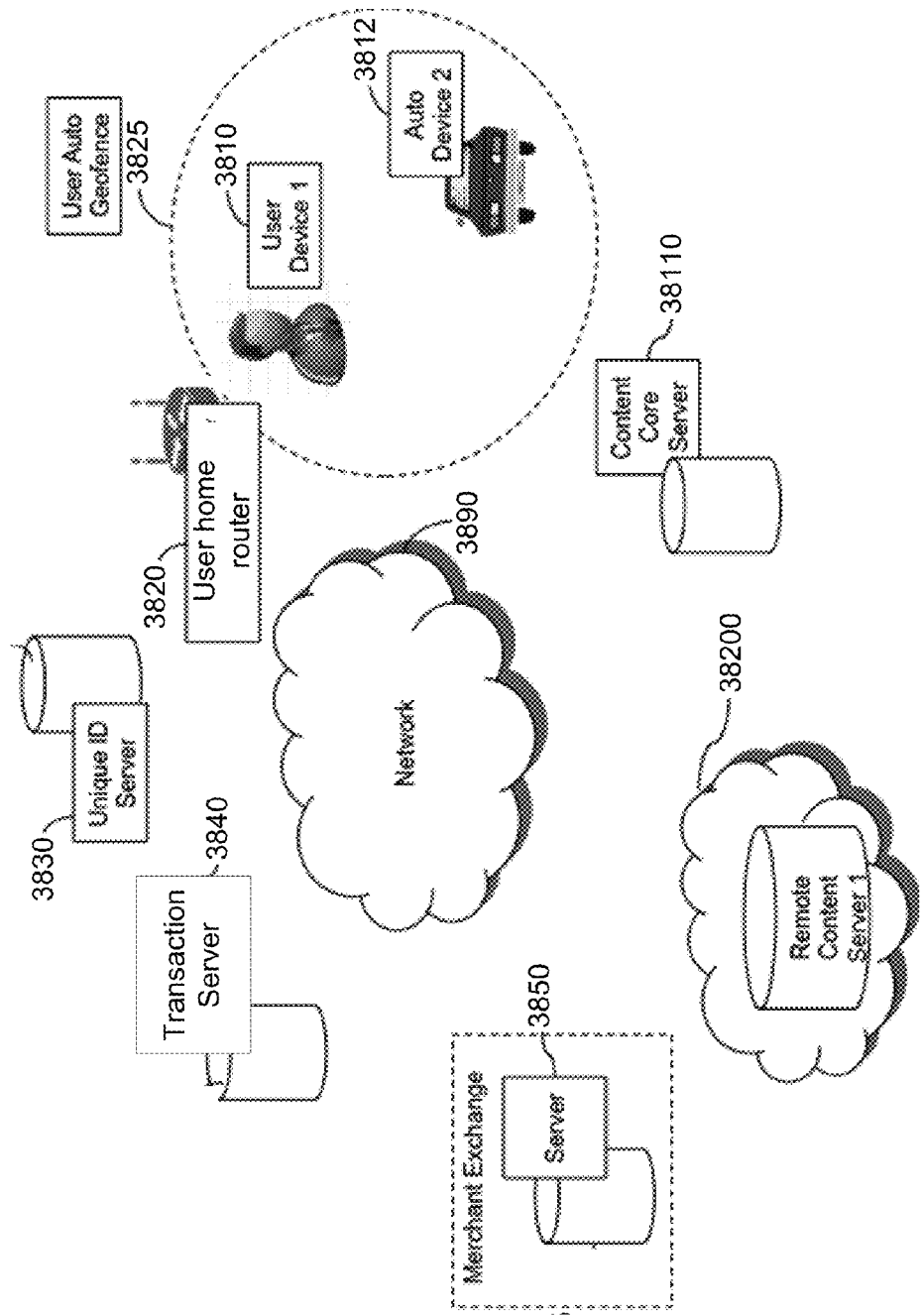

FIG. 38 illustrates a transaction associated with a content purchase and automatic download, according to an embodiment.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview

The present invention is directed to systems, elements in the systems, and associated methods, for automated electronic commerce and fulfillment. While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Embodiments of the present invention provide for automated paperless transactional capabilities for a plurality of transaction item types using an integrated platform, and for delivering purchase options selectively pushed to or pulled by the user. Embodiments can process transactions including any of a plurality of transaction items types, such as, but not limited to, money, money equivalents, products or services, and content. Moreover, embodiments can integrate on the same platform and provide for transfers involving multiple types of delivery instruments, such as, but not limited to, financial accounts, money equivalents, and content. Embodiments may offer user interface choices based on sensed data, user or user access device attributes, user or merchant preferences, or any combination of the above. Embodiments may be used with, or as a part of, one or more onsite, local or global sensing boundary (e.g., an electronic or virtual bounded area). Embodiments use sensing ("sensing") so as to facilitate mobile and non-mobile commercial transactions. Embodiments are further directed to a digital supply chain for content and associated funds and product transfer.

The benefits offered to consumers by embodiments of the present invention include, but are not limited to, faster and more efficient product ordering and payment, system generated context-aware purchase option suggestions based upon past behavior of user, enabled transaction level giving or contributions to organizations such as charitable organizations, and enhanced device level and user personal identification code level security to transactions. For merchants, embodiments facilitate reducing the reliance of credit cards (e.g., by encouraging payment through checking account), facilitate mobile-device based self-service product pickup, and provide detailed near real-time business analytics based upon transactions.

The disclosed embodiments overcome at least the disadvantages of existing electronic commerce systems noted in the background section above. Some of the embodiments provide an 'easy mobile money' transaction system that can also transfer funds, content and products from consumers to other consumers or merchants with relative ease securely and cost effectively. For faster navigation, the user is enabled with an 'easy to understand and use' drag and drop interface of clearly outlined circles enabling a complex tree of hierarchical menus to be displayed on a single display with the single tap of a finger on the display. An interface to the disclosed transaction system may be launched simply by navigating via a URL request or by responding to a network based page push similar to a WIFI modem web page push. The system also supports non-interface automated responses such as paying for an item merely by showing up in the sensing zone. The pages and/or user interfaces for the web and mobile versions are similar in appearance giving the user a sense of uniformity across mobile and web access. Users may access the transaction system without the burden of an application download to the user's access device. Embodiments use an innovative web commerce operating system ("WebCOS") designed to fit on small screens and therefore accommodate a much wider range of device choices and, coupled with the 'sensing area' technology, can include a wide range of device types including, but not limited to, mobile handheld devices. The WebCOS creates a user-aware commerce operating system that can spawn and manage many simultaneous or sequential transactions on behalf of a user.

The disclosed system supports a multiplicity of accounts from similar or dissimilar financial institutions and creates a powerful merchant exchange engine to move money seamlessly from these legacy financial institutions. This single system captures their entire financial system needs rather than focusing on a single financial institution view of their funding needs and can provide balances for all such accounts. When applied globally, to accounts in different countries, the power multiplies as a digital account for funds transfer which can move more nimbly across country borders than within border banking institutions. Additionally, embodiments may also facilitate a digital currency that is complementary to one or more local currencies, such as the U.S. Dollar, but exists entirely in digital form and can be moved seamlessly across electronic commerce systems regardless of geographic boundaries.

Embodiments allow for merchants to receive payment through a multiplicity of payment methods (point of sale, checking accounts, credit cards, ATM machine, grocery store scanners, wired money terminals, coin deposit terminals, etc.) without requiring the merchant to setup an associated online account. Existing merchant point of sale (POS) devices such as a VeriFone® devices are supported. A user may type in her cellphone number to obtain payment (e.g. withdrawn) from her online account to pay for product purchases. Numerous other withdrawal methods are also supported by the disclosed system. For example, the disclosed system allows the user account to behave like a digital version of a reloadable money card bypassing many of the limitations of bank accounts.

Some embodiments associate an identifier such as a user's cell phone number with an email account, making overall transaction security much stronger and capable of device fingerprinting (e.g., association of device to an actual verifiable user). Such device fingerprinting allows the system to challenge or even prevent initial access by fraud committing actors due to the cell account having some connection to an actual user unlike email accounts which can be setup in an automated fashion and not be tied to actual persons. Also, some embodiments use rules-based logic embedded in the unique ID for added security and context. The unique ID can be created by a global registry that may be controlled by a third party independent from the transaction system and associated merchants. The unique ID may be used with known fraud blacklists of users and devices and can be made a valuable aid in reducing fraud.

Embodiments facilitate donating (e.g., giving) to charities and other organizations while having the donations tied to transactions. In the disclosed system, linking into 'microloan' commerce systems is as easy as linking to these organizations thru a merchant exchange. The disclosed multi-vendor merchant exchange can allow a user configuration such as adding a nickel to every coffee cup purchase with that nickel donation automatically directed to the user's preferred microloan candidate such as an entrepreneur at Grameen Bank™ or Kiva®. Thus, the described system provides an almost effortless way for consumers doing everyday things like buying coffee or shopping for groceries to donate to charities or other organizations globally.

The disclosed system includes sophisticated enrollment/deposit and withdrawal merchant connectivity to existing financial deposit and withdraw units to allow even persons without a checking account or credit card to use the system. For example, a user without a bank account or credit card might be able to deposit $20.00 into their system account using a grocery store scanner, or a money wire terminal system allowing the user to send the money over the online commerce system to a receiving consumer without a bank/credit card. The disclosed system allows withdrawal from ATM machines simply by providing the user a secure unique transaction ID reducing the need to carry cards to access ATM machines.

In some embodiments of the disclosed system, a 'suggest' button is added to "Buy", "give, "get, and "send" options and elevated to main menu status. The suggest button allows a user to proactively ask on Thursday afternoon at 4:30 for 'suggestions' for additional product purchases to the user. For users with deeply filled out user profile data, there is a rich set of data regarding user product preferences to match against merchant options. Profile data also enables the restricting of suggestions only to the most relevant suggestions for each user, thereby preventing each user from being inundated with product choices that are of little or no use to her.

The disclosed system also provides for spontaneous web and mobile storage that is available for the duration of the pushing and pulling of content, and then is removed as a storage location meaning the user is charged only for the transaction and has access to unlimited storage capabilities but does not choose to keep such content stored fulltime. These spontaneous storage facilities can be linked to fulltime storage sites such as offered by Google Drive® or Apple's iCloud® but give the user the choice of having unlimited storage for large file moves that these systems don't offer. The disclosed system allows spontaneous unlimited space storage without being charged ongoing monthly storage fees. An additional content payload, exchanged via spontaneous storage, can be attached to some transactions.

Figure 1A:
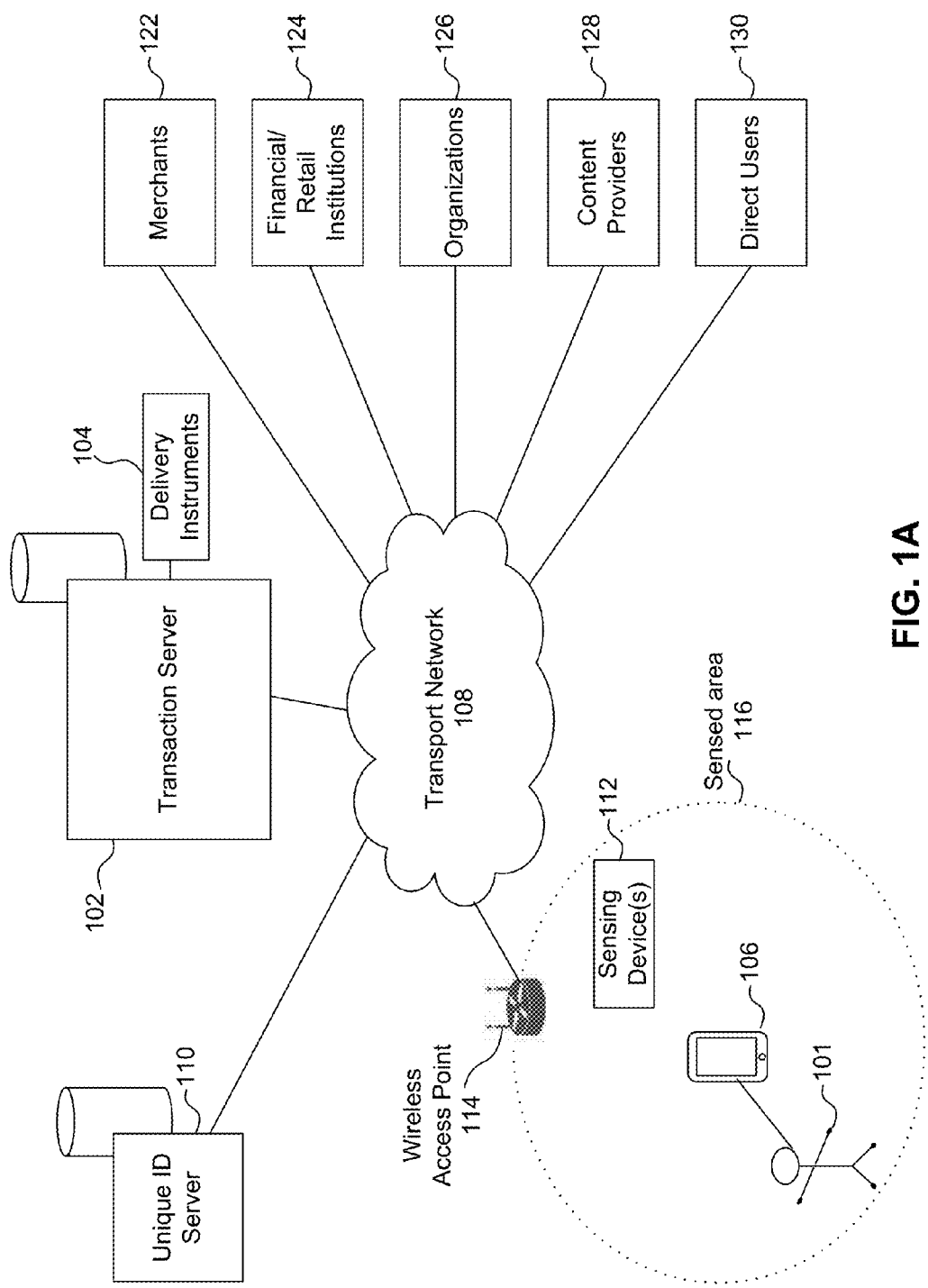
Figure 1B:
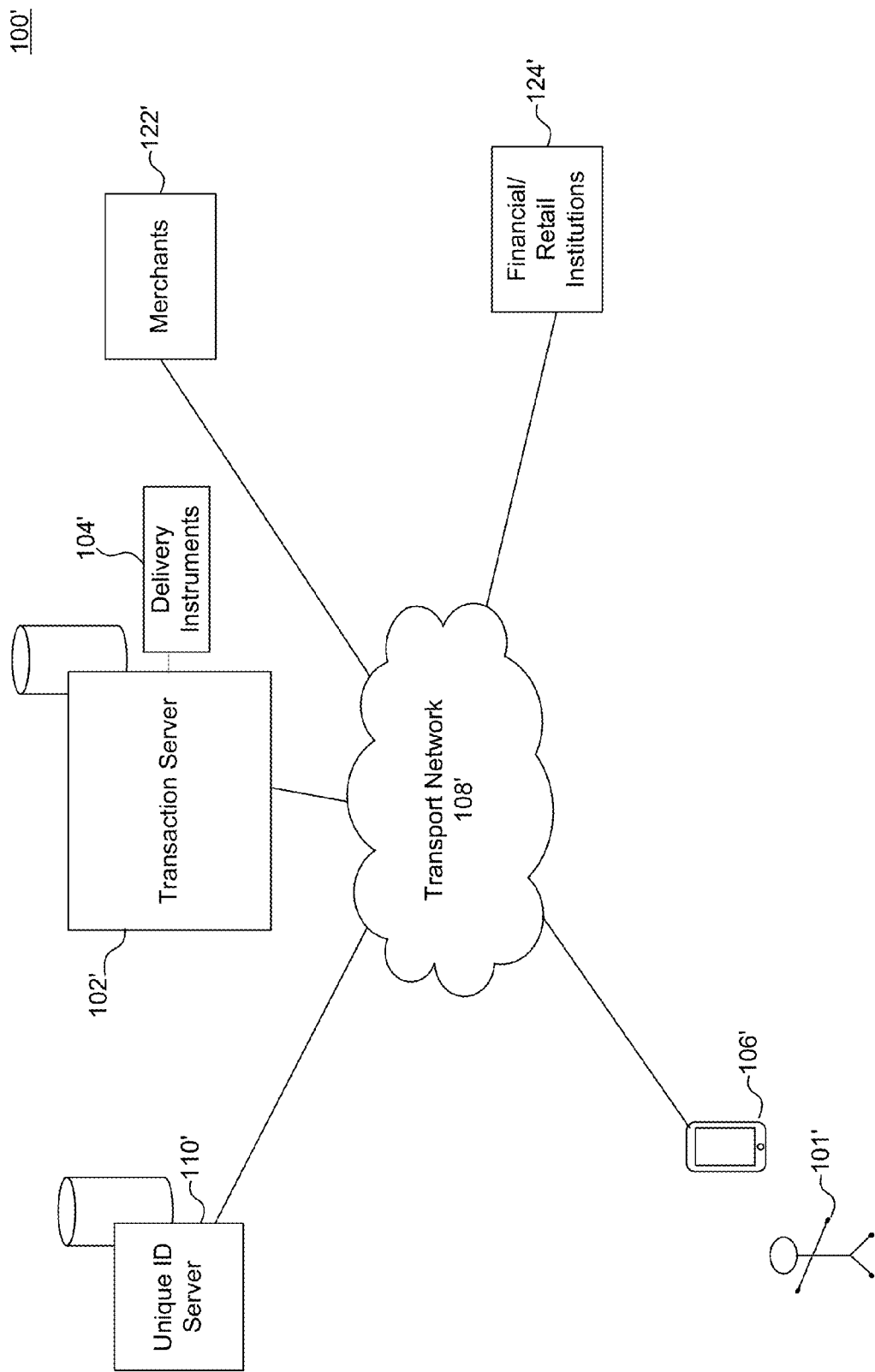

FIGS. 1A and 1B illustrate automated electronic commerce environments in accordance with some embodiments of the present invention. In FIG. 1A, a system 100 includes a transaction server 102 that is communicatively connected to a transport network 108. Transport network 108 may include one or more interconnected physical and/or logical communications networks and may use any combination of communication technologies and protocols to interconnect connected devices. Transaction server 102 executes a commerce system (CS) or portions of the CS that provide processing of transactions that may include the transfer of "transaction items," such as, money, money equivalents (e.g., merchant loyalty points, airline miles), products or services, and digital content (e.g., music, video, books, ring tones, and other digital content).

Transaction server 102 facilitates transactions involving one or more users 101. A user 101 of system 100 is any entity that sends (e.g. deposits) or receives (e.g. withdraws) a quantity of a transaction item using transaction server 102. Users of system 100 may include, but are not limited to, merchants 122, financial or retail institutions 124, organizations 126 such as organizations that raise funds for various purposes, digital content providers 128, and direct users 130 (e.g. individual users). Merchants 122 offer a product or service for sale. Financial or retail institutions 124 include providers of traditional banking, credit card, automated teller machines (ATM), coin deposit units (e.g., Coinstar®), grocery store scanners, self-service checkout units, point of sale credit card verification terminals (e.g., VeriFone® terminals), debit card, and gift card services. Organizations 126 include entities that may not be either a merchant or financial institution, but that raises funds for various causes. Direct users 130 include "subscribers" or "consumers" of system 100. Direct users 130 are consumers of products and maintain relationships with one or more of merchants 122, financial or retail institutions 124, organizations 126, content providers 128, through one or more delivery instruments (e.g. accounts) in transaction server 102 or with financial institution 124. It should be noted that, depending on the transaction, the roles of merchants 122, financial or retail institutions 124, organizations 126, content providers 128, and direct users 130 may change. For example, a merchant 122 may participate in some transactions as a direct user 130, and vice versa. Some direct users may use the system without having an account or subscribing. A merchant such as Coinstar® or Safeway® may facilitate deposits and withdrawals without being required to have a transaction server 102 account but are connected to the transaction server 102 through a merchant gateway that delivers funds through traditional financial network options such as VeriFone® networks or gift card receipts or coupon bar codes for grocery stores. Subscribers are users that are direct users with enrolled accounts with the commerce server. Further, consumers are subscribers that have certain qualities of being in a demographic category, for example, teenager/cash only consumer or VIP consumer and such designations of user type that can be used in the system to speed or ease access to sensing zones and their related featured interface choices.

Transaction server 102 includes the capability to identify and provide services to user 101 and user access device 106. Each user, user access device and transaction is tracked via a secure numbering scheme using a unique identifier. The unique identifier (also referred to herein as unique ID or Ditnum—Digital intelligent transaction number) enables the user, user access device or the transaction to be disabled or disallowed under the control of transaction server 102 based upon configured settings. For example, if the characteristics or behavior patterns of one or more of the user, user access device or the transaction match a configured fraud detection setting, then the corresponding transaction can be rejected by the transaction server, and optionally, the user and/or the user access device can be subjected to further monitoring within system 100. The unique identifiers associated with the user and the user access device can be monitored throughout system 100 enhancing the global consistency, security and integrity of transactions. Rather than an email address or cellphone number acting as a passport allowing entry to the transaction server 102, the unique ID becomes the only way the user is allowed access and the features of the unique ID allow sophisticated methods of identifying users who should be disallowed from system usage.

For each user 101, transaction server 102 may have configured on it one or more associated delivery instruments 104. Delivery instruments 104 are repositories or accounts associated with respective users 101 and/or one or more of merchants 122, financial or retail institutions 124, organizations 126, content providers 128, or direct users 130 that can be used for the transfer of a quantity of a transaction item. Delivery instruments 104 may include, but are not limited to, online money accounts, checking accounts and other financial accounts associated with banks and/or other financial institutions, online content accounts, and content accounts associated with third-party content providers, users, or content repositories. Transaction items (e.g. money, money equivalents, content) may be deposited into, or withdrawn from, delivery instruments 104 using a transfer among accounts on transaction server 102, or using ATM, VeriFone terminal, or other POS communicatively coupled to transaction server 102.

User 101 interacts with transaction server 102 through user access device 106. User access device (sometimes also referred to herein as "user device" or "user communications device") 106 may include, but is not limited to, one or more of mobile telephone, smartphone, tablet computer, notebook computer, laptop computer, personal computer, music/multimedia player, or other processor-based terminal which provides for interaction with user 101. User access device 106 is controlled by user 101 and includes a processor which, among other processing functions, allows for data to be pushed and pulled outside of the direct control of user 101, from or to a transaction server 102. The communicative connection from user access device 106 to the transaction server 102 by user 101 may be wireless, wired, or may include a combination of wireless and wired networks. In addition, the connection to the transaction server 102 by user 101 may include a web interface and/or other software interface such as, but not limited to, SMS, Multimedia Messaging Service (MMS), application on a mobile client, a machine command language, XML, HTML or equivalent page definition language markup page, or other technique to render interface choices to a device User access device 106 can be configured to store and retain data, such as, but not limited to, data associated with subscriber registrations, transactions, and personal preferences; communicate with other user access devices, routers, network access points, and like access devices using industry standard or custom protocols; detect when it enters a zone of communications, such as when it enters an area encompassed by WIFI; subscribe to a server, either automatically or at user command; and automatically deliver and receive data regarding or consequential to a sensed area when it is within or in proximity to such an area.

System 100 identifies user access device 106, typically by recognizing the associated cell phone number, the IP address, the user's unique identifier, and/or other forms of identification, potentially further using an authorization by personal identification number (PIN), user identifier (userid) or password. System 100 can also identify user 101 through alternate means of identification and authentication, such as, but not limited to, a PIN, voice or other means of operator authentication.

System 100 may also include a unique ID server 110 that generates unique identifiers for users, user access devices, and transactions in the system. Unique ID server 110 may also maintain the mapping between the respective unique IDs for transactions, users, and user access devices. The unique identifier for users and user access devices may be generated when the user and/or user access device is enrolled as users of system 100. A unique identifier may also be generated for entities that are the targets or destinations of transactions but which are not enrolled users of system 100. The unique identifier for a transaction can be generated when the transaction server 102 initiates the transaction, for example, in response to a request initiated by a user. Multiple unique ID servers can be associated logically or physically and configured to identify a local, regional and global unique ID server "registry owners" that will allow these third parties outside the transaction server 102 vendor "registry owners" to manage these unique IDs not unlike IANA does for IP addresses. This gives the unique ID system accessed by the transaction server 102 a well-defined facility for fraud prevention.

System 100 can also include one or more sensing boundary areas ("sensed area") 116. A "sensed area", as used herein, is a geographically or virtually defined area where, when a user and another entity are present within or in proximity to that area, the user's transactions with that entity and interactions associated with transactions are configured in a manner that is sensitive to features of that area. Example sensing areas may, but are not limited to, be based upon one or more of wired or wireless signal coverage area, global positioning system (GPS)-driven location coordinates, or user access device address. According to some embodiments, user 101 may interact with transaction server 102 while user 101, or more specifically, user access device 106 associated with user 101, is positioned within or is in proximity to sensed area 116. Sensed area 116 may be defined by, or using, a wireless access point 114. Moreover, in some embodiments, the sensed area 116 include sensing devices 112 that define the area 116 and may, communicate with the transaction server. Examples of sensed area 116 include, but are not limited to, when the user is within the range of a merchant's onsite wireless network element (such as but not limited to an access point, router, local wireless network or global wireless network). Sensed area 116 can also be outside the current user's onsite location but within the user's presence settings, such as in a sub sandwich shop while the user is in a nearby coffee shop, and the means for connectivity could be any of several types of connectivity, such as cellular, WIFI, GPS-derived, or near field communication (NFC) types of networks acting as a connection point. Alternatively, the sensed area can be virtual, and the presence of a user inside a virtual sensed area may be determined by user preferences and settings through which the user accesses system 100. In yet another embodiment, a user may signal via the user access device that he or she has entered a sensed area 116.

System 100 can have a user 101 comprising a consumer, merchant or machine. User 101 can have any of the following combinations for the participants of the transaction and additional 3-way or n-way additional configurations: (user to user, user to merchant, merchant to user, merchant to merchant, machine to user, machine to merchant, merchant to machine).

FIG. 1B illustrates an automated electronic commerce environment including a system 100' in accordance with another embodiment. System 100' is a scaled down embodiment of system 100 described above. A transaction server 102' in system 100' is communicatively connected to transport network 108'. As shown in system 100', users 101' may include, but are not limited to, merchants 122' and financial or retail institutions 124'. Merchants 122' and financial or retail institutions 124' were described above in relation to FIG. 1A. Delivery instruments 104' can include one or more of money accounts or money equivalent accounts associated with user 101' and/or merchants 122' or financial or retail institutions 124'. User 101' accesses network 108' via user access device 106'. A unique ID server 110' operates to provide unique identifiers to users, user access devices and transactions of system 100'.

Figure 2A:
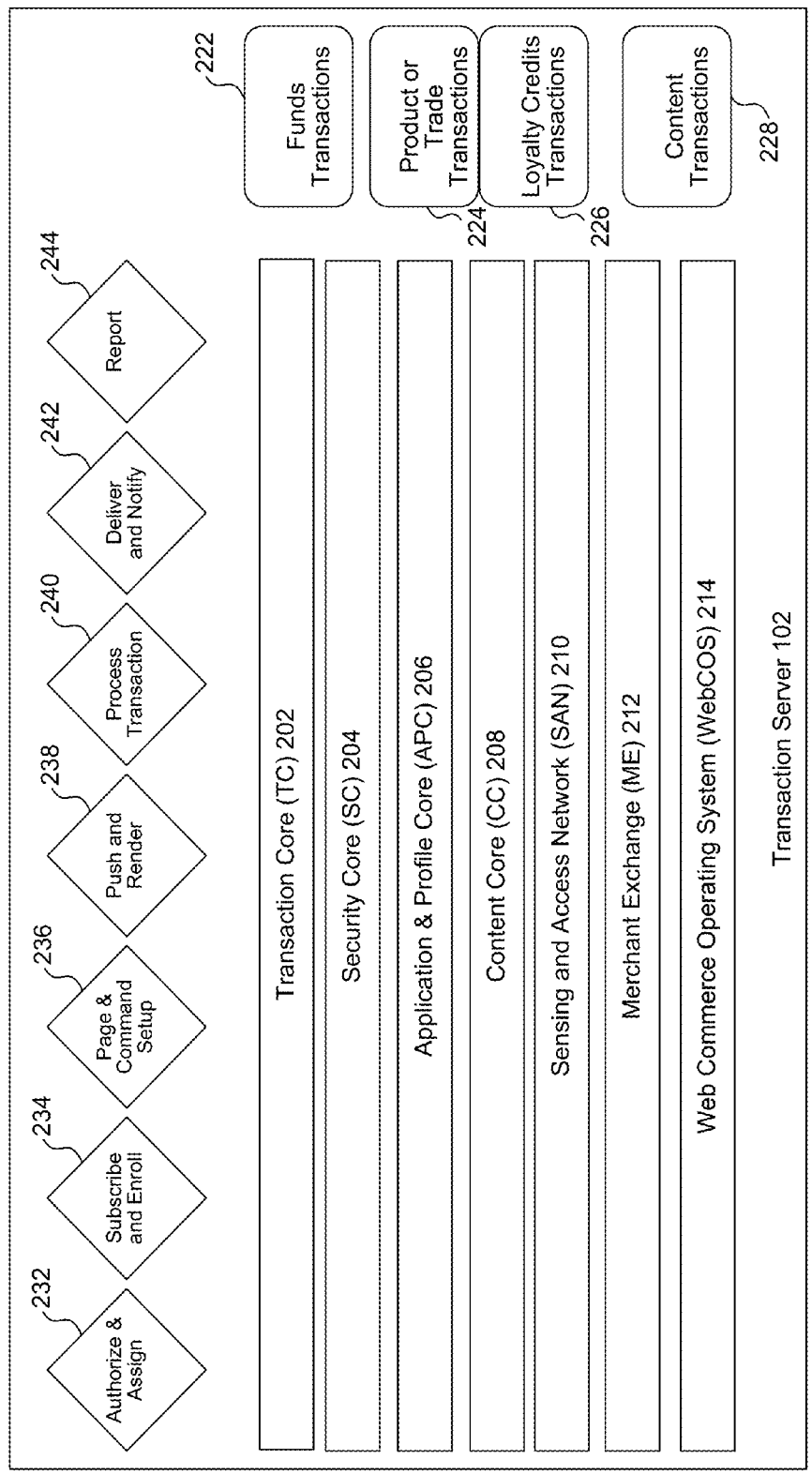
Figure 2B:
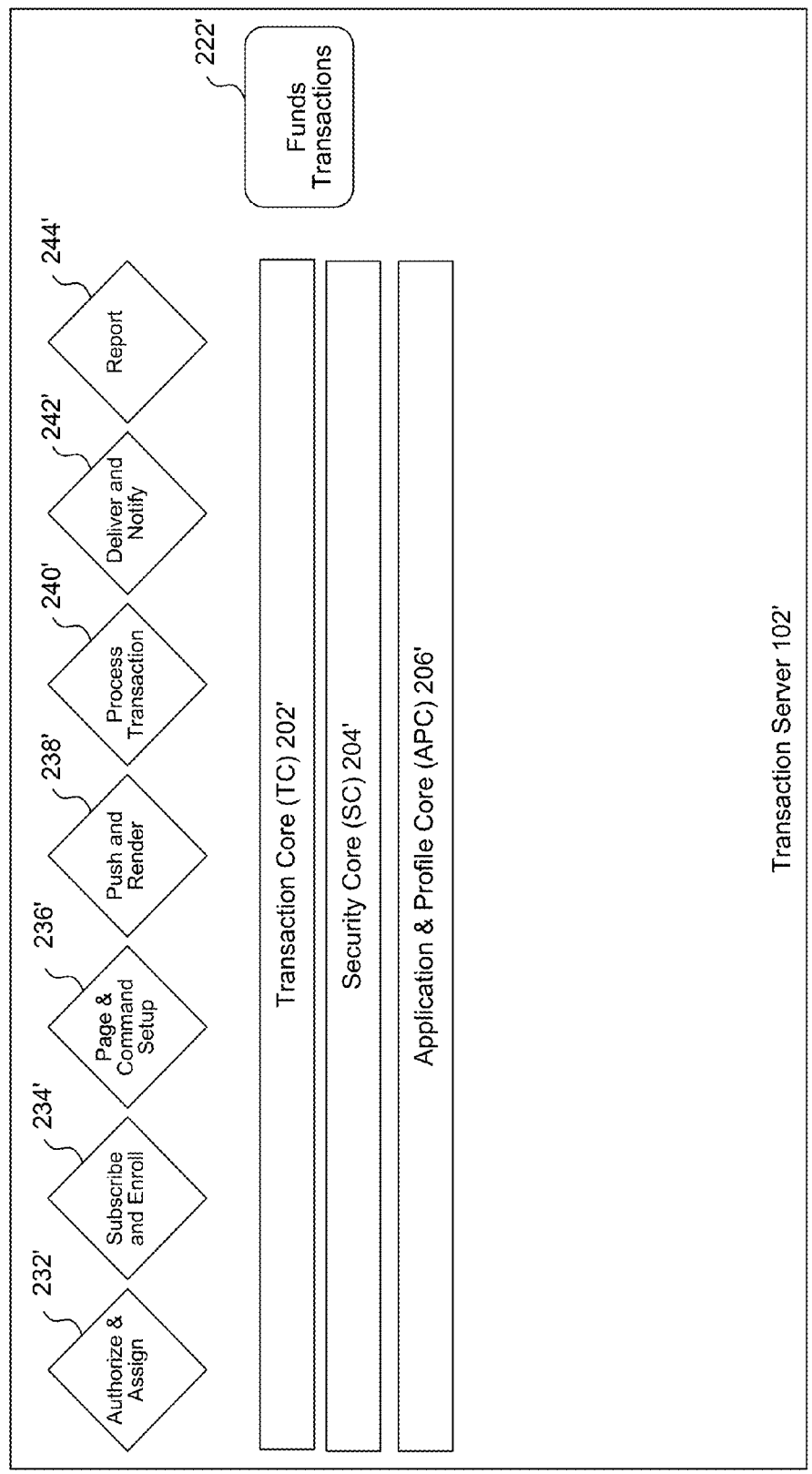

FIGS. 2A and 2B illustrate components of a transaction server 102 and 102', respectively, in accordance with some embodiments of the present invention.

As illustrated in FIG. 2A, transaction server 102 includes a transaction core 202, a security core 204, an application and profile core 206, a content core 208, a sensing and access network core 210, a merchant exchange 212, and a WebCOS 214. In some embodiments, transaction server 102 may include combinations of 202-214 other than the illustrated combination, or may not require all of the illustrated cores 202-214.

Transaction server 102, using one or more of the modules 202-214, performs one or more of the transaction types, such as, but not limited to, funds transactions 222, product or service transaction 224, loyalty credits transactions 226, content transactions 228, or transactions involving a combination of 222-228.

Funds transactions 222 include a deposit or withdrawal of a quantity of money (an amount of money) into, or from, a delivery instrument such as, an online money account or other financial account. Product or service transactions 224 include any transaction to purchase a product or service, and may involve one or more delivery instruments such as an online money account or money equivalent account of a user or other financial account associated with a merchant. Loyalty credits transactions 226 include any transaction that involves the transfer of a money equivalent such as loyalty credits. Content transactions 228 involve the transfer of content to or from a user, and may involve one or more of a money account, money equivalent account, other financial account, or a content account.

Transaction server 102 may also include operations, such as, but not limited to, a user authorization and assignment operation 232, a subscribe and enroll operation 234, a page and command setup operation 236, a push and render operation 238, process transaction operation 240, a deliver operation 242, and a reporting operation 244.

User authorization and assignment operation 232 includes authorizing a user seeking to access transaction server 102, and associating the user with a user access device and one or more delivery instruments on the transaction server. User authorization may include validating the user identity and the user access device used by the user to access the transaction server 102. In user authorization, the unique identifier of the user and/or the unique identifier of the user access device may be associated with each other and may be matched with known geographic information regarding the current location of the user access device. User authorization may also include a security challenge, such as, requiring the user to enter a PIN or a response to a security question. Other techniques to authenticate the identity of the user, such as voice and biometric techniques can also be used in addition to, or alternatively to, the authorizing techniques noted above.

Subscribe and enroll operation 234 includes functions to enable the user to subscribe to various facilities offered by users on the transaction server 102, and to enroll the user's financial instruments, money equivalent instruments, and content instruments on the transaction server 102. A user subscribes to system 120 typically through a series of web, Wireless Application Protocol (WAP), Unstructured Supplementary Service Data (USSD), Extensible Markup language—XML or SMS-based prompts. Subscription to the facilities on the transaction server may include, but is not limited to, setting up new accounts with one or more merchants or financial institutions on the transaction server. Enrolling the user's financial instruments, money equivalent instruments, and content instruments on the transaction server 102 may include, but are not limited to, setting up accounts associated with the user's credit cards, debit cards, accounts with merchants, and accounts with content providers.

Page and command setup operation 236 includes functions to setup and configure user interfaces, such as web pages, for users of the transaction server. For example, a web page or other user interface for a merchant may be configured with the merchant logo, user selectable product and service offerings, and purchase options (e.g. payment instrument options). Associated with each web page, would be the underlying program code to initiate corresponding transactions on transaction server in response to user input upon the web page. A web page or other user interface for a direct user can be customized for the particular types of user access devices. Direct users may have web pages configured so as to enable easy access to the financial instruments and content instruments the direct user has available on the transaction server.

Push and render operation 238 includes functions to push content from the transaction server to the user access devices and to render the content in accordance with configured user interfaces on the user access devices. For example, the transaction server may determine a list of product offerings currently available at a merchant and transmit that list using HTTP push or like technology to one or more user access devices, to be displayed to the user on those devices. The user's entering a sensing zone can also trigger a push and render operation 238 or skip such an interface and directly perform an automated transaction the transaction server.

Process transaction operation 240 includes functions to initiate and process a transaction to completion. Processing a transaction includes receiving requests for transaction, initiating authorization of the request, interacting with the requestor and other parties of the transaction to determine the transaction item(s) and quantities, and completion of the transactions.

Deliver and notify operation 242 includes functions to facilitate the delivery of the product or service associated with a transaction, and notify parties to the transaction regarding the delivery. Deliver operation 242 may also include functions to deliver digital content associated with content transactions. Deliver operation 242 may include delivering content, products, user to user trade agreements, stock or investment transaction, funding transfers, and any other transaction items that may be configured to the transaction server. Fulfillment of transactions can be configured to be immediate, automated (to be automatically executed by receiver at the receivers chosen timeframe) or delayed based on a pre-defined scheduled time for the transaction to execute.

Reporting operation 244 includes functions to report on transactions. Reporting includes realtime or near-realtime display of transaction metadata, writing metatag data into the transaction itself capturing sensing and other unique transaction environment details, writing logs including analytics and metatag data at the transaction server for each transaction, and reporting completion of respective transactions to the parties to the transaction. This may also include realtime changes being made to the transaction details by, for example, encoding aspects of the metatags and/or analytics in the unique identifier of the transaction. The reporting of transaction status to a user may include transmitting a short messaging service (SMS) message to the corresponding user access device, or displaying a realtime updated data visualization aggregate view of the users multiple transaction activities. The near realtime updated data visualization aggregated view may be updated based upon metatags and analytics that are instantaneously included in the respective information related to any of the user's current transactions.

FIG. 2B illustrates transaction server 102' in accordance with an embodiment. Transaction server 102' includes a transaction core 202', a security core 204' and an application and profile core 206'. The respective functionalities of transaction core 202', security core 204' and application and profile core 206' are similar to that of the transaction core 202, security core 204, and application and profile core 206', but may not include support for the additional cores and types of transactions illustrated in FIG. 2A that are not illustrated in FIG. 2B. Funds transactions 222' may operate similarly to funds transactions 222 described above. Operations 232', 234', 236', 238', 240' 242' and 244' may all operate in a similar manner respectively to operations 232, 234, 236, 238, 240, 242, and 242, as described above, but may not include any functionality associated with transactions other than funds transactions 222'.

Figure 3:
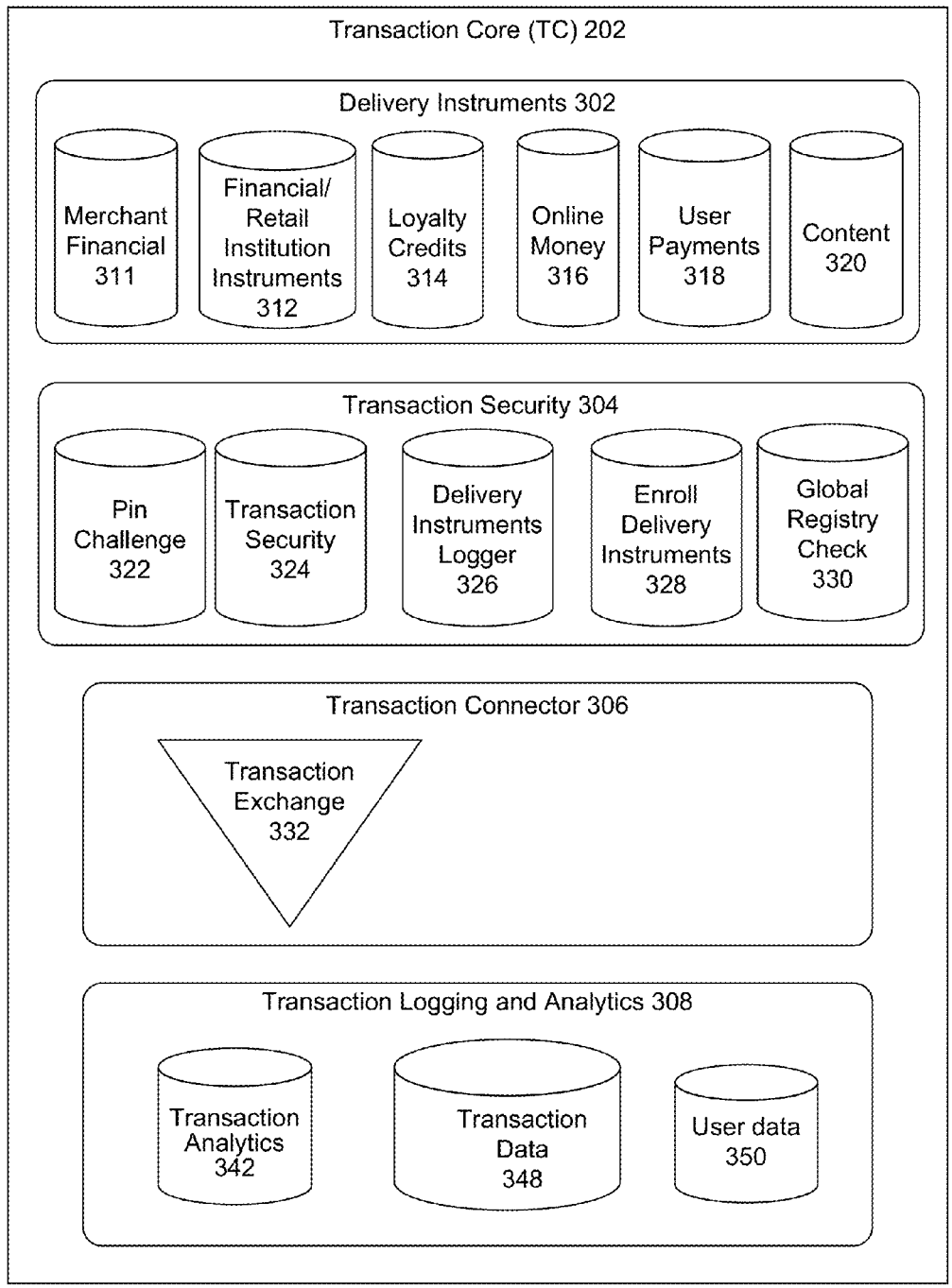
FIG. 3 illustrates a transaction core, in accordance with an embodiment of the present invention.

FIG. 3 illustrates a transaction core 202, in accordance with an embodiment of the present invention. Transaction core 202 operates to enable system 100 to perform one or more transactions, such as, transactions 222-228.

Transaction core 202 operates as the engine for transaction processing in transaction server 102. Activities within system 100 initiated by users or the system are logged by the transaction core 202. Transaction core 202 processes all uniquely identified transactions in system 100. Transaction core 202 operates in concert with the security core 204 to ensure that no transactions complete without fulfilling two key requirements: an authorized user (e.g. the unique identifier of the user is active) and a completed transaction (e.g. all required steps of a transaction to complete are entered successfully by the user). Transaction core 202 maintains records indicating the exact date and time of each transaction, the associated user's unique identifier, which is used to relate the transaction core 202 record with a user's profile data, and the specifics of the transaction, including the from, to, associated delivery instruments, and notification choices made by the user. Transaction core 202 data records show the activity triggered by each transaction in system 100.

Transaction core 202 can include delivery instruments 302, a transaction security module 304, a transaction connector module 306, and transaction logging and analytics module 308.

Each delivery instrument 302 is an account associated with a user of system 100, and enables transfers (e.g., withdrawal or deposits) of one or more transaction items out of or into the account. The transfer may be of a determined quantity of a particular transaction item. As noted above, the transaction item may include, but is not limited to, money, money equivalent, product or service, or content. Delivery instruments 302 can include, for example, one or more of merchant financial instruments 311, financial/retail institution instruments 312, loyalty credit instruments 314, user money account instruments 316, user payment instruments 318, and a content delivery instrument 320.

Merchant financial instruments 311 include accounts for merchants. Examples include accounts enrolled on the transaction server for merchants such as, but not limited to, retail food and refreshments outlets, parking vendors, concert or sports stadium venues, gas stations, toll operators, other physical and online retail stores, and other merchants and vendors.

Financial/retail institution instruments 312 include accounts associated with financial or retail institutions. They include bank accounts, credit card accounts, stock accounts, debit card accounts, gift card providers, and other types of delivery instruments (e.g. accounts) at financial institutions.

Loyalty credits instruments 314 include, but are not limited to, merchant loyalty credits accounts (e.g. store points), airline miles accounts, and hotel rewards points accounts. Loyalty credits, are herein sometimes referred to as money equivalents reflecting an aspect of system 100 which enables a user to pay all or a portion of a cost of a purchase using loyalty credits.

Online money account instruments 316 include accounts which holds the value of any money or money equivalents that the user has transferred to a particular entity associated with the online money account. In an embodiment, the online money account instruments 316 of a user A includes the value of any money amount transferred by user A from any of the merchant financial/retail instruments 312 or loyalty credit instrument 314. The online money account instruments 316 may also include any funds or money equivalents transferred by third-parties to the entity associated with the user money account.

User payment instruments 318 include accounts on the transaction server associated with users that the users can use for making payments for product or services purchases, content purchases, and transfers to other parties such as other direct users. Example user payment instruments 318 include a user's credit card accounts, user debit card accounts, user bank accounts, user gift card accounts, and the like. When a user makes a payment using system 100, an amount of money or money equivalent is withdrawn from the user's online money account or user payment instruments 318.

Content delivery instruments 320 include content accounts that serve as content repositories for the content providers and direct users. The content delivery instrument 320 associated with a first user, for example, can be used to make a copy of, or move, a digital content owned by the first user to the content delivery account 320 of the second user. Content delivery instruments 320 can be encrypted or otherwise safeguarded when being transmitted to/from the destination locations.

Transaction security 304 can include personal identification number (PIN) challenge operation 322, a transaction security operation 324, a delivery instrument logger 326, enroll delivery instruments 328, and global registry check 330.

PIN challenge operation 322 includes data and functions for generating respective security challenges, transmitting the security challenges to user access devices, and comparing the received responses to the corresponding security challenge.

Transaction security operation 324 includes data and functions of transaction core 202, which together with components of security core 204 ensure the security of transactions performed on transaction server 102. Transaction security operations 322 includes transaction core 202 data and functions to keep track of, and associate, unique identifiers associated with transactions, users, and user access devices. Transaction security operations 322 may also monitor transaction and/or user logs to detect potentially fraudulent activity.

Delivery instrument logger 326 includes the data and functions to maintain information associated with each of the delivery instruments. The configurations and changes to configurations to any delivery instrument are maintained by delivery instrument logger 326.

Enroll delivery instrument operations 328 includes the data and functions to enroll a user's payment instruments. For example, a user may enroll one or more credit cards, debit cards, gift cards, merchant loyalty rewards cards, bank accounts, and other payment instruments using enroll payment instrument operations 328. Enroll delivery instrument operations 328, in one embodiment, enables the user to manually enter the information associated with each payment instrument. In another embodiment, a photograph or scanned image of a check or credit card may be used to automatically extract all or some of the necessary information associated with a payment instrument in order to enroll that payment instrument in system 100. The photograph or scanned image can, for example, be captured using a camera-equipped user access device and the required information from the image may be captured either in the user access device or at the transaction server. In another embodiment, a user may request a call to a Speech IVR (automated speech telephone user interface) to enter the check or credit card data.

Global registry check 330 includes data and functions needed for the transaction server 102 to check one or more global unique identifier registries for the current status of users and/or user access devices. Global registry check 330, in some embodiments, in cooperation with security core 204, maintains the mappings from the unique identifiers of users and user access devices used in system 100, to the corresponding identifiers in one or more global registries.

Transaction connector 306 includes a transaction exchange 332. Transaction exchange 332 enables the transaction core 202 to communicate with merchants, financial institutions, and other organizations. In some embodiments, transaction exchange 332 may interact with merchant exchange or content exchange in order to communicate with particular merchants or content providers. The communications with merchants, for example, may be for communicating user payments and orders for products and services. Additionally, transaction exchange 332 provides for the transaction core 202 and other components of transaction server 102 to interact with the merchant's databases and systems in order to determine the merchant's product offerings, current availability information, and suggestions for purchase and the like.

Transaction logging and analytics module 308 may include transaction logging and analytics 342. A transaction log 348 may be maintained, in which transaction details are logged including, for each transaction, the transaction unique identifier, date, time, transaction to/from information, and associated user and user device information. Transaction analytics 342 may include analytics for each transaction or selected transactions. Transaction analytics include the tags, metatags, keywords and associated unique identifiers of transacted content, money, financial or other relevant data to show a merchant how and when transactions developed into large aggregate volumes of transactions. Each log record may have associated tags in accordance with the transaction features (e.g., parties to the transactions, products or services transacted, etc.). Transaction analytics 342 includes the functionality to enhance log records by associating metatags (e.g., tags related to tags already in the record) in accordance with previous log entries for the user, and for other users. Enhancing the log record with metatags enables system 100 to be more flexible in its analysis of a user's preferences, and helps system 100, for example, to "suggest" various products or services to the user. For example, a transaction log record for the purchase of a coffee is likely to contain the tag "coffee." When metatags are associated to that tag for a particular user, the term "chocolate cupcake" may be associated with "coffee" as a metatag. This association would enable system 100 to suggest, to a user in the process of purchasing a coffee, that the same merchant (e.g., inside the sensed area) or a nearby merchant (e.g. in proximity, but outside the sensed area) offers chocolate cupcakes.

Transaction logging and analytics module 308 includes configuration of user profiles 350. User profiles 350 include profiles for users of system 100. Profiles 350 can be maintained users, such as individual users or subscribers, merchants, financial institutions, organizations, and any other entity that uses the services of system 100. In profiles 350, required data such as the last 4 digits of a credit card to identify user profile data necessary to perform actions may be stored, but may also hide or encrypt critical user financial data as required by various laws and regulations, such as, for example, various compliance rules.

Transaction processing module 308 further includes in 350 the user's key life choices and preferences such as preferred airline for traveling or preferred ethnic food type are captured in the transaction core 202 to allow realtime matching of 'suggest' requests by the users with, for example, sensing zone offers provided by merchants in a customer-specific way. These settings can include financial, travel, food/beverage, social network and romance categories.

Figure 4A:
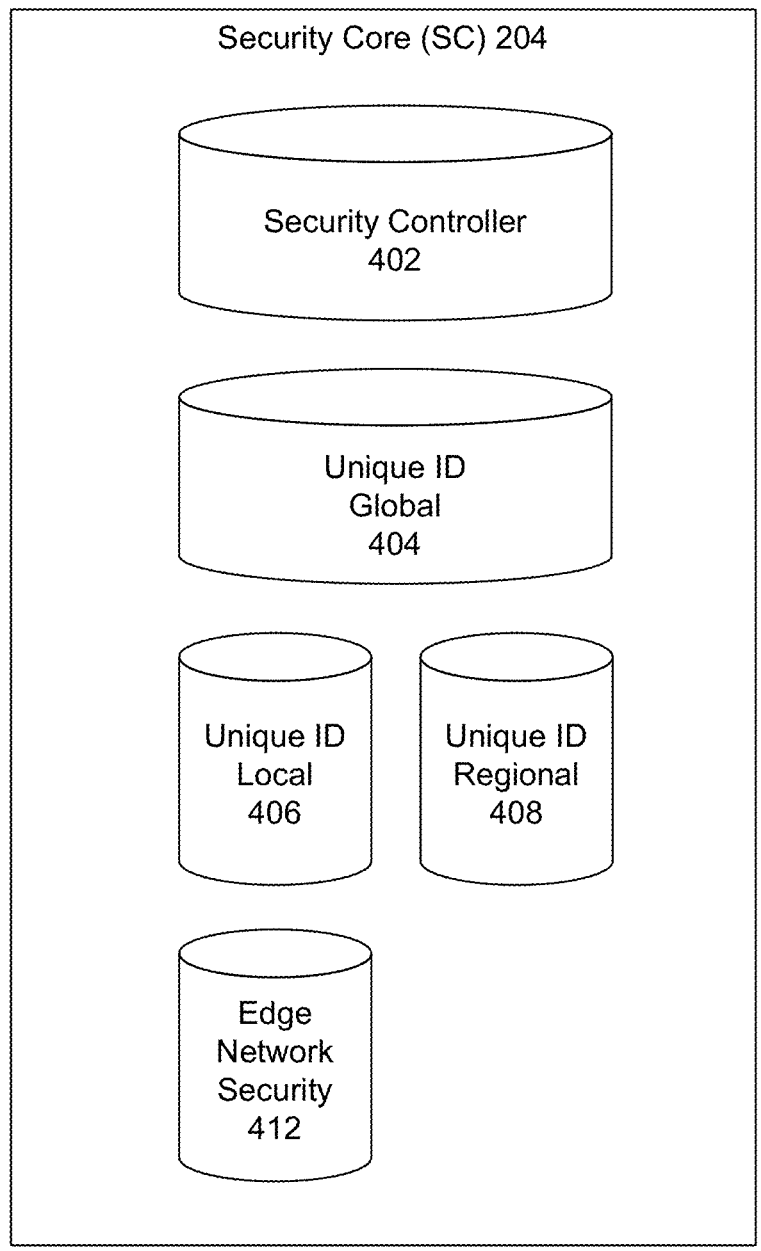
FIG. 4A illustrates a security core, in accordance with an embodiment of the present invention.

FIG. 4A illustrates a security core 204, in accordance with an embodiment of the present invention. Security core 204 operates to identify, authenticate and authorize users, user access devices which access the transaction server, and transactions. Security core 204 can include a security controller 402. Security controller 402 operates to have each user authorized and each transaction is uniquely identified and tracked. In an embodiment, the transaction server 102 authenticates using a unique identifier named Digital Intelligent Tracking Number referred to herein as "Ditnum", which is an alphanumeric identifier used by the transaction server 102 and other components of system 100 to uniquely identify (1) each user, (2) each device, and (3) each transaction. In some embodiments, a unique identifier is also used to uniquely identify each digital item purchased and/or transferred using system 100.

Various markers can be used as means for creating unique identifiers for identification. In an embodiment, system 100 associates the user access device (e.g., the user's cell phone number or IP address) associated with the user with a unique identifier. When associated with a user access device, the unique identifier is embedded in that device. The embedded unique identifier may be stored in an encrypted form on the user's device.

According to an embodiment, the unique identifier is a number that has embedded logic in the configuration of the alphanumeric digits based on digit location providing information about the kind of transaction it is (such as, a '001' in first three digits indicates its a US based transaction). For unique identifiers for transactions, another code in the unique identifier may encode the account information. The unique identifier can also include amounts of the transaction and the destination for the funds. The embedded context (e.g. particulars about the specific transaction) in the unique identifier enables the use of the unique identifier to validate the transaction. Moreover, in some embodiments, the unique identifiers for users, user access devices, and transactions are configured to reflect the association between them. The association embedded in the respective identifiers can be utilized to efficiently disable and re-enable a user's transaction facilities.

According to an embodiment, a unique identifier for a transaction includes a transaction to location, a transaction from location, byte offset of content to location, byte offset of content to location, one or more randomly distributed floating digits which are embedded in the unique identifier as a security mechanism, amount of the transaction, bank code (e.g. SWIFT code) for the transaction, a code representing realtime conditions of user and user access device originating the transaction (e.g. geographic location, date and time, etc.), a reset interval for the unique identifier, type of transaction, and a code indicating the physical device on which the unique identifier was originated.

Once the user's unique identifier is established, the user can be recognized by the system 100 upon the user's reconnection to the system. When the user participates in a transaction, the transaction is also assigned a unique identifier, where that unique identifier is in part based on the user's unique identifier.

Security core 204 may also include a unique identifier global registry 404, a unique identifier regional registry 408, and a unique identifier local registry 406. Unique identifier registries 404, 406 and 408 operate to generate, maintain and keep track of the unique identifiers. Registries 404, 406 and 408 securely maintain the unique identifiers for system 100. The registries can be maintained within the transaction server 102, or separately connected by transport network 108 to the rest of system 100. According to another embodiment, one or more of registries 404, 406 and 408 are maintained by a third party entity separate from the entity that operates the transaction server 102. Security controller 402 includes operations to perform updates on registries 404, 406, and 408, in order to keep the registries consistent with each other. Additionally, security controller 402 may operate to access a global unique identifier registry maintained by a third-party to determine the current status of a user of system 100. For example, security controller 402 may operate to determine the status of one or more users listed in one or more of the registries 404, 406, or 408 against a registry maintained by a third party.

Various parties can become subscribers or users of system 100, and security core 204 can recognize their activities and preferences in participating in transactions through system 100. Security core 204 interacts with user access devices to determine the access device being used for connectivity. In some cases, more than one access device may be available to the user and security core 204 provides a means for permitting the user to choose a device for connection. In general, access devices may become known to security core 204 through known techniques. Security core 204 determines the proximity of one access device to another through known techniques as well. By combining proximity of devices and users being connected through access devices, Security core 204 comes to know which users are proximal to which access devices and which access devices are proximal to which other access device, thereby coming to understand users proximal to one another.

Each user is allocated a unique identifier ("user identification code" or "unique user identifier") and each transaction is allocated its own unique identifier ("transaction identification code" or "unique transaction identifier"). Each user access device is also allocated its own unique identifier ("device identification code" or "unique device identifier"). The transaction identification code incorporates the applicable user identification code in a secure way, where said combined code may typically be assembled and decrypted only by security core 204. The user identification code is authorized and authenticated by a unique identifier registry (e.g., one or more of registries 404-408). The registry can be used for providing real time fraud prevention and user activity tracking. This registry may be mirrored so unique identifiers are represented in multiple registries. A unique identifier marked as 'deactivated' will cause system 100 to prevent a user from using that unique identifier or having access to system 100 and proactively prevent that user from re-entering system 100. A unique identifier identified as 'activated' results in system 100 allowing the user ongoing access to system 100. Each content item or content stream, file, transaction, application, etc. is allocated a unique identifier. The unique identifier is also associated with (although is not necessarily associated with) the user's means of access. For example, the specialized software may recognize the source of an inquiry and recognize a user's telephone/cell number, email address, IP address, MSISDN—Mobile Subscriber Integrated Services Digital Network Number of cell, IMEI Cellnum, MAC address of computing device and/or a parameter previously identifies as associated with the user, as a means for identifying the user. This level of detail provides a fraud resistant way to operate wireless commerce based transactions. In the event that the software platform is unfamiliar with the unique identifier of the means of access, the software platform has the ability to query the user via any of several means, such as by but not limited to call, text, or email. Security core 204 and its registry elements may be a distributed directory of Ditnum registered transaction data.

Unique ID Global Registry 404 may be operated by third parties, such that control over registries and user access invoking and revoking capability similar to a Domain Name Service (DNS) handled by the IANA registry. This global registry enables realtime generation of security certificates necessary to manage a master registry for unique identifiers in system 100 and gives registry agents the right to revoke a unique identifier by cutting off its access to system 100. Typically these rights are hierarchical and include global— (highest level), regional (given to a physical geography region), router (given to a particular network element), and file based registries (at the content or stream level).

Additionally, Security core 204 may include further security features that may be implemented by users, which requires entry of a "passcode", voice authentication or operation verification also tracked by the security core 204 which is known to the user and encrypted for delivery to security core 204.

Moreover, security core 204 can include an edge network security module 412.

Edge network security module 412 may operate to facilitate unique identifier based file tagging. For example, when a unique identifier is encoded and/or embedded in a file, content stream, on a device or in other locations on web/social media sites, a network device in the edge network may authenticate the unique identifier before allowing the request to proceed to system 100.

Security core 204 includes functionality to revoke user access and user device access. For example, based upon the respective unique identifiers, the registries can be searched to determine the status of a particular user or user access device. Alternatively, in some embodiments, a separate black list of users and/or user access devices can be maintained. The status of the user and user access device can be verified before each transaction is authorized to proceed. The registry allows a single switch cut deactivation of that use to include deactivating access on all devices users might use to access the system 100 in the future.

Security core 204 may operate to provide authentication and confidentiality to facilitate the secure transfer of funds from user accounts to or from merchant accounts without directly identifying the user account to the user's device or merchant, secure transfer of funds between accounts of different user, secure transfer of funds between gift cards and users, secure transfer of funds between bank accounts, including credit and debit card accounts, and users. Other secure transfers may include secure transfer of digital items such as ringtones, movies, etc. and ensure that the artist rights are protected in such a transfer. Facilitate secure delivery of purchased merchandise, either by digital delivery, shipping or in-person.

The authentication is aided by knowing of each user individually by association with a particular device or connection, and by maintaining knowledge of financial vehicles associated with each user which have been identified by the user (such as credit cards), and by maintaining historical knowledge of financial vehicles associated with each user which have been identified by the user (such as credit cards).

Figure 4B:
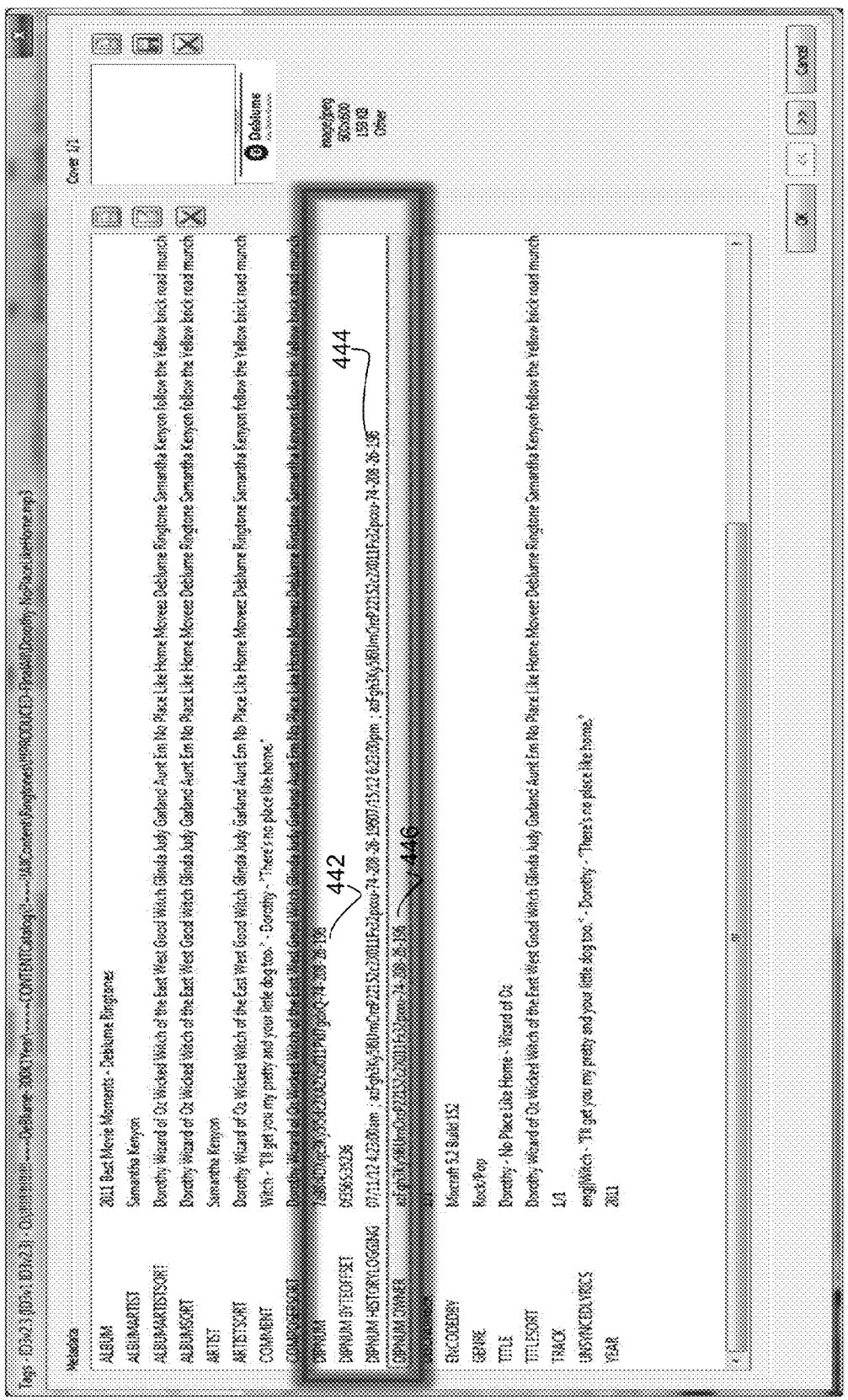
FIG. 4B illustrates a use of a unique identifier, in accordance with an embodiment of the present invention.

FIG. 4B illustrates an exemplary use of a unique identifier in a transaction. The exemplary transaction is a purchase of digital music content. Item 442 illustrates the exemplary unique identifier assigned to the particular item of digital music. Item 446 illustrates the exemplary unique identifier assigned to the user. Item 446 illustrates an exemplary history of activities related to the transaction. For example, item 444 indicates that the same unique user identifier accessed the digital music item twice. History tracking similar to 444 can be used to track the history of a content item and all users using that content item by date, time and geographic area.

Figure 4C:
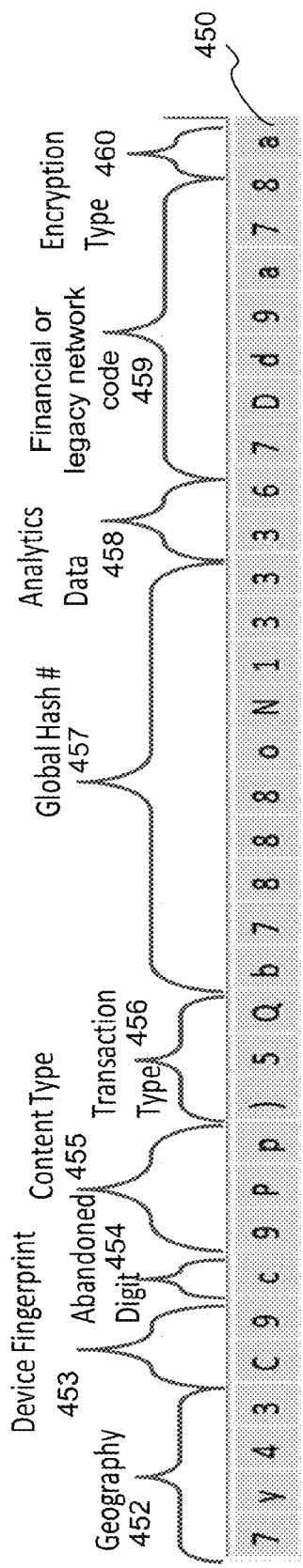
FIG. 4C illustrates an exemplary unique identifier, in accordance with an embodiment of the present invention.

FIG. 4C illustrates an exemplary unique identifier 450 generated by system 100, in accordance with an embodiment. Character sequence 452 represents the geography of the user and user access device. It also represents the geographic location of a sensing area if the user is within or in proximity to one. Character sequence 453 represents a device fingerprint for the user access device. The device fingerprint can be formed based upon the physical conditions of the user device (e.g. location) and the sensing area, if the user is within one. Character sequence 454 represents an "abandoned digit". The location of the abandoned digit in unique identifier 450 may change based on an algorithm recognizing an element in the digit string to suggest (e.g., based on the device fingerprint 453) where to look for the abandoned character. Character sequence 455 encodes the transaction item type or content type. Character sequence 456 encodes the transaction type. Character sequence 457 encodes an embedded logic for differentiating unique identifiers generated by transaction server 102 to be unique and hard to crack. Character sequence 458 encodes the analytics associated with the unique identifier 450. Character sequence 459 encodes a transaction entity code, such as a SWIFT code or other proprietary financial network coding. Character sequence 460 encodes the encryption type used (if any).

The unique identifier 450 is a digital transaction number which encodes information about the user (such as device types uses, geography, birthdate/demographic data, customer quality type (new, intermediate of advanced buyer), a financial legacy network code # (such as swift code for banking), the encryption type if encryption was used to generate the unique identifier, and a hash that that is hard to duplicate. The hash algorithm that generates the hash also serves as a way to anchor and extract from the unique identifier, or the hash, key details such as customer type (male/female, birthdate, cellphone number, etc.) that can be used if necessary to uniquely identify a person represented by the user of system 100 for fraud detection purposes.

Unique identifiers in system 100 may evolve over the time the user, user device or transaction is in system 100. For example, the more a person travels (executing transactions) the more trusted the corresponding unique identifier becomes in system 100 and the more features the person has access to (higher dollar sending limits, more features for product selection). The unique identifier can also make it possible to move more quickly into and out of the sensing zones. A strong trusted user having a unique identifier may perhaps not even have to click a button to execute an automated transaction at a gas station, through a toll or at their favorite coffee shop in order to complete a transaction.

The unique identifier can be used in combination with user choices and the analytics in system 100. For example, the analytics field 458 can encode information regarding a user's purchase and payment behavior based on past performance in a manner that may be helpful to merchants.

Figure 5:
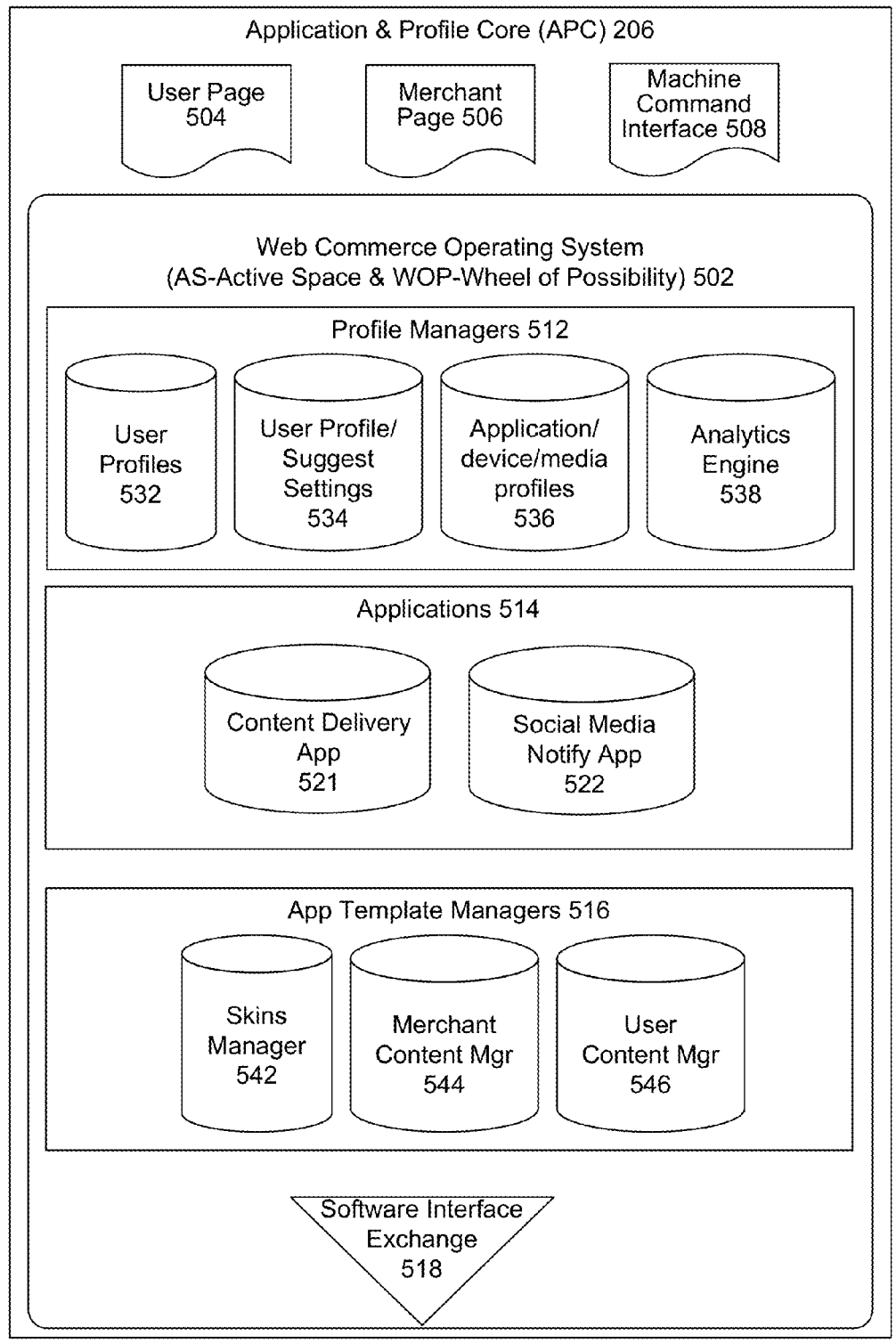
FIG. 5 illustrates an application and profile core, in accordance with an embodiment of the present invention.

FIG. 5 illustrates an application and profile core 206, in accordance with an embodiment of the present invention. Application and profile core 206 operates to perform several functions in support of operations of the transaction core 202.

Application and profile core 206 includes a user web page module 504, a merchant web page module 506, a machine command interface 508, and Active Space and Wheel of Possibility modules 502.

Active Space and Wheel of Possibility modules 502 include profile managers 512, applications 514, application template managers 516, and a software programming interface exchange 518. Applications 514 include, a content delivery application 521, and a social media notify application 522.

Content delivery application 520 may include several applications. In an alternative file transfer, delivery and management technique that enables the creation of on the fly file storage, permit mobile to cloud storage management and collaborate with others in a way that makes the file transfer both faster and easier than current methods. The alternative file transfer technique may be used in processing content transactions.

Social media notify application 522 may include operations to notify one or more social media accounts of the user, of the user's transaction activities in transaction server 102.

In addition to the above, other applications (not shown) may be available in the Another application may be content shuffling, and automatic content purchase and management application that allows the user to opt in to a merchants ongoing new releases and allow such content to be pre-populated into locations (such as a ringtone directory on a smartphone).

Profile managers 512 include user profiles 532, user profile and suggestions settings 534, application and media profiles 536, and an analytics engine 538. User profile manager 532 operates to manage the collection of data for user profiles. For example, the user behavior patterns including purchases, money transfers, etc. may be collected as profile information. For each user, the profile may grow as the user's presence in system 100 increases and system 100 collects more information about the user's behavior and preferences.

User profile/suggest settings manager 534 operates to determine the user preferences in various identified times and locations. User profile/suggest settings manager 534 can, based upon profile information, for example, determine the user's preferences regarding a morning coffee, and can suggest other purchases from nearby merchants that are consistent with the determined preferences.

Application and media profile manager 536 operates to configure and maintain user configurations regarding applications 514. For example, application and media profile manager 536 may obtain, configure and maintain the settings for managing social media notify application 522 for one or more users of system 100.

Analytics engine profile manager 538 operates to configure the analytics engine for each user of the system. The analytics engine configurations can include configurations to control the association of metatags with transaction logs of a user, transaction log information, and the like.

App template managers 514 include a skins manager 542, a merchant content manager 544, a user content manager 546, and a command language manager 548. Each one of the modules 542-548 provides a template for configuring a particular type of application. Skins manager 542 includes the functions to enable a merchant of other user to re-brand a generic interface (e.g. web interface) with the merchant's own information. Merchant content manager 544 includes templates which merchants can quickly generate merchant interfaces. User content manager 546 may include a "buy button." This is a web or wireless enabling application or HTML/XML code snippet that allows a user to put a buy button on their own website or cellphone and provide a smaller scale version of the system 100 "Buy" capabilities. The functionality of this button provides that users may 'drag and drop' this buy button to their webpage and the system automatically configures a web page to put a system 100 buy button in that location.

Software interface exchange 518 is a collection of third party program interface that either enable entry to system 100 or enable system 100 entries into the third party's system. For example there may be a merchant interface to allow system 100 to push daily, weekly or monthly transaction data to the merchant.

Figure 6:
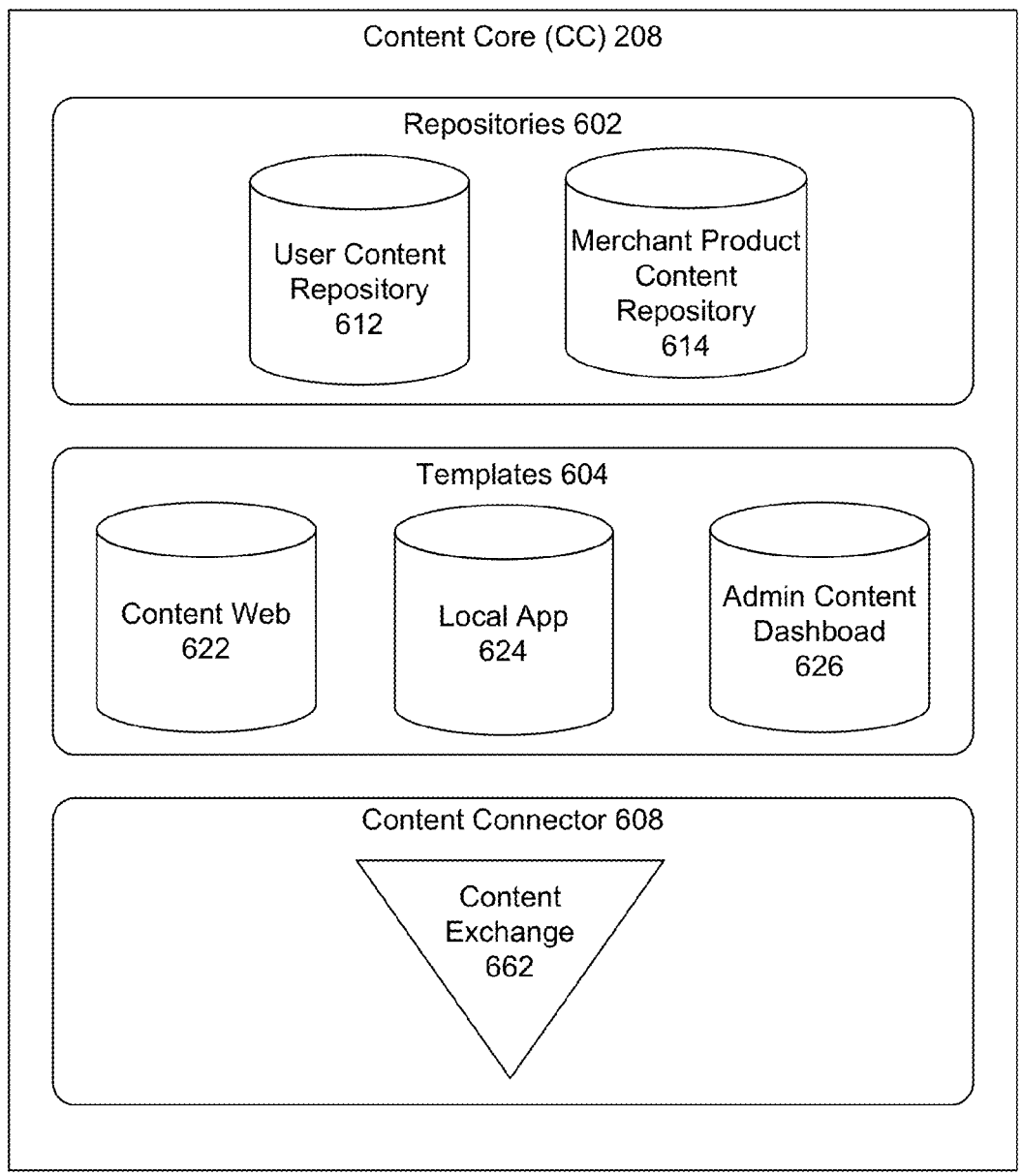
FIG. 6 illustrates a content core, in accordance with an embodiment of the present invention.

FIG. 6 illustrates a content core 208, in accordance with an embodiment of the present invention. Content core 208 operates to facilitate transactions that include the transfer of content from one user to another, or between delivery instruments of a particular user.

Content core 208 includes repositories 602, templates 604, and content connector 608.

Content core 208 operates as the content repository for system 100. Content core 208 serves as an intermediary content repository and delivery vehicle for content transactions whether the transactions are user initiated or automatic. Content core 208 can include multiple kinds of digital content including, but not limited to, music (e.g. .wav, .mp3), movies (e.g. .mp4), applications (e.g. .cab, .exe, .jav), text, (e.g. electronic books) and games (.gam). This facilitates on site content or digital products purchasing. Content items may be identified with their own unique identifier (i.e., unique content identifier). Content core 208 may be configured to periodically obtain and analyze information regarding a user and the user's communications device. Once content core 208 recognizes a user's locale, other activities in that locale, and/or user preferences, content core 208 can "match" the user preferences to the user and provide the user with customized content for consideration or purchase. Content core 208 also maintains data regarding a user, such as maintaining a registry of user preferences, directly available funds, and additional or alternative sources of funds.

Content core 208 may continuously monitor geolocation data or other comparable data and self-generate web-based or similar searches for determining commonality in locale and purchase interests between subscribing parties. For example, if a user previously purchased music of a particular artist, the artist is performing at a venue, and the user is also at the venue, Content core 208 can assemble additional music and artist related products (such as other music, clothing, posters, etc.) and present the items to the user. Similarly, if the user purchases music at regular venues such as at a coffee shop, customized music offering can be delivered based on the user's current geolocation being a coffee shop. The user can "purchase" the items on her/his cell phone by using Content core 208 and collect the items later at the event, have the items shipped to the user, or if available as a download may be downloaded to the user's device, to an intermediary device, or tagged for user permitted access at the intermediary device. Although content core 208 operates primarily on a server remote from the user's device and the user's device communicates with the server over the internet (typically using some combination of wired and mobile technologies), content core 208 may appear on a user's device as a downloaded application or may include a downloaded application with functionality. For each user, the content core 208 contains a location registry, maintained as current by use of the user's embedded geolocation information, and financial information, such as the value in the user's "core" account or credit card data.

Purchases may be made in various ways. The user can choose products to purchase based on the "push" menu provided. In an alternative, the user can have the option of "scanning" a scannable code at or near a product which facilitates purchase. In such a scenario, the merchant may have their own access and, upon a scan by the user, the merchant may receive an acknowledgement of payment (and payment may be sent from the user's account to the merchant's account on transaction server 102).

Content core 208 may also manage multi-digit alphanumeric codes generated from software vendors representing commerce purchases and provide end to end reconciliation, tracking, financial details, analytics, etc.

Repositories 602 can include a user content repository 612 and a merchant product content repository 614. User content repository 612 is a repository where a user can maintain various digital content on system 100. Merchant product content repository 614 enables a merchant to maintain a content repository on system 100 to be used on commerce activity. The content repository may be configured to be merchant-specific.

Templates 604 can include templates for content web 622, local apps 624, and for admin content dashboard 626. Content dashboard 626 allows a business analytics and transaction success rate dashboard for managing the rate or timeframes of purchase of certain content items. Content dashboard 626 provides analytics so merchants can review and report on daily, weekly, quarterly or yearly activities within system 100 to a very granular level of data detail. The analytics can also permit business intelligence reporting, digital supply chain reporting, social network marketing campaign results or other forms of metatag and Web based data analytics. Templates for content web 622 enable creation of custom web or wireless user interface screens. Pre-defined web content templates may be used by merchants and other parties interacting with transaction server 102. Local application templates 624 include templates using which merchants and direct users can create applications to perform various tasks (e.g. shuffle play of music) using stored content.

Content connector 608 includes a content exchange 662. Content exchange 662 includes software interfaces for transaction server 102 to access other (e.g., external) content servers and repositories. For a user, such as a direct user 130, content exchange 662 may provide for delivering the content to any number of user designated locations (home TV set, wireless USB drive, etc.) specified in association with the user's delivery instrument upon downloading of the content by the user.

Figure 7:
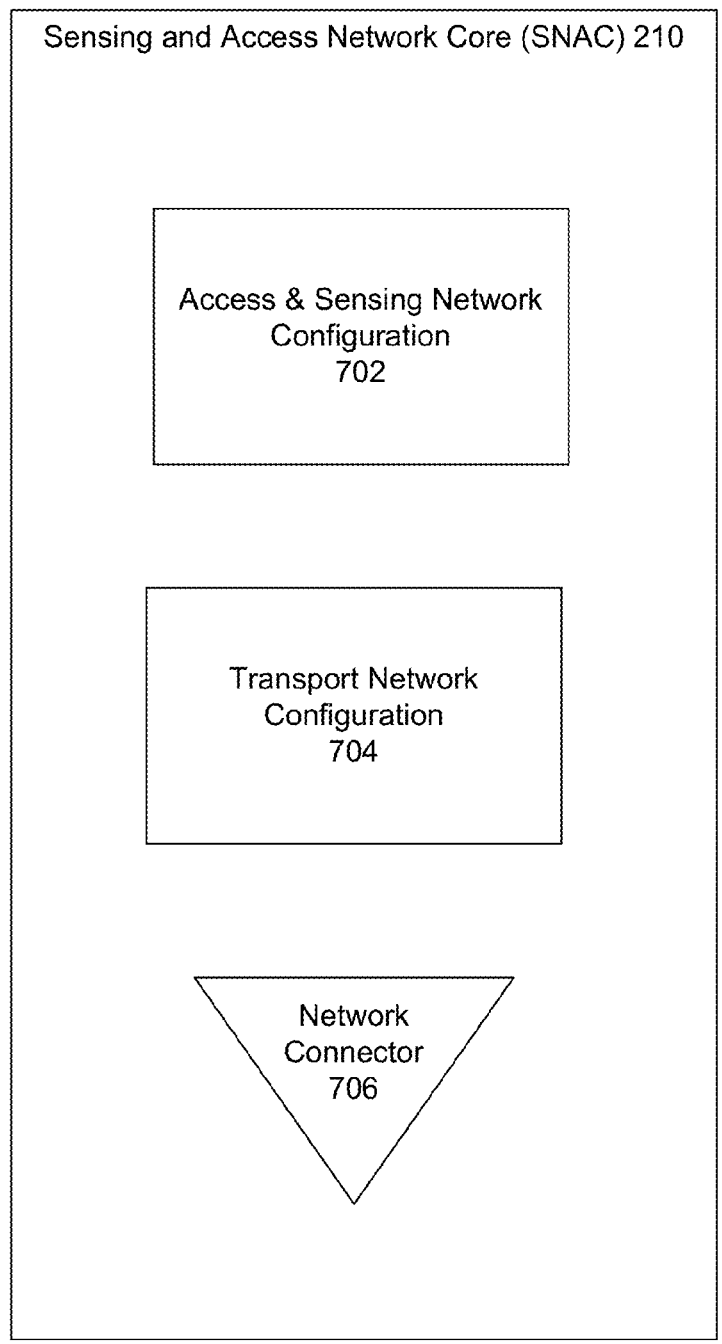
FIG. 7 illustrates a sensing and network access core, in accordance with an embodiment of the present invention.

FIG. 7 illustrates a sensing and network access module 210, in accordance with an embodiment of the present invention. Sensing and access network access module 210 operates to configure and control a sensing and access network, such as, an access network provided by wireless access point 114 through which users of system 100 gain access to communicate with transaction server 102.

Sensing and Network Access core (SNAC) 210 is the primary access facilitator for user access in system 100. SNAC 210 manages physical network elements such as wireless (i.e. WIFI/WLAN) access points and wired routers, and also manages user access via web or online access. SNAC 210 operates with security core 204 to apply the unique identifiers generated in system 100 to transaction activities allowing for router level network security for transactions. The unique identifiers tracking at the router can act like a firewall preventing unauthorized users to get beyond the point of access.

SNAC 210 operates to manage user transaction requests maximizing speed, quality of service and security. SNAC 210 works in concert with Content Core 208 to provide fast access to content when user access devices cannot manage such storage locally. A key function of SNAC's is facilitating user access to the components of transaction server 102 and utilizing the best network option available for a user to complete their requested transaction. SNAC 210 may create a virtual dynamic network connection and then facilitate a transaction and then release such connection within a matter of milliseconds. SNAC can be customized to provide the most optimal network access suitable for particular geographic or virtual areas.

SNAC 210 may include a access and sensing network configuration module 702, a transport network configuration module 704, and a network connector 706.

Access and sensing network configuration module 702 operates to configure access networks, such as local area networks (LANs) in merchant premises and other sites in which transactions are likely to occur, to allow users and user access devices to access system 100. Sensing configurations may include configuring physical controls of devices such as antennas, and antenna steering, and also logical configurations such as configuring the location coordinates in a router or other access device in order to recognize whether a user is within a sensing area. Functions may allow network managers to set rules and policies around how network sensing is performed in a given sensed area. Access and sensing network configuration module 702 may provide the ability for operators of system 100, as well as merchants and other users of system 100, to configure the behavior of sensed areas for particular users. Further access network configurations may include, setting up of rules in routers and other access devices to detect the locations and identifications of users and/or user access devices, so that a determination can be made locally at the access network level whether the user is in a sensed area and also whether the user is allowed to access system 100 from that sensed area.

Transport network configuration 704 operates to allow management of all onsite, wireless, Web connections or Backhaul IP/Wireless connections and security settings. Network elements can include but are not limited to routers and switches.

Network connector 706 includes connectors by which user access devices can access the access networks of system 100. In some embodiments, the user access device and/or access network may be configured to transmit and receive a special configured code identifying each other as belonging to the same system 100.

Figure 8:
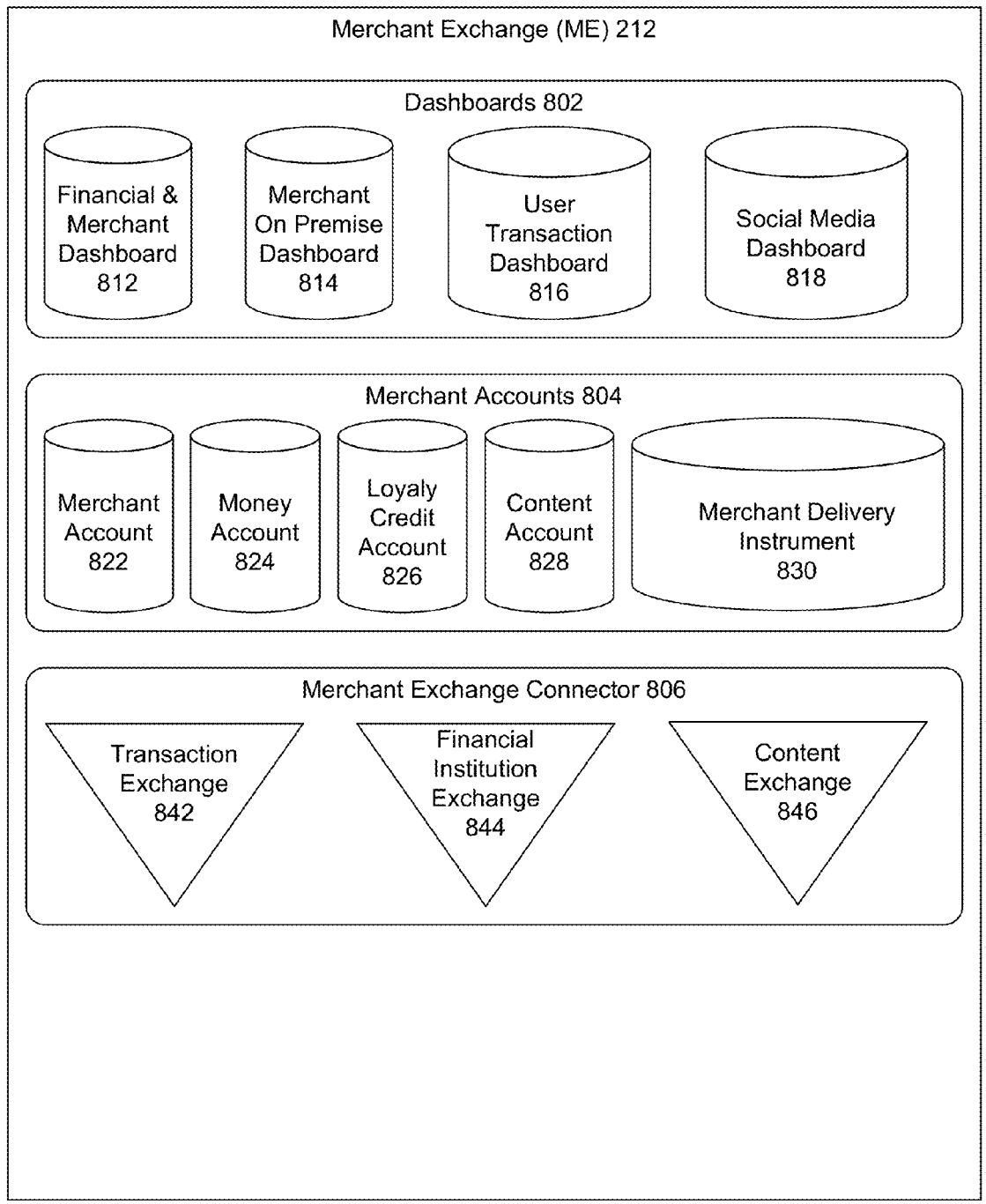
FIG. 8 illustrates a merchant exchange, in accordance with an embodiment of the present invention.

FIG. 8 illustrates a merchant exchange 212, in accordance with an embodiment of the present invention. Merchant exchange 212 operates to enable the transaction server 102 to communicate with merchants and delivery instruments associated with merchants.

Merchant exchange 212 may include dashboards 802, merchant accounts 804, and merchant exchange connectors 806.

Dashboards 802 may include a financial & merchant dashboard 812, a merchant & on premise dashboard 814, a user transaction dashboard 816, and a social media dashboard 818. Each of the dashboards presents information relevant for the respective user in a clear and efficient manner.

Merchant accounts 804 include merchant account 822, money account 824, loyalty credit account 826, content account 828, and a merchant delivery instrument 830. Merchant delivery instrument 830 represents the accounts maintained by the merchants on transaction server 102. For example, funds transferred to a merchant may be transferred to a selected merchant delivery instrument 830. Each merchant may enroll one or more of a merchant account 822, money account 824, loyalty credit account 826, or content account 828.

Merchant exchange connectors 806 include transaction exchange 842, financial institution exchange 844, and content exchange 846. Each of transaction exchange 842, financial institution exchange 844, and content exchange 846 provide web interfaces or other software interfaces to entities of the specific user type. The web interfaces or other software interfaces may be published by the respective entity. Transaction server 102 can use the web interfaces or other software interfaces published by the merchants to make transfers to merchants that may not have a delivery instrument enrolled on the transaction server 102.

Figure 9:
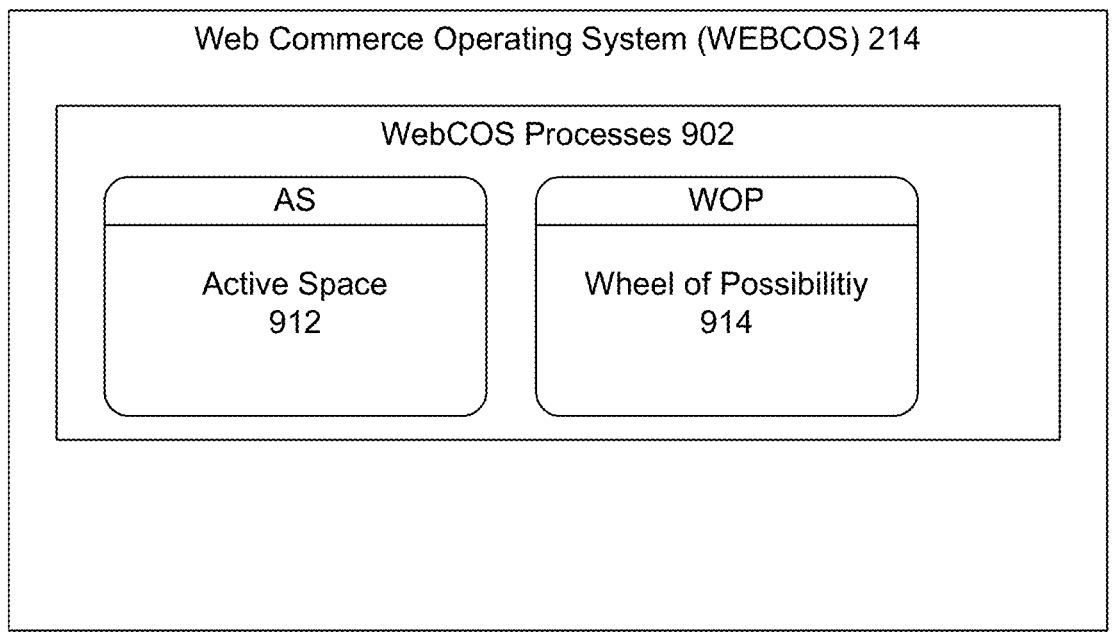
FIG. 9 illustrates a Web commerce operating system module, in accordance with an embodiment of the present invention.

FIG. 9 illustrates a Web commerce operating system (WebCOS) module 214, in accordance with an embodiment of the present invention. WebCOS 214 provides an operating environment that can be pushed to user access devices to interact with the transaction server 102. The user access devices can be configured to receive automatic page pushes upon entering a sensing area. Also, the sensing area can be configured to automatically force devices entering its network boundary to choose its sensing area. A similar process may also occur upon acquiring the network, automatically push a page requiring no action of a first time user upon entering the sensing area (both the sensing area and the page push can occur without any user action).

WebCOS processes 902 include an active space module 912 and a wheel-of-possibilities module 914. Active space module 912 enables an input area on a displayed user interface into which selectable objects may be dragged-and-dropped. The input area may, in response to drag-and-drop objects, spawn a plurality of threads to initiate and process the appropriate transactions.

Wheel-of-possibilities module 914 provides a user interface having a user interface configured for usability. The user interface provided by this module provides menu options arranged as selectable circles around a menu title.

Figure 10A:
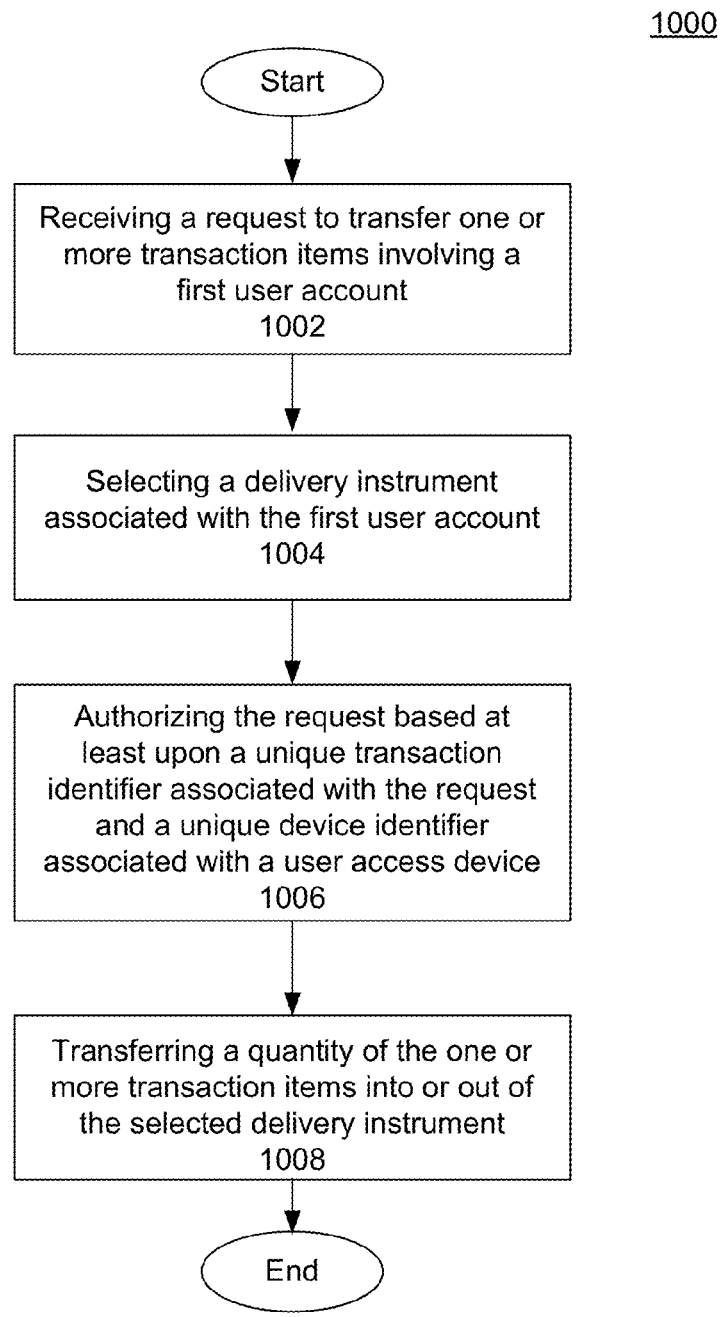
FIG. 10A illustrates a flowchart of a method of facilitating a transaction, in accordance with an embodiment of the present invention.

FIG. 10A illustrates a flowchart of a method 1000 for facilitating a transaction, in accordance with an embodiment of the present invention. Method 1000 may be executed by transaction server 102 illustrated in FIGS. 1A and 1B. In some embodiments, not all of the steps 1002-1008 may be performed, and one or more steps 1002-1008 may be performed in an order different from that illustrated in FIG. 10A.

At step 1002, a request is received to transfer one or more transaction items associated with a first user account on the transaction server. The received request can be in the form of a message, identifying the requestor, the first user account from or to which the transfer is to be made, a second user or third party associated with the transaction, the transaction item, and a requested quantity of the transaction item.

The transaction item may include one or more of money, money equivalent, or content.

The transaction may be a buy, give, get or send operation.

In a buy transaction, a first user may request that an amount of money is transferred from the first user account associated with the first user to a merchant towards the purchase of a product or service.

In a give transaction, the first user may request that an amount of money is transferred from the first user account to another entity, such as a charitable organization, and there may or may not be as associated receipt of a product or service.

In a get transaction, the first user may request that an amount of money or money equivalent is withdrawn from a first user account.

In a send transaction, the first user may request that an amount of money or money equivalent be transferred to another entity.

At step 1004, responsive to the received request, one or more delivery instruments are selected. A delivery instrument is an account or repository associated with the first user account. The selected delivery instruments can be one or more of a money account, money equivalent account, or content account. For example, an on-line cash account, one or more checking accounts, a loyalty rewards points account, and a digital media content account may be associated with the first user account at the transaction server.

Based upon the transaction requested, the transaction server selects one or more delivery instruments. For a transaction that involves the transfer of money, an online cash account, checking or other money account is selected. If the transaction involves the transfer of a money equivalent, then the appropriate money equivalent account (e.g. airline miles, merchant loyalty rewards points etc.) is selected. If the transaction involves the transfer of content, then a content account is selected.

The selection may be based on one or more factors. For example, the user configurations or profile information may specify default selections for each type of transaction. The default options for a user may specify, for example, that any cash deposits below a threshold amount, are deposited into the user's online cash account. Moreover, the default options may specify that any payments to selected merchants first make use of loyalty points if they are available in the user's money equivalent account, and that any remaining balance be paid from the online cash account.

At step 1006, the request is authorized based at least upon a unique transaction identifier associated with the request and a unique device identifier associated with the user access device that originated the request.

The authorization may be performed by the transaction server (e.g. transaction server 102) using the security core (e.g. security core 204) of the transaction server.

The authorization may include one or more levels of authorization. According to an embodiment, the parties to the transaction are identified and are checked against a blacklist of parties (i.e. list of parties which are currently denied the privilege to conduct transactions using transaction server). If one or more of the parties to the transaction are found on the blacklist, then the transaction is cancelled, and an indication of the cancellation is transmitted to the requestor. If none of the parties to the transaction are found on the blacklist, then another stage of authorization may be performed.

In addition to, or alternatively to the above check of the blacklist, authorization may include matching the geographic location information associated with the transaction and the user access device which originates the transaction request. According to an embodiment, the matching is based upon unique identifiers (e.g. Ditnums) associated with the transaction and the user access device. For example, a geographic location or area is encoded in the unique identifiers associated with the transaction. In order to authorize the transaction, the transaction server or the security core matches the last known location of the user access device which originated the transaction request with the geographic area information encoded in the transaction request.

The authorization stage may also include checking against a user profile for maximum allowed transaction limits. For example, a user who has requested a transfer of $1000, but who has a configured maximum allowed transaction limit of $500 may be restricted to withdrawing only the $500.

If the authorization is successful, the transaction is allowed to proceed. If the authorization fails, then the transaction is cancelled and an indication of the cancellation is communicated to the requestor.

At step 1008, a quantity of the one or more transaction items is transferred into or out of the selected delivery instrument. The quantity that is transferred may be the requested quantity of the one or more transaction items, or an amount determined during the authorization stage.

Figure 10B:
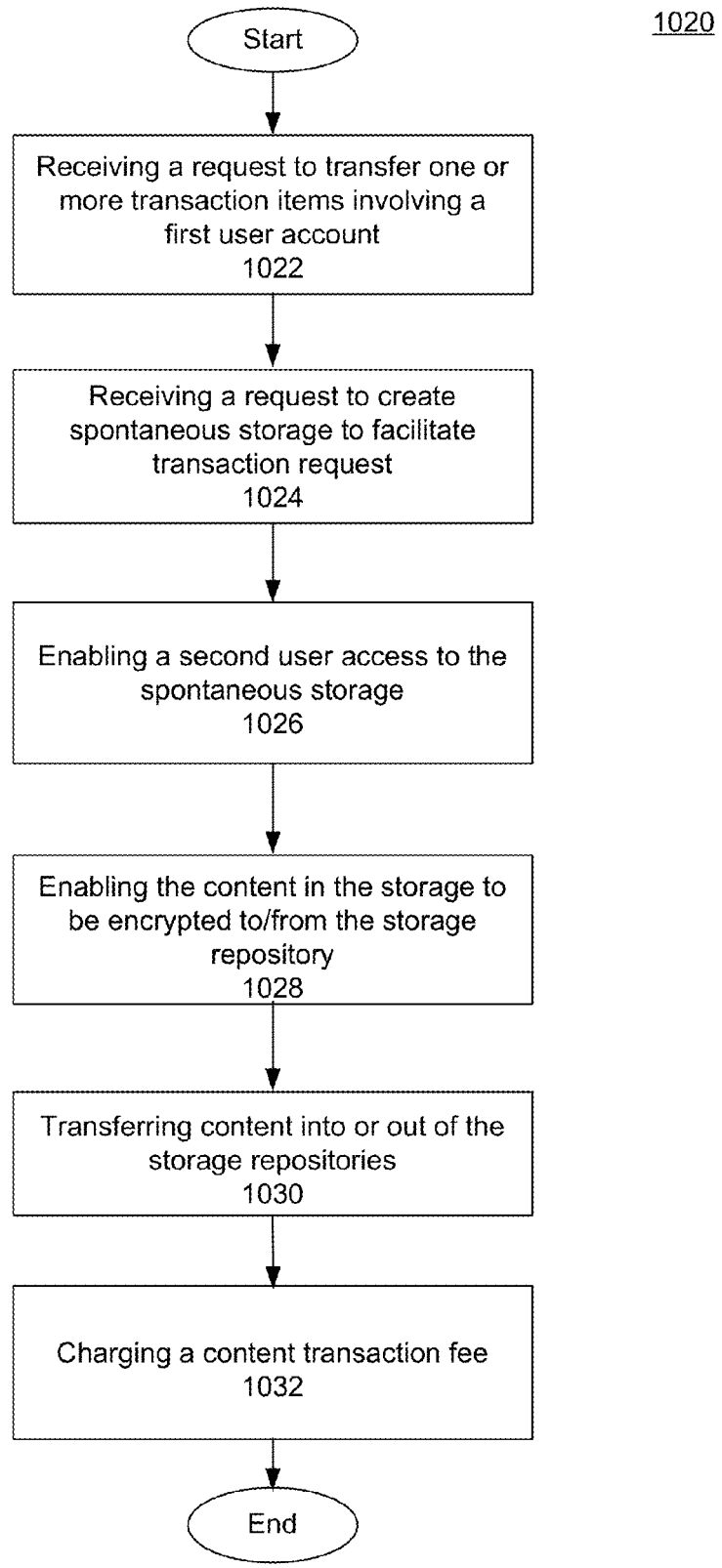
FIG. 10B illustrates a flowchart of a method of facilitating a transaction involving content, in accordance with an embodiment of the present invention.

FIG. 10B illustrates a flowchart of a method 1020 for facilitating a transaction to transfer content, in accordance with an embodiment of the present invention. Method 1020 may be executed by transaction server 102 illustrated in FIG. 1A. In some embodiments, not all of the steps 1022-1032 may be performed, and one or more steps 1022-1032 may be performed in an order different from that illustrated in FIG. 10B.

At step 1022, a request is received to transfer one or more content items associated with a first user account on the transaction server. The received request can be in the form of a message, identifying the requestor, the first user account from or to which the transfer is to be made, a second user or third party associated with the transaction, the requested content, and any quantification of the requested content. According to an embodiment, the request may be originated by a direct user 130 of system 100 and the receiver of the message may also be a direct user of system 100.

The request may be generated subsequent to a higher level application that, for example, enables one user to view and request content items other users have available for transactions. For example, the higher level application may enable users within a sensing area to view and request content, such as digital music files, from each other.

At step 1024, a request to create spontaneous storage is received. This request may be generated simultaneously when the content transaction request is generated, based upon profile information of the sender and/or receiver of the transaction or based upon the type of content. Spontaneous storage may be created in one of several locations, such as, but not limited to, the user access device of the user who owns the requested content or an online storage facility available in the particular sensing zone (e.g., merchant provided network storage).

At step 1026, access privileges to the created spontaneous storage resource is provided to the requesting user. This may involve changing the file properties of the spontaneous storage area and/or specifically configuring the area to be accessible only to the requesting and providing users.

At step 1028, the content to be transferred may be optionally encrypted. In some embodiments, the content may be subjected to logging or other activity that is required by digital rights management with regard to the content.

At step 1030, the content is transferred out of the current owner's repository or delivery instrument to the spontaneous storage area. Upon completing the transfer to the spontaneous storage area, the requesting user may be notified.

The requesting user may then access the content in the spontaneous storage area. The requesting user may, in some embodiments, immediately transfer the content from the spontaneous storage area to his own content repository.

At step 1032, any content transaction fees may be charged. In the event that, providing user provided content for a fee, such fee may be debited from the receiving user and credited to the providing user. In another embodiment, the merchant may impose a charge, for example, for facilitating the spontaneous storage. In the event that the merchant requires payment, the necessary amount may be deducted from the accounts of one or both the requester and provider of the transaction.

Figure 11:
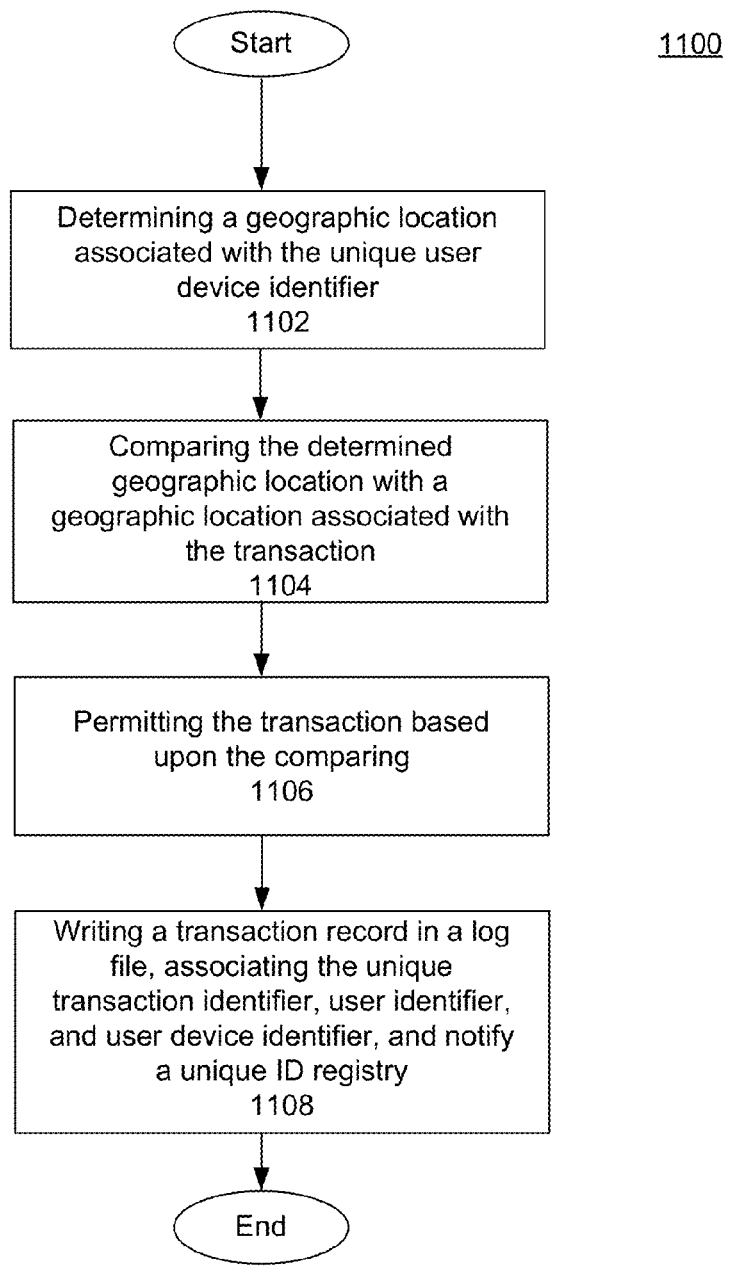
FIG. 11 illustrates a flowchart of a method of authorizing a request, in accordance with an embodiment of the present invention.

FIG. 11 illustrates a flowchart of a method of authorizing a request, in accordance with an embodiment of the present invention. Method 1100 may be executed by transaction server 102 and/or security core 204 illustrated in FIGS. 1A, 1B, 2A and 2B. In some embodiments, not all of the steps 1102-1108 may be performed, and one or more steps 1002-1008 may be performed in an order different from that illustrated in FIG. 11.

At step 1102, a geographic location associated with the unique user device identifier is determined. The geographic location of the unique user device may be determined based upon messages received from the user device or from user device monitoring entities in the system.

According to an embodiment, the user device periodically transmits its geographic position to the transaction server. The geographic position of the user device may be specified in latitude longitude coordinates or in accordance with a protocol identifying particular areas in a manner understandable to the transaction server. For example, the user device may send a message when it detects that it has entered a particular area known to transaction server 102 as an area (e.g. sensed area) from where a user may initiate transactions.

According to another embodiment, monitoring devices, such as routers and switches, may detect the presence of a user device within a known physical range of it, and may notify the transaction server. The transaction server may then determine the location of the user device in relation to the geographic location of the monitoring or access device which notified it of the user device.

At step 1104, the determined geographic location is compared with a geographic location associated with the transaction. The geographic location associated with the transaction is determined based upon the unique identifier associated with the transaction. The unique identifier may be the Ditnum.

As described above, a unique identifier representing a transaction has geographic location information associated in it. For example, if the transaction is to transfer money from a first user to a merchant for the purchase of a food item, then the unique identifier of the transaction would have the geographic location of the merchant or the merchant's outlet from where the food item is dispensed encoded in the unique identifier.

At step 1106, it is determined whether to permit the transaction to continue based on the comparing performed at step 1104. If a match was found in the geographic locations associated respectively with the user device and with the transaction, then at the transaction is allowed to proceed.

At step 1108, a transaction record is written in a log file. The transaction record includes, and associates, the unique identifiers assigned to the transaction, the user, and the user device through which transaction server is accessed. This step may also include sending a notification to a unique ID registry regarding the association of the unique IDs for the transaction, user and user device.

Figure 12:
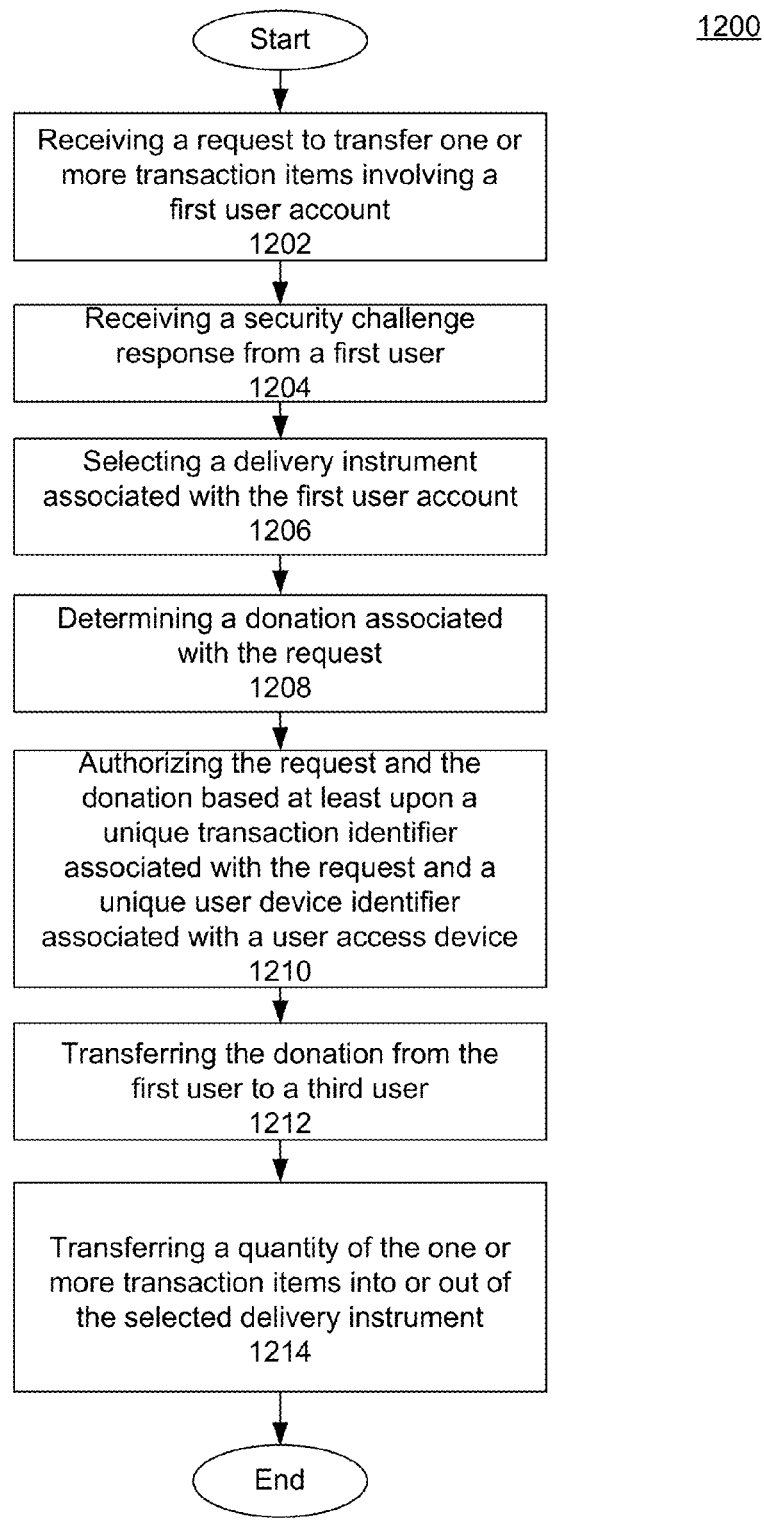
FIG. 12 illustrates a flowchart of another method of facilitating a transaction, in accordance with an embodiment of the present invention.

FIG. 12 illustrates a flowchart of another method of facilitating a transaction, in accordance with an embodiment of the present invention. Method 1200 may be executed by transaction server 102 and/or security core 204 illustrated in FIGS. 1A, 1B, 2A and 2B. In some embodiments, not all of the steps 1202-1214 may be performed, and one or more steps 1202-1214 may be performed in an order different from that illustrated in FIG. 12.

At step 1202, a request to transfer one or more transaction items involving a first user account is received. The request may be processed as described above in relation to step 1002 of method 1000.

Additionally, a challenge may be generated and transmitted to the requesting user device. For example, a message may be transmitted requesting the At step 1204, a response to a security challenge is received from a first user. According to an embodiment, the challenge response is responsive to a challenge message originated from the transaction server upon receiving the request. According to another embodiment the user device automatically prompts the user without being instructed by the transaction server to request a security challenge. For example, the security challenge may be displayed to the user after the user completes initiating the request for the transaction but before the response is received.

The security challenge and the response to the challenge may be a request for a pre-configured personal identification code and the personal identification code as entered on the user device by the user. A person of skill in the art would appreciate that other forms of security challenges and responses are usable in addition to, or alternatively, to the discussed techniques.

Based upon the received response to the security challenge, the transaction server determines whether the transaction would continue or whether it would be cancelled.

At step 1206, a delivery instrument associated with the first user account is selected. The selection of the delivery instrument may be performed in a manner similar to that described above in relation to step 1004 of method 1000.

At step 1208, a donation associated with the transaction request is determined. According to an embodiment, the donation information is included in the transaction request received at step 1202. According to another embodiment, the transaction server may, upon processing the requested transaction, request and receive donation information from the user. For example, the user may be prompted via the user device whether a donation amount is to be associated with the requested transaction.

At step 1210, the requested transaction and the associated donation, if any, are authorized. The authorizing may be based at least upon a unique transaction identifier associated with the request and a unique user device identifier associated with a user access device. An authorizing technique is described above in relation to step 1006 of method 1000.

If the request and the donation are authorized, the transaction and the donation continue to be processed.

At step 1212, the donation is transferred from the first user to a third user. The transfer of a donation amount of money may be effected from a money account associated with the first user to a third user. The destination of the transfer may be an account representing the third user on the transaction server. In the case of both the first user account and the third user account being on the same transaction server, the donation amount can be transferred within the transaction server.

In another embodiment, where the third user does not have an account maintained on the transaction server, the transaction server may transmit the donation amount via a merchant exchange, such as, merchant exchange 212. Merchant exchange 212, for example, enables the transaction server 102 to transfer money or other transaction items to a third party by invoking an application interface provided by the third party or another entity associated with the third party.

At step 1214, a quantity of the one or more transaction items may be transferred into or out of the selected delivery instrument. Transferring the transaction items is described above in relation to step 1008 of method 1000.

Figure 13:
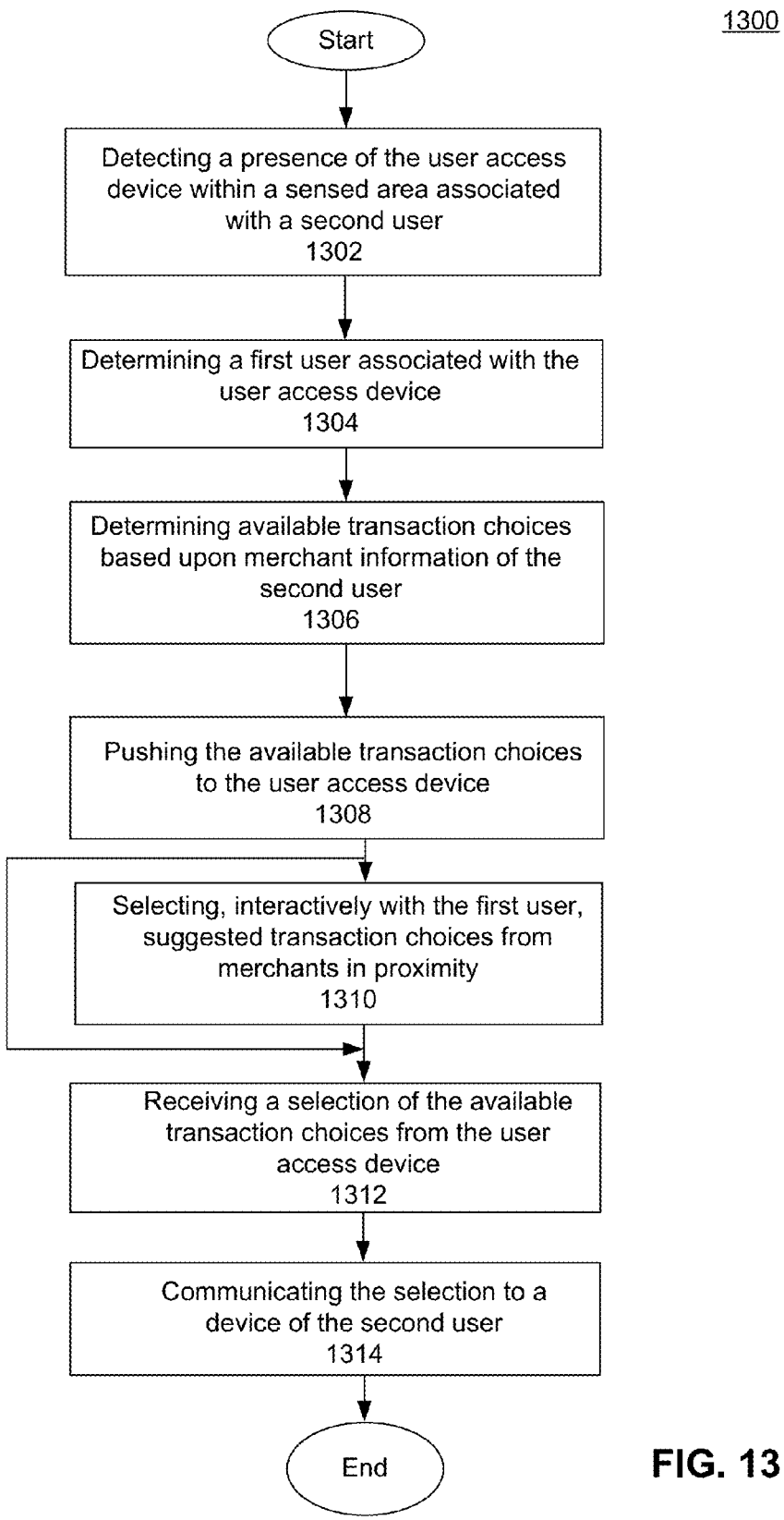
FIG. 13 illustrates a flowchart of a third method of facilitating a transaction, in accordance with an embodiment of the present invention.

FIG. 13 illustrates a flowchart of a third method of facilitating a transaction, in accordance with an embodiment of the present invention. Method 1300 may be executed by transaction server 102 and/or security core 204 illustrated in FIGS. 1A, 1B, 2A and 2B. In some embodiments, not all of the steps 1302-1316 may be performed, and one or more steps 1302-1316 may be performed in an order different from that illustrated in FIG. 13.

At step 1302, a presence of the user access device is detected within a sensed area associated with a second user. The sensed area may define a geographic or a virtual space. According to an embodiment, the sensed area is defined by the coverage areas of one or more antennas. The coverage area of the antennas may include a geographic area in which a merchant operates a retail enterprise. Other examples of geographically defined sensed areas include, but are not limited to, meeting locations, sports stadiums, concert locations and other event locations.

According to another embodiment, the sensed area is defined in virtual space. For example, the presence of the user access device may be detected in a virtual space, such as a virtual meeting room, virtual store, or in the virtual presence of a restaurant.

The detection of the user access device in a sensed area may occur by several techniques. According to one embodiment, an access device such as a router, switch, and wireless receiver/transmitter may detect the presence of the user device within proximity and may determine that the user device is within a sensed area.

According to another embodiment, the user access device, upon detecting that it has entered a sensed area may signal its presence to the transaction server. For example, the user device may be programmed to detect sensed areas based upon a wireless signal transmitted by an access device in the area, or to detect a sensed area based upon a message exchange with one or more devices within the sensed area.

In yet another embodiment, the detection may be based upon the geographic location coordinates of the user device. For example, the geographic location coordinates of the user device can be determined by the user device itself (e.g. using a global positioning system receiver device in the user device), and an access device or the transaction server can make the determination as to whether the user device is within a sensed area based upon the location coordinates of the user device and preconfigured information regarding the location and boundaries of the particular sensed areas.

At step 1304, the transaction server determines the user who is associated with the user access device from which the transaction request was received. According to an embodiment, the transaction server maintains a record of associations between user access devices and users. The associations are established at one or more of, registration/enrolling of a user device by a user, use of a user device by a user, logging in to a user device by a user, and like events.

At step 1306 Determining available transaction choices based upon merchant information of the second user. According to an embodiment, the second user, or merchant, was identified in step 1302 when the sensed area was determined. According to another embodiment, the second user may be determined based upon user selection. For example, a listing of a plurality of merchants who are present within a proximate area of the current location of the user access device may be displayed to the user. The user may then select a merchant from the displayed listing.

The transaction server may then access merchant information for the identified merchant. The accessed merchant information may be preconfigured. In some embodiments, the accessed merchant information may be a merchant information repository which is updated in real-time to reflect the ongoing merchant operating status. For example, the merchant information repository may include updated information regarding item availability, price and other conditions that may affect the availability of the products and services that are offered by the merchant.

Based upon the accessed merchant information, the transaction server may determine a set of currently offered choices for products and/or services offered by the transaction server. Examples may include an updated listing of the different types of coffee available at a coffee store within a sensed area. As the availability of various stocks of coffee beans change, the information repository is also updated.

At step 1308 the available transaction choices are pushed to the user access device. Note that any available server push technique, such as HTTP server push technology, can be used to communicate the transaction choices to the user devices without the user device explicitly requesting them.

At step 1310 suggested transaction choices from merchants in proximity are selected by the user. The selection may be performed interactively with the user. The suggested transaction choices may be derived from one or more of user preferences, system matching of products from tags and keywords stored about past purchases and from real-time merchant updates to product offerings.

At step 1312*a* selection of the available transaction choices from the user access device is received by the transaction server.

At step 1314 the selection from the user is communicated to a device of the second user.

Figure 14:
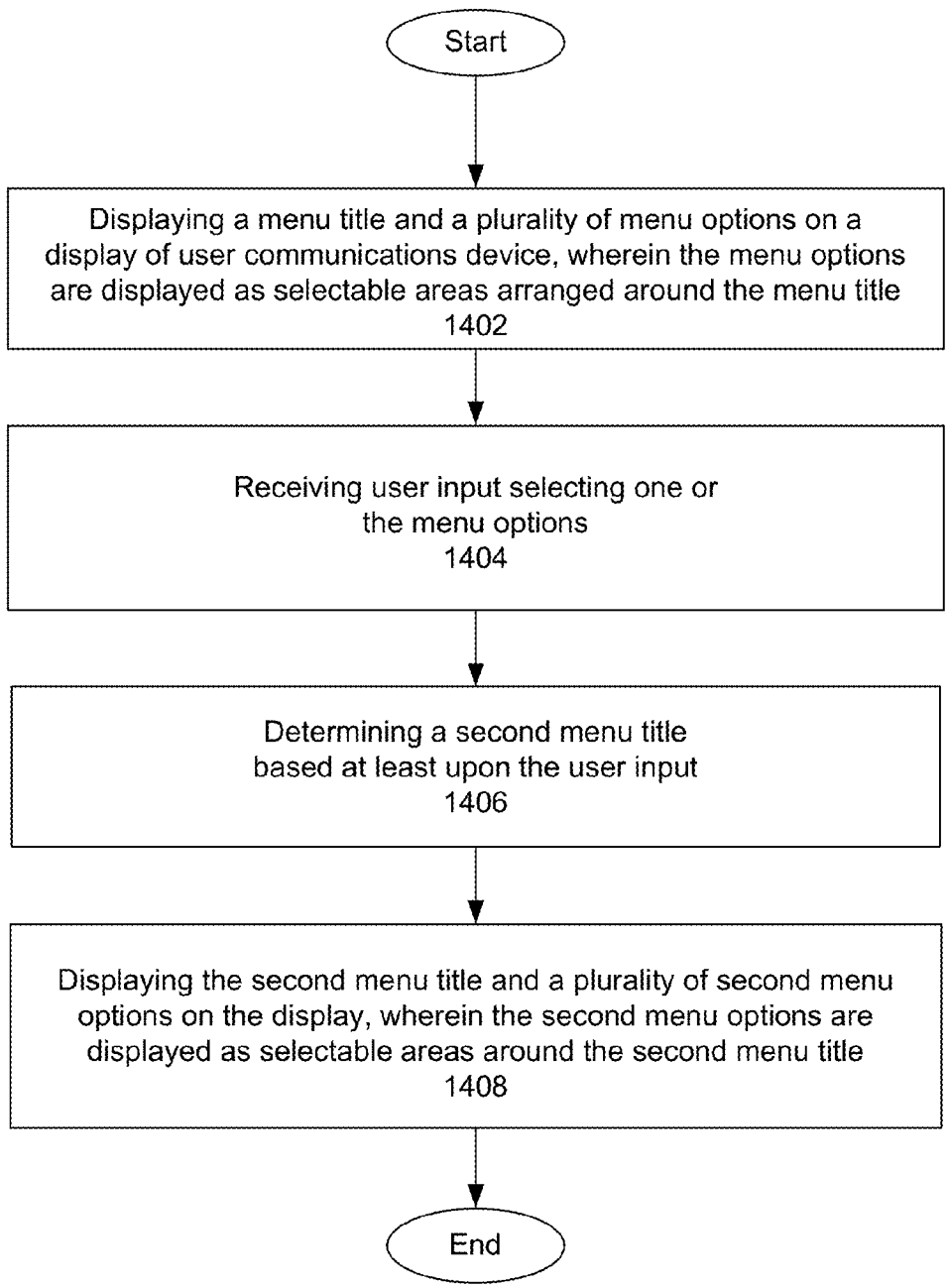
FIG. 14 illustrates a flowchart of a method of configuring a user interface, in accordance with an embodiment of the present invention.

FIG. 14 illustrates a flowchart of a method 1400 of configuring a user interface, in accordance with an embodiment of the present invention.

At step 1402, a menu title and a plurality of menu options are displayed on a user access device. The displayed menu options are selectable areas arranged around the menu title.

At step 1404, user input selecting one of the menu options is received.

At step 1406, a second menu title based at least upon the user input is determined.

At step 1408, the second menu title and a plurality of second menu options are displayed. The second menu options are displayed as selectable areas around the second menu title. The user can decide if the first menu remains exposed or is hidden, allowing a navigation to and from previous menus to happen more quickly.

Figure 15:
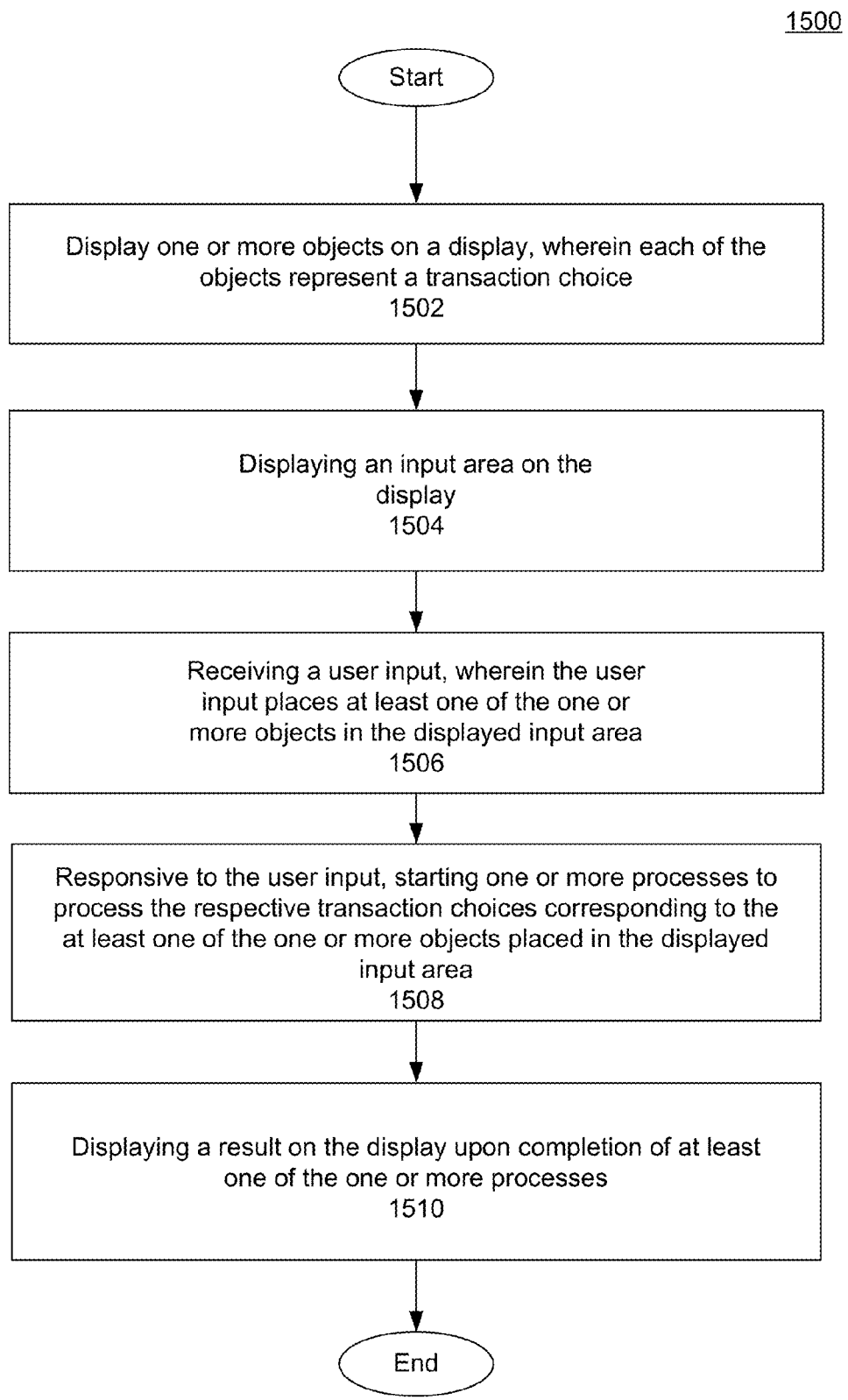
FIG. 15 illustrates a flowchart of another method of configuring a user interface, in accordance with an embodiment of the present invention.

FIG. 15 illustrates a flowchart of another method 1500 for configuring a user interface, in accordance with an embodiment of the present invention.

At step 1502, one or more objects are displayed on a display. Each of the displayed objects represents a transaction choice.

At step 1504, an input area is configured and displayed on the display.

At step 1506, a user input is received. The user input places at least one of the one or more objects in the displayed input area. The user experience can be a drag and drop motion or other forms of object manipulation such as double clicking or tapping, holding the object.

At step 1508, responsive to the user input, one or more processes are started to process the respective transaction choices corresponding to the at least one of the one or more objects placed in the displayed input area.

At step 1510, a result is displayed upon completion of at least one of the one or more processes.

Figure 16:
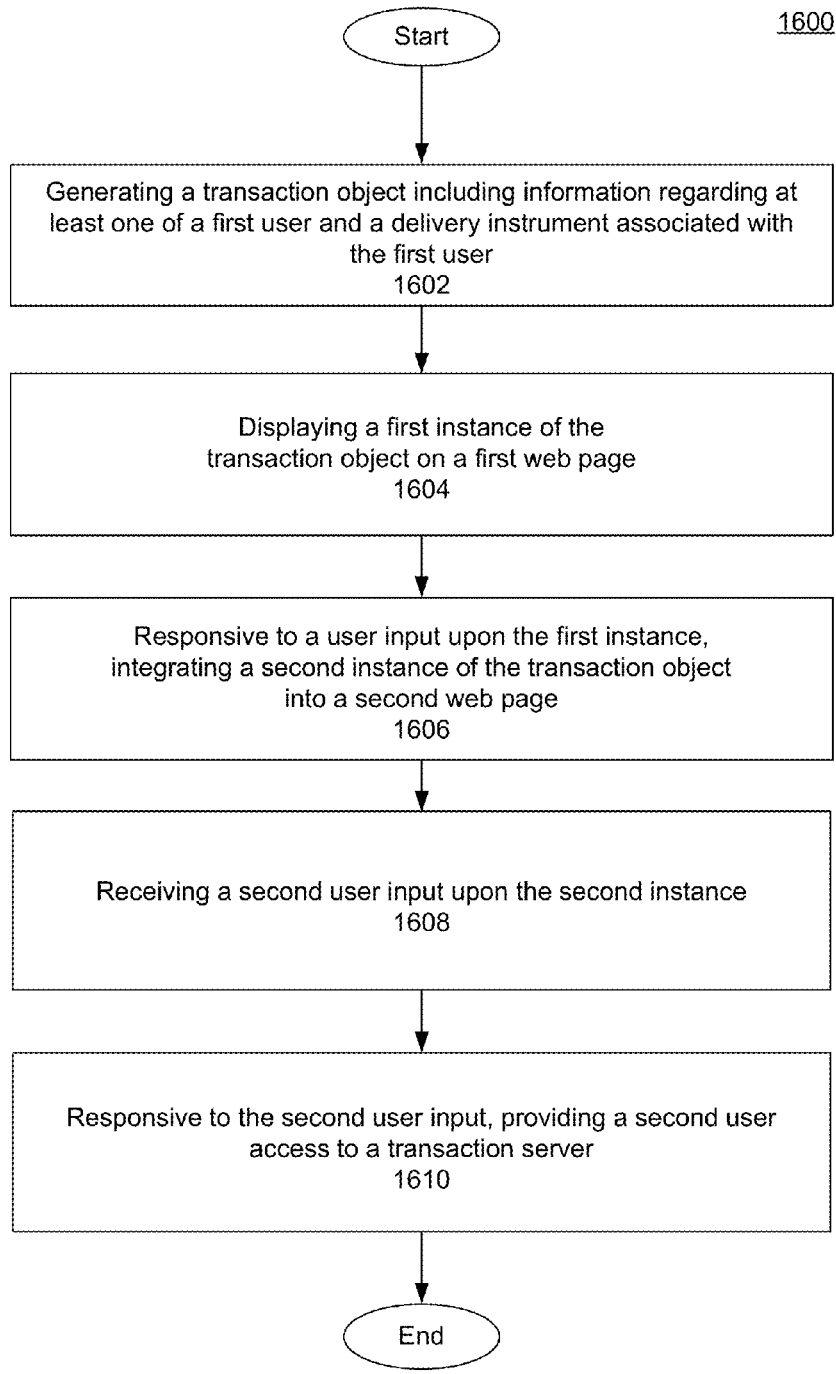
FIG. 16 illustrates a flowchart configuring an interface with a transaction server, in accordance with an embodiment of the present invention.

FIG. 16 illustrates a flowchart 1600 for configuring an interface with a transaction server, in accordance with an embodiment of the present invention.

At step 1602, a transaction object is generated including information regarding at least one of a first user and a delivery instrument associated with the first user.

At step 1604, a first instance of the transaction object is displayed on a first web page.

At step 1606, responsive to a user input upon the first instance, integrating a second instance of the transaction object into a second web page.

At step 1608, a second user input is received upon the second instance.

At step 1610, responsive to the second user input, providing a second user access to a transaction server.

Figure 17:
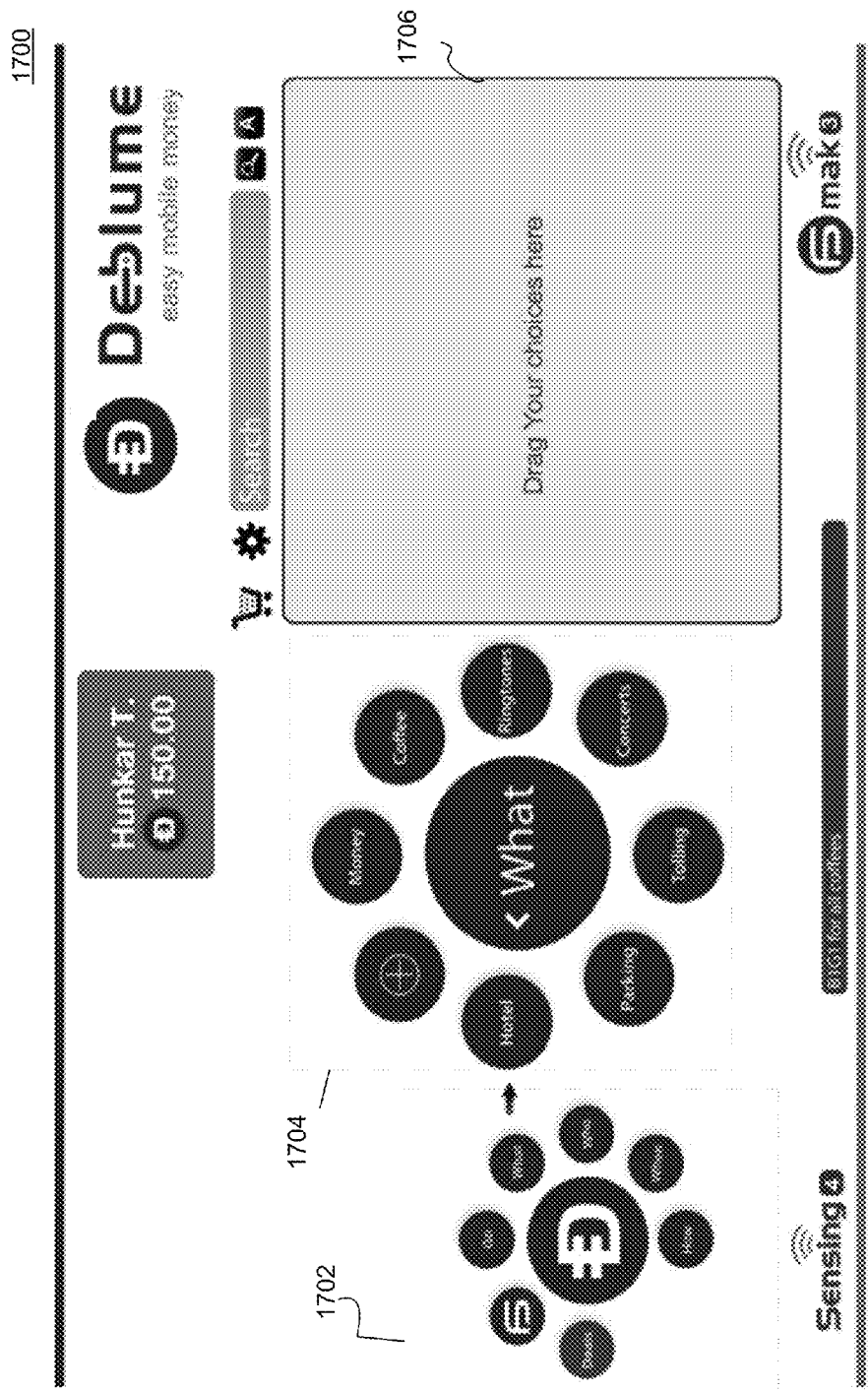
FIG. 17 illustrates a user interface to facilitate convenient interaction with a transaction server, in accordance with an embodiment of the present invention.

FIG. 17 illustrates a user interface 1700 to facilitate interaction with a transaction server, in accordance with an embodiment of the present invention. User interface 1700 includes one or more menu areas 1702 and 1704, and an input area 1706. Menu areas 1702 and 1704 are dynamically configured, so that menu area 1704 is displayed only upon the appropriate selection is made in menu area 1702. The menu in 1704 is a sub-menu of the menu displayed in 1704. Thus, the menu 1704 is configured to appear larger than menu 1702 when displayed. According to the illustrated embodiment, each menu 1702 and 1704 are displayed such that the respective menu options are displayed arranged around the menu title. The user's selection of a menu option in menu 1702 triggers the display of the appropriate menu 1704.

Input area 1706 is configured to accept the drag-and-drop of a menu option from one or more of the menus 1702-1704. The drag-and-drop of a menu item in the input area is configured to spawn one or more processes that execute the appropriate processing for the transaction. The user can also create two or more input areas and drag and drop items to any of these input areas.

Figure 18:
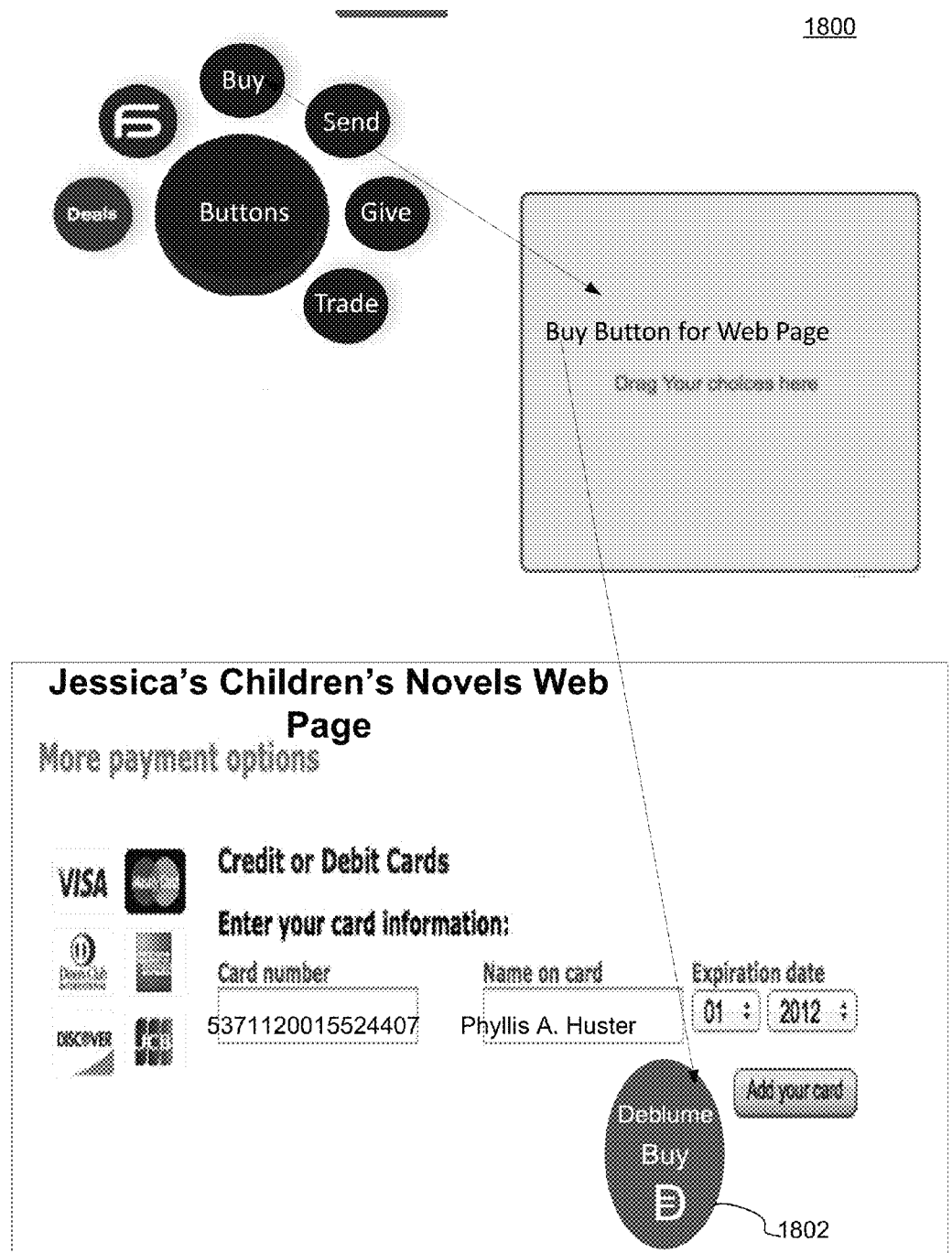
FIG. 18 illustrates an example user interface on a third party web page to interact with a transaction server, in accordance with an embodiment.

FIG. 18 illustrates an example user interface 1800 on a third party web page to interact with a transaction server, in accordance with an embodiment. User interface 1800 includes a "buy button" 1802, which can be automatically placed in a third party web page and integrated to accept user input. Buy button 1802 can be placed on the third party web page, by a user simply selecting it from a configuration web page and by using a drag-and-drop motion to place it on the third party web page. Alternatively, the user may drag-and-drop the buy button 1802 into an input area. Upon dropping the buy button into the input area, the user may be prompted for a URL at which the buy button would be automatically integrated onto a new webpage. The buy button 1802, when integrated onto a third party web page, would ask to enter funds account details for receiving the deposit from all users that click on that button to pay for a product or service purchase.

Figure 19:
FIG. 19 illustrates an exemplary display presenting a barcode to facilitate a transaction, in accordance with an embodiment.

FIG. 19 illustrates an interface 1900 that may be displayed on a user access device. Interface 1900 displays a barcode 1902 which may be scanned by a point-of-sale terminal or other scanning device. Subsequent to the scanning of the barcode by the POS device, the user is able to retrieve an amount of money previously transferred from one of the user's delivery instruments on the transaction server to an account associated with the POS terminal or other scanning device. The barcode may be sent to the user as the result of requesting a "withdraw" from the main menu.

Figure 20:
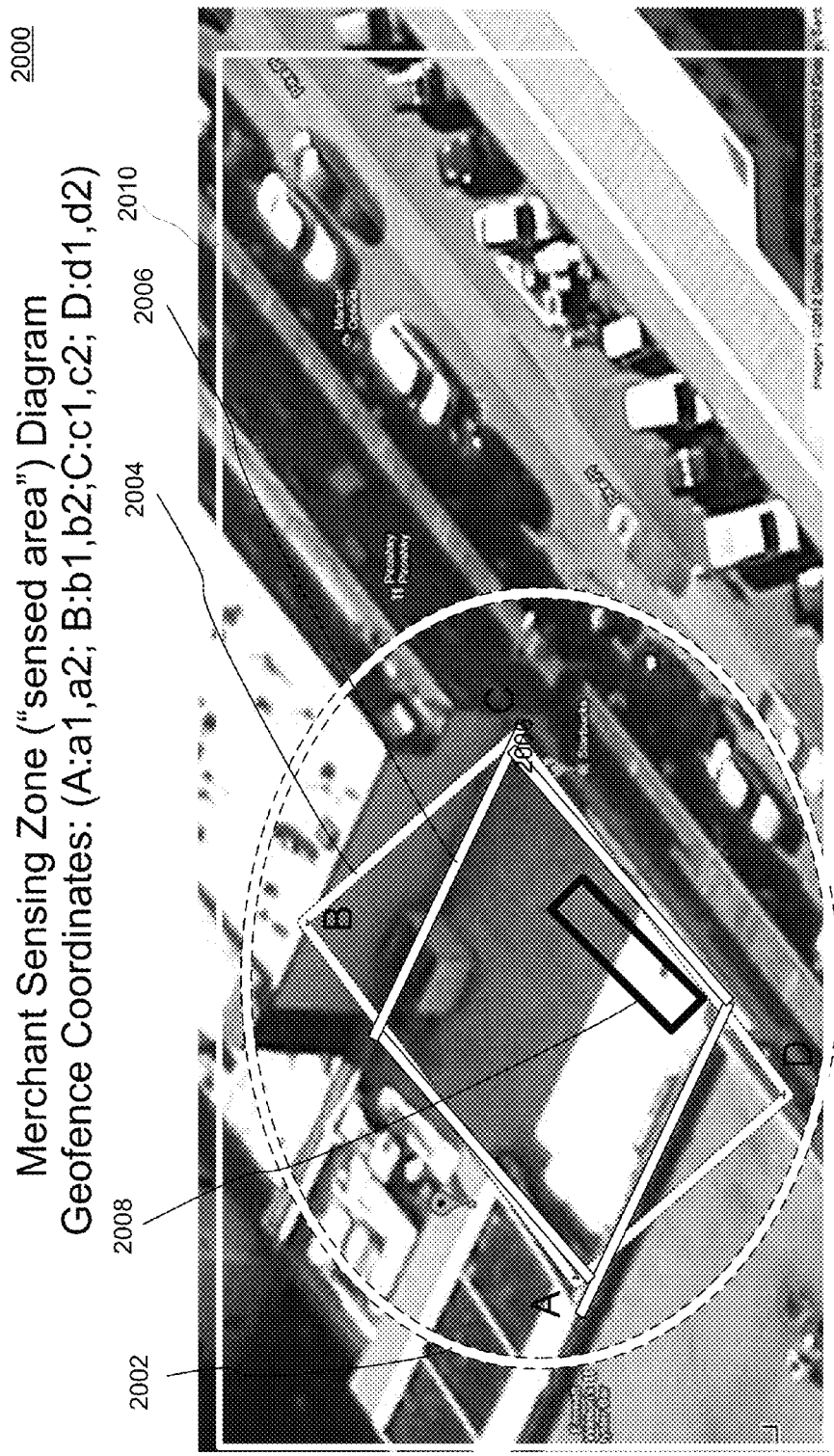
FIG. 20 illustrates sensing zones in accordance with an embodiment.

FIG. 20 illustrates an image 2000 to illustrate a geographically-based sensed area. The WIFI coverage range 2002 of the merchant establishment is shown by 2002. The merchant store physical boundary 2006 may have less or more coverage area than 2002. The sensed area 2004 is illustrated by the coordinates A, B, C, and D. Within sensed area 2004, one or more sensing sub-areas 2008 can be defined. Sub-areas can represent, for example, front of a grocery store, etc. Within non geographic sensed area, 2010 or representing all possible coordinates for ABCD, the user is also responsive to merchant activity relating to that virtual sensing area.

Figure 21:
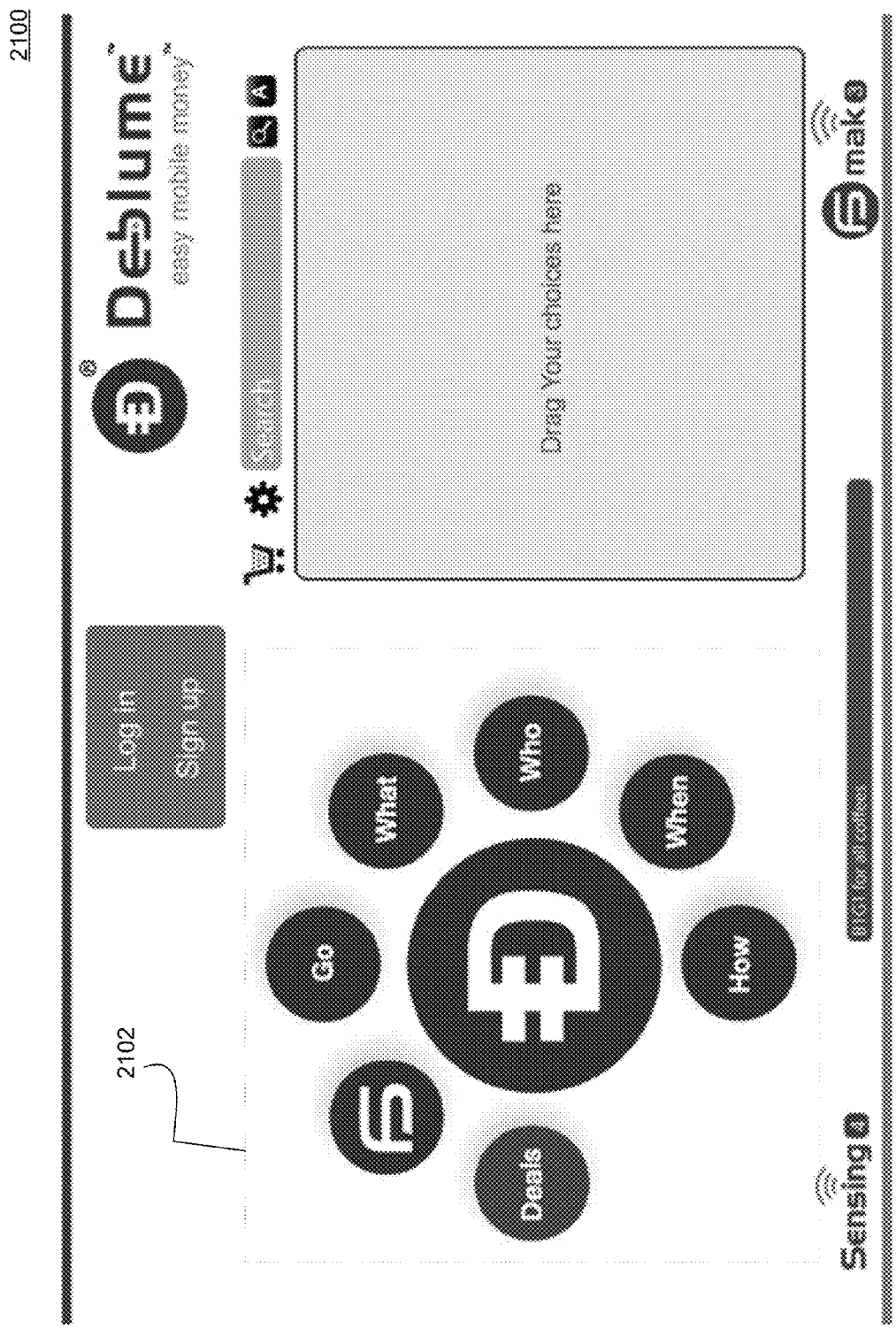
FIGS. 21-24 illustrate user interfaces for initiating a transaction, in accordance with an embodiment.

FIG. 21 illustrates an interface 2100, according to an embodiment. Interface 2100 displays an initial menu 2102. Initial menu 2102 includes options "What", "Who", "When", and "How" that are configured to enable the user to navigate the menus and associated options in an intuitive manner.

Figure 22:
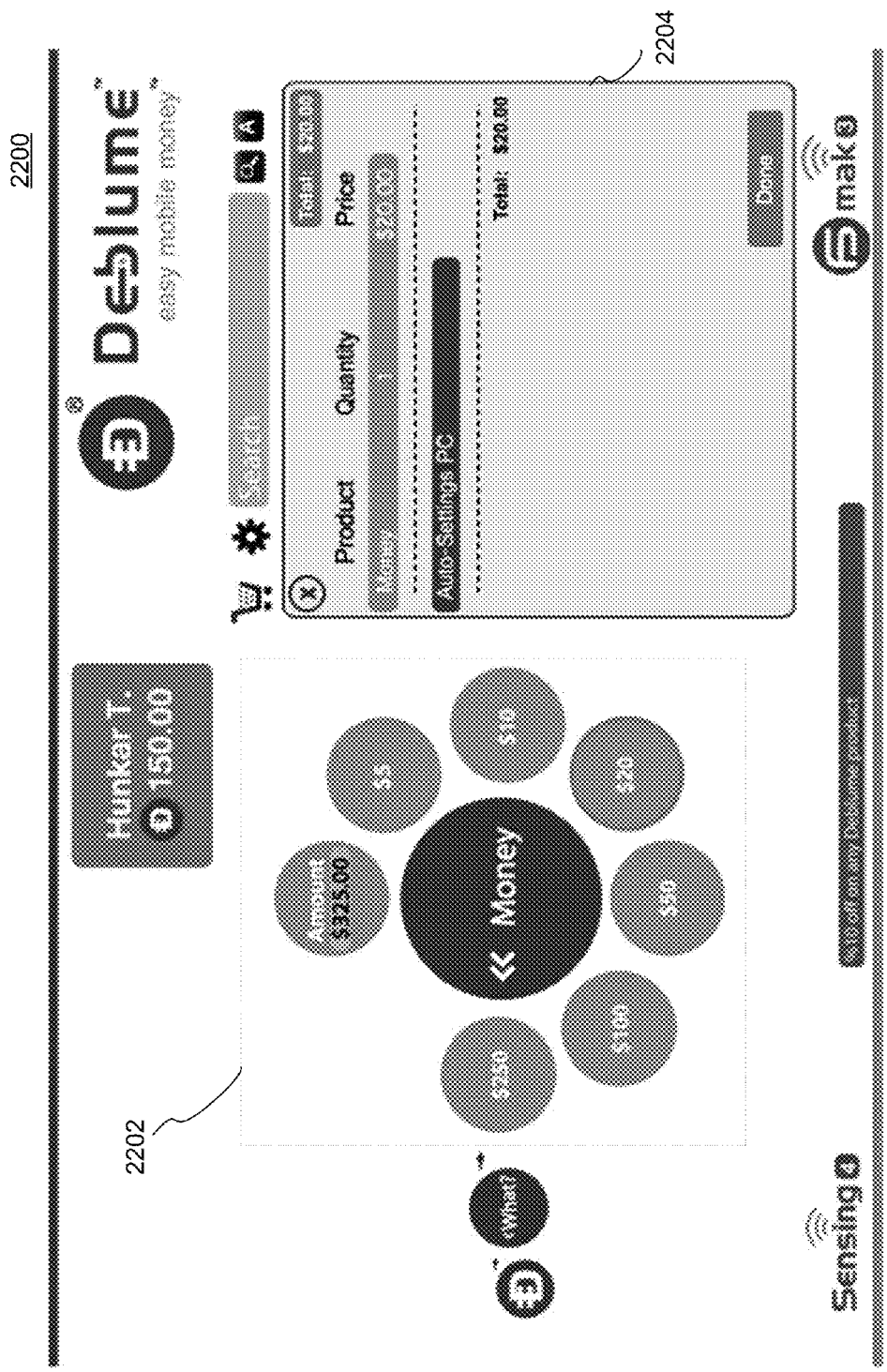

FIG. 22 illustrates interface 2200, according to an embodiment. Interface 2200 may occur upon selecting "What" option from the menu shown in interface 2100, and then selecting an option "Money" to have menu 2202 displayed. The "$20" option from menu 2202 has been dragged-and-dropped in input area 2204. Upon the $20 being dropped in the input area 2204, one or more processes are initiated on the transaction server such as check balances and if funds are not in the online account, notify the user to move funds from the enrolled bank account. Additionally, when done is clicked, an additional 2204 process occurs in the user device such as requesting a pin challenge if security is turned on, so that the transaction server is then triggered to perform the transaction when the pin challenge is confirmed, regarding the selected $20.

Figure 23:
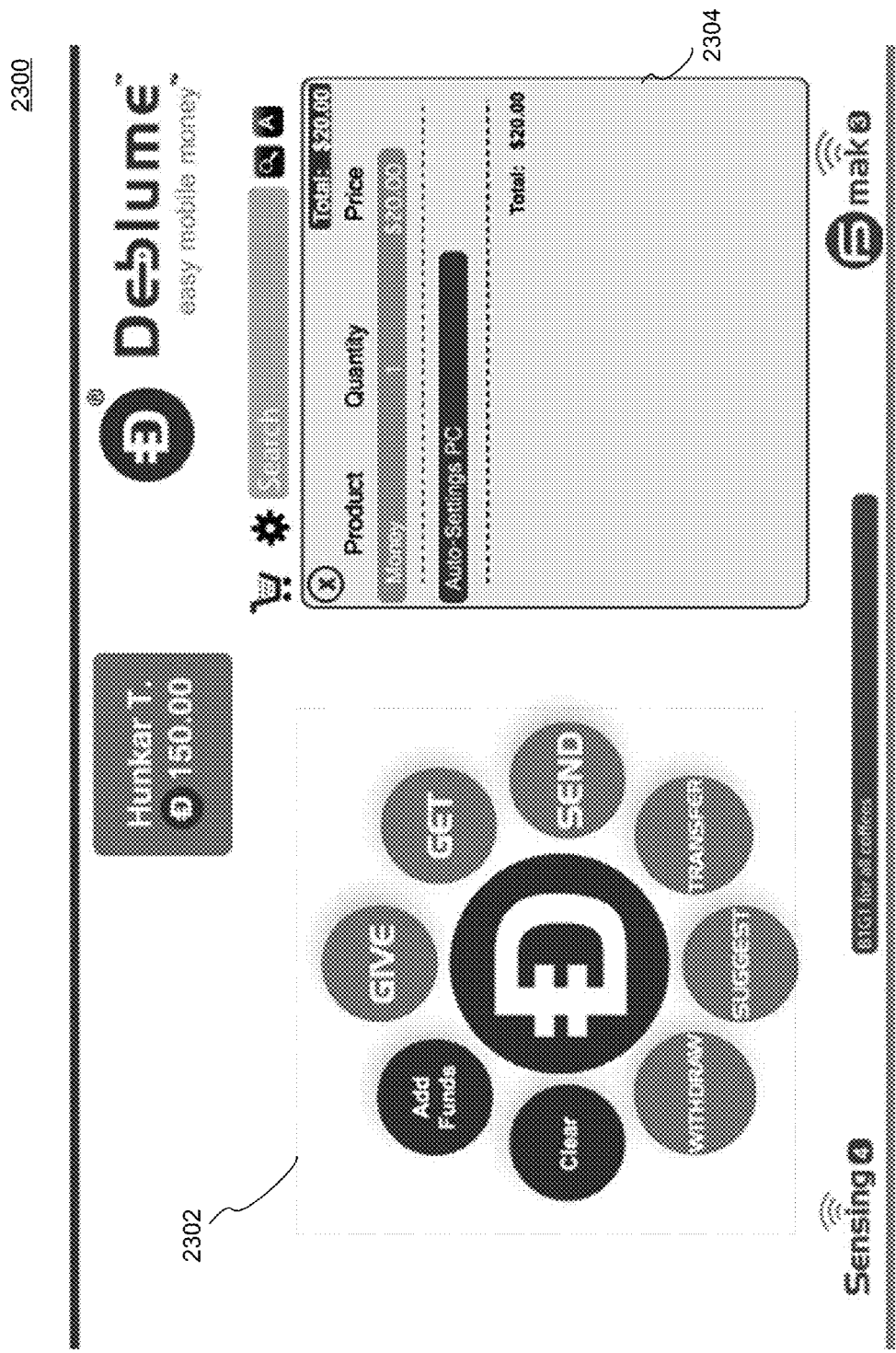

FIG. 23 illustrates interface 2300, according to an embodiment. Interface 2300 illustrates a menu 2302 and input area 2304. Menu 2302 is configured with options "Give", "Get" and "Send" options, any one of which may be performed upon the $20 being indicated in the input area 2304. Add funds enables the user "Hunkar T." to move funds from any of his enrolled delivery instrument accounts (bank account, credit card, etc.) and this new amount can be seen added to the "D 150.00" balance at the top.

Figure 24:
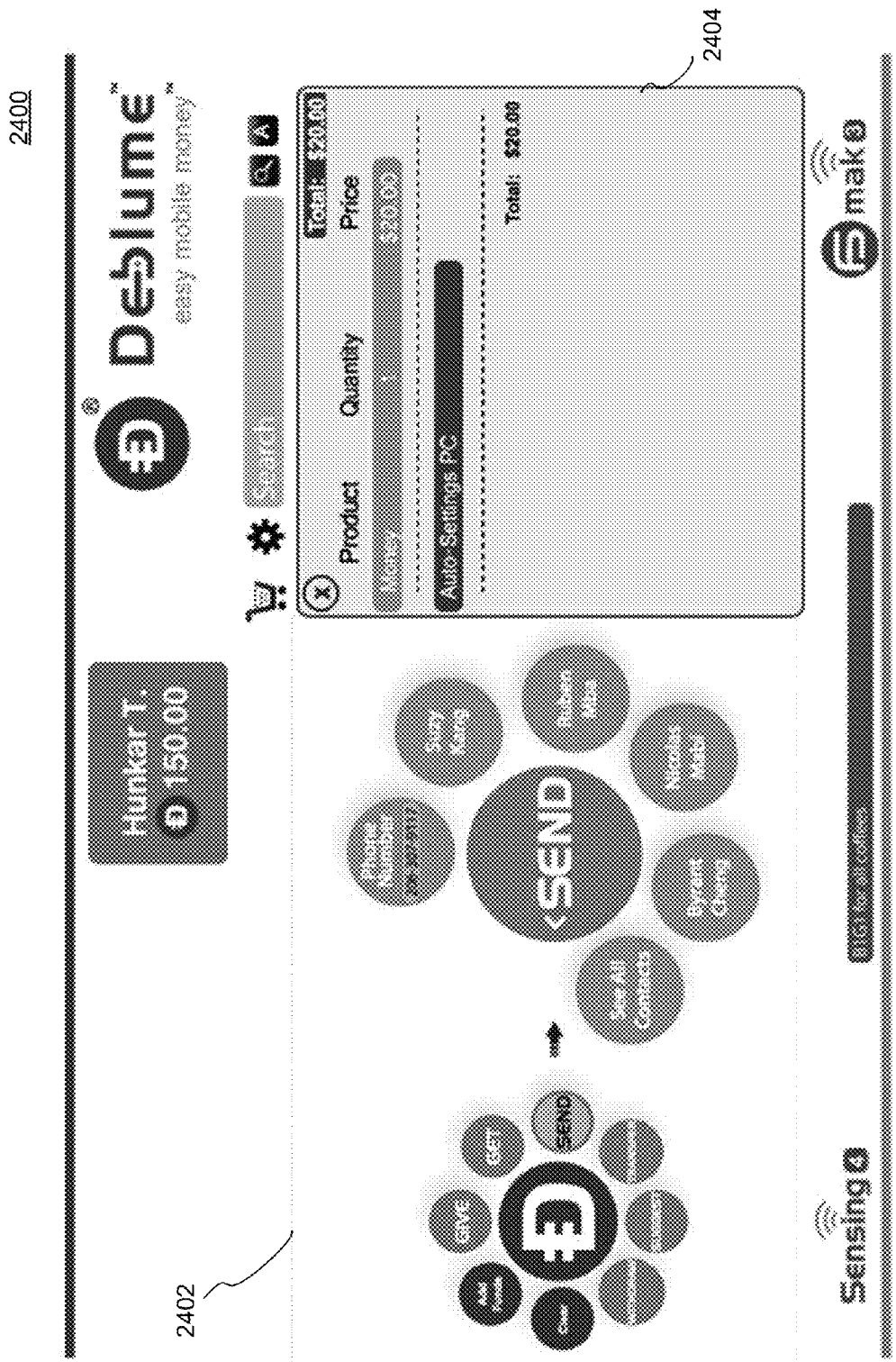
Figure 25:
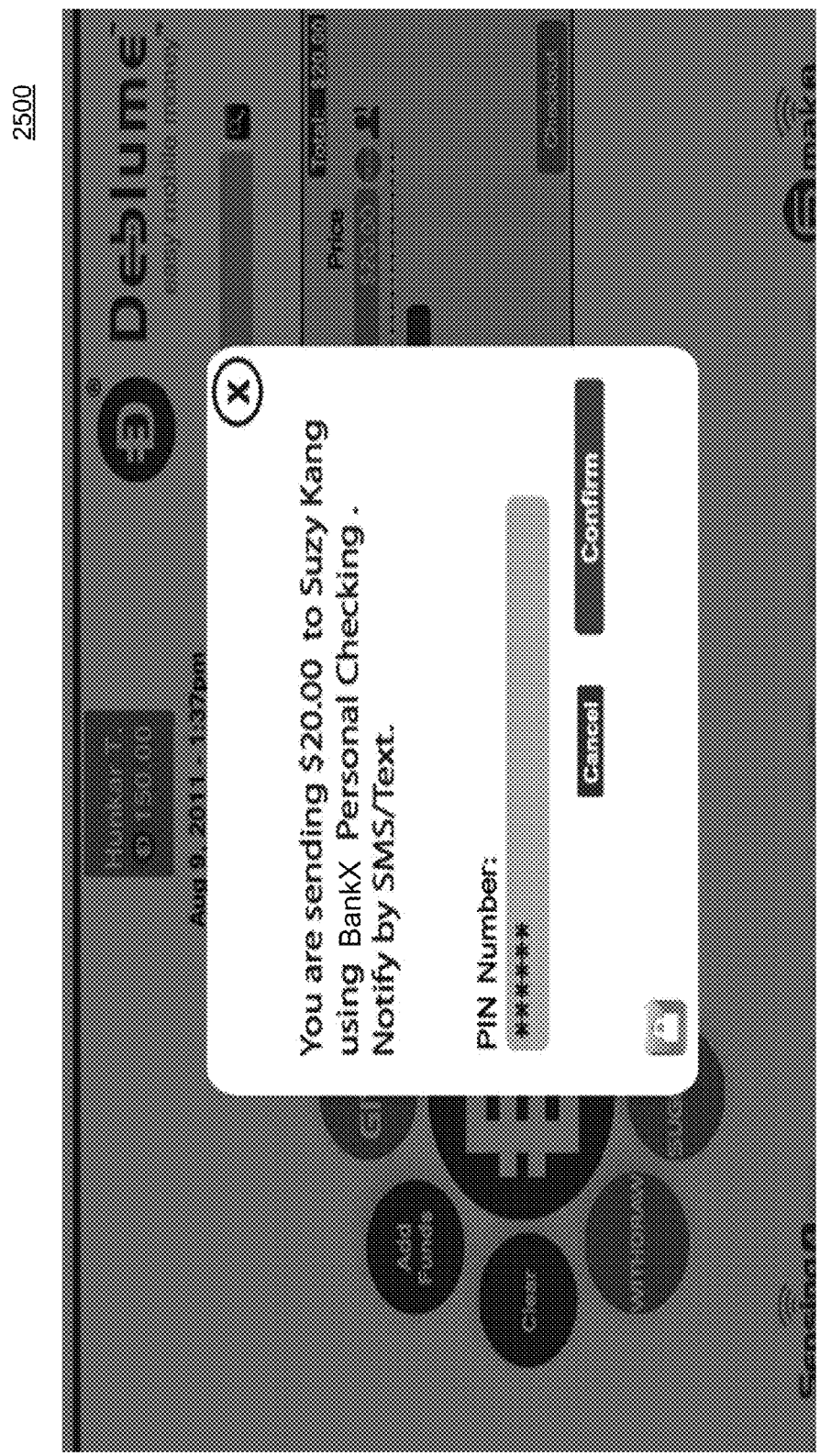
FIG. 25 illustrates a security challenge presented to the user, in accordance with an embodiment.

FIG. 24 illustrates interface 2400, according to an embodiment. Interface 2400 includes menu area 2402 and input area 2404. Interface 2400 may be displayed upon the user selecting the "Send" option from menu illustrated in FIG. 23. The selection of "Send" displays the next menu, with "Send" as the menu title and several send targets arranged as menu options around the menu title. In order to send the already selected $20 (which is displayed in the input area 2404), the user can simply drag-and-drop the corresponding option from the menu into the input area 2404. FIG. 25 illustrates interface 2500, according to an embodiment. Interface 2500 illustrates the display of the security challenge to the user by the transaction server. For example, as illustrated the currently pending transaction may be displayed to the user while prompting the user to enter a security input, such as, a personal identification number (PIN) which has been previously configured in the transaction server.

Figure 26:
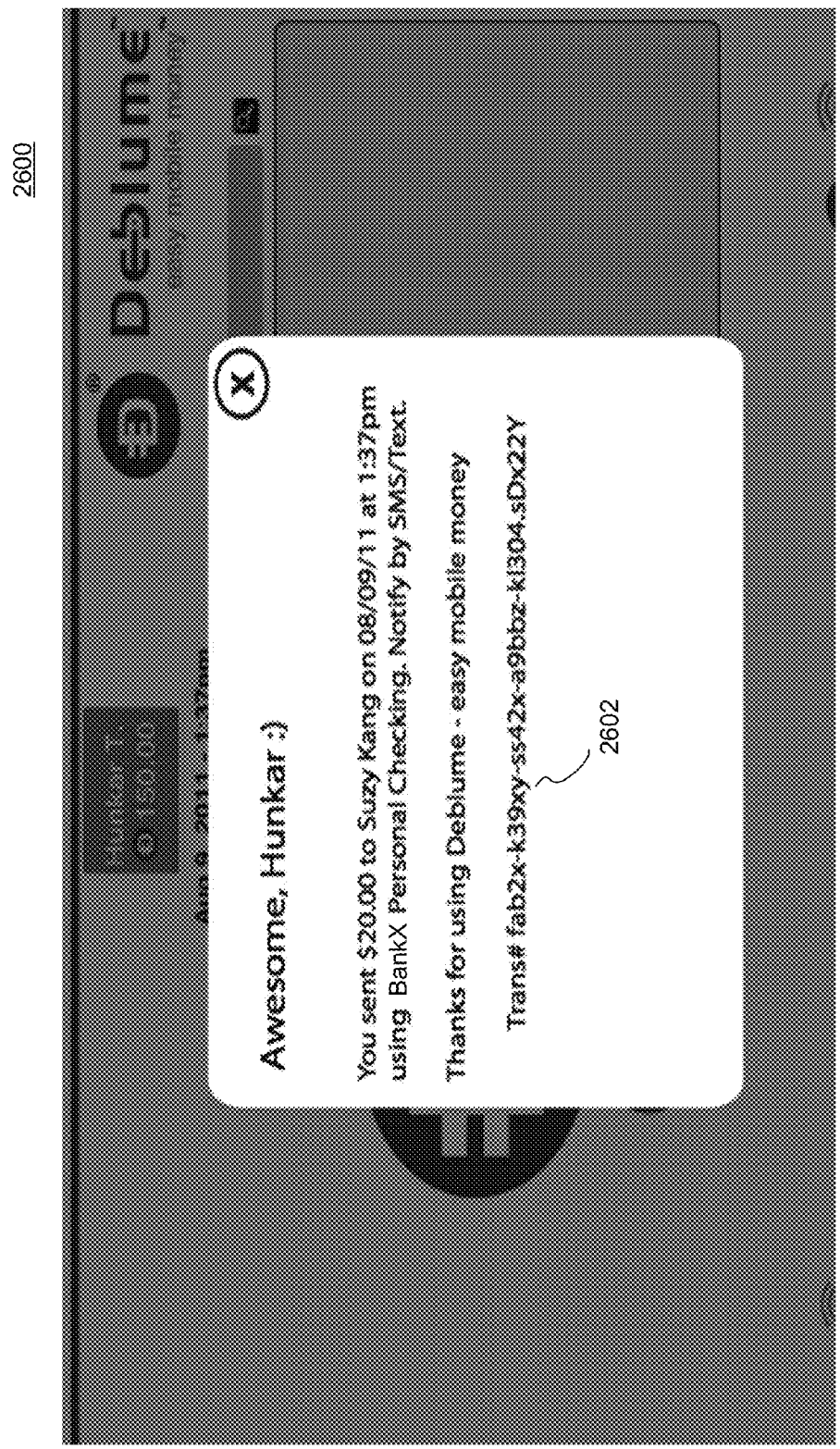
FIG. 26 illustrates a reporting of a transaction status, in accordance with an embodiment.

FIG. 26 illustrates interface 2600, according to an embodiment. Interface 2600 illustrates the display of a transaction confirmation to the user. In the displayed confirmation, the user is informed of sufficient details of the transaction in order for the user to be appropriately informed. Optionally, a transaction identifier 2602 may be displayed.

Figure 27:
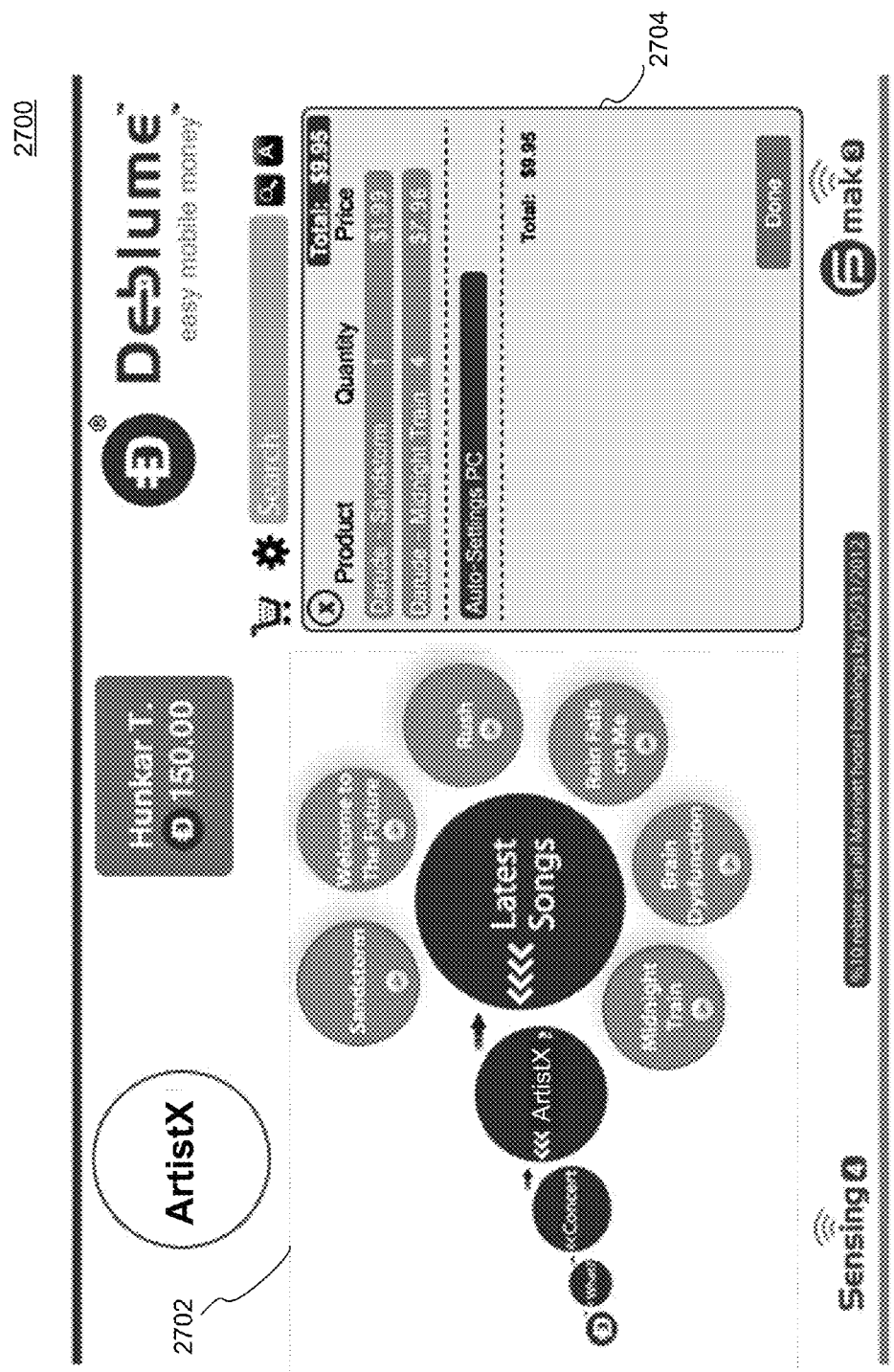
FIG. 27 illustrates a transaction to purchase digital content, in accordance with an embodiment.

FIG. 27 illustrates an interface 2700, according to an embodiment. In the menu area 2702, a trail is illustrated showing the menu options selected by a user in the process of purchasing digital content (e.g. downloadable songs). As shown in the input area 2704, two songs have been already selected by the user for purchase. The menu displayed illustrates other songs that are available for purchase. According to the embodiment, this interface may be displayed to the user subsequent to the user entering a virtual sensed area associated with a concert or scheduled album release of the particular artist.

Figure 28:
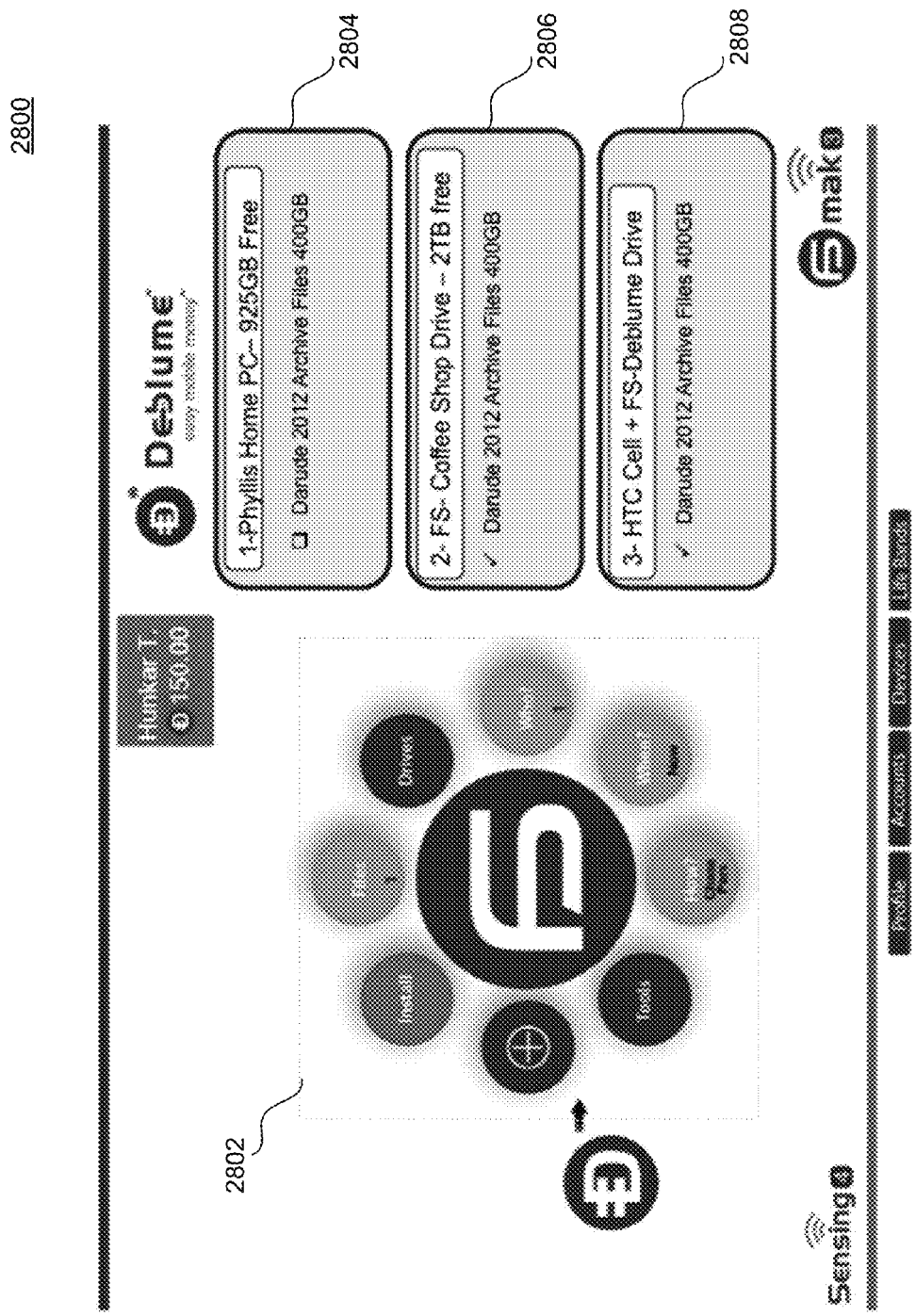
FIG. 28 illustrates example display of using spontaneous storage for content, in accordance with an embodiment.

FIG. 28 illustrates an interface 2800, according to an embodiment. Interface 2800 is an example of an interface that the transaction server can generate when using spontaneous storage for transferring digital content. Menu 2802 illustrates an arrangement of menu choices for setting up spontaneous storage and exchanging digital content. For example, by dragging the "drives" option 2812 to an active space (e.g. 2804-2808) the user may initiate the creation of spontaneous storage. The "Coffee Shop Drive" 2806 may have been created, for example, as a spontaneous storage in a storage facility provided by a coffee merchant. The user may currently be present and may be sensed in the merchant's location. A transaction may transfer a specified amount of funds from the user to the merchant on system 100, and would cause the merchant to allow the creation of a temporary file storage and sharing area on the physical storage available at the merchant. After the setting up of the spontaneous storage on the merchant's storage location, one or more files may be transferred to that spontaneous storage. The files on the spontaneous storage may be provided for various purposes, including for sharing with other users.

Figure 29A:
Figure 29B:
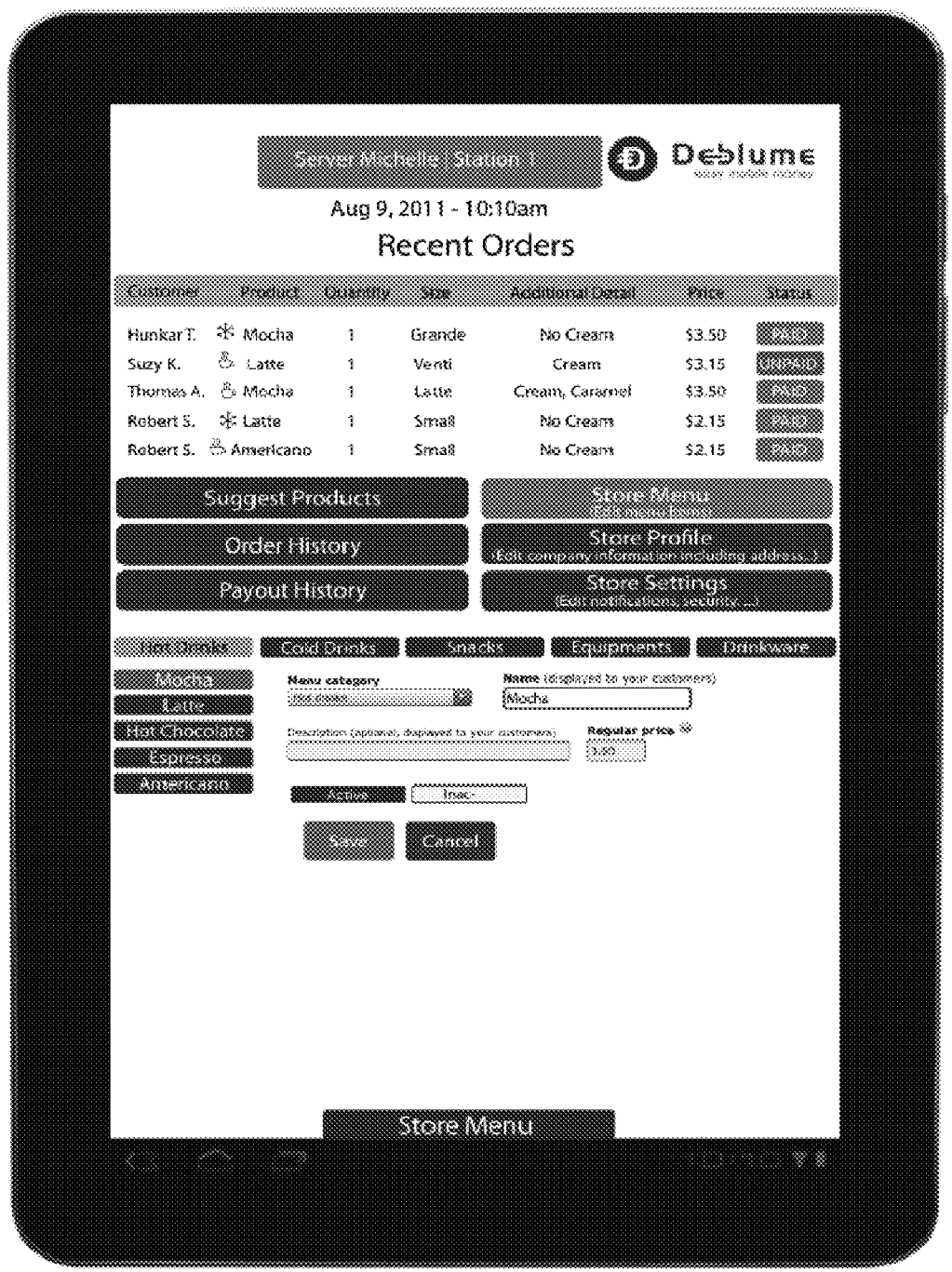
Figure 29C:
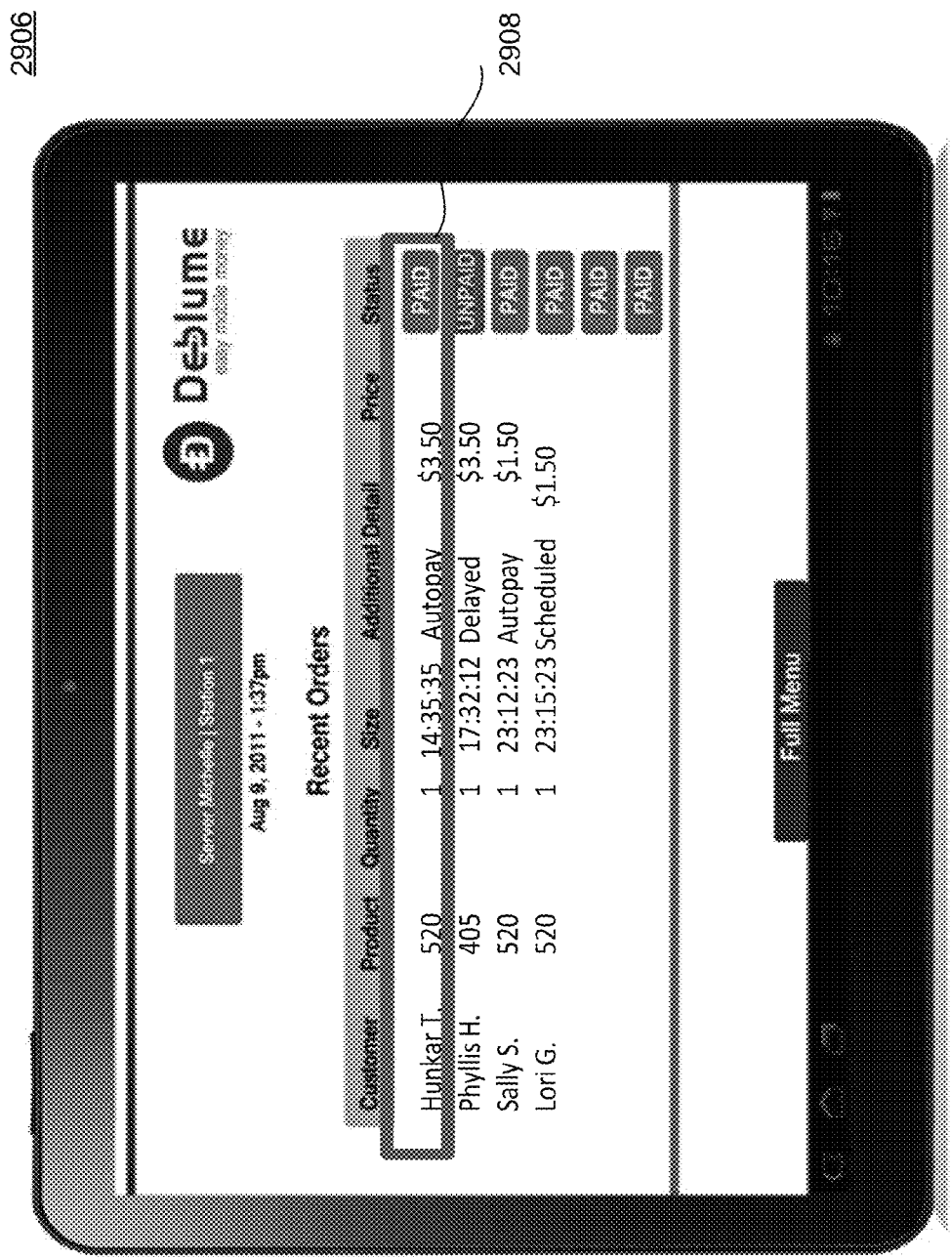
Figure 29D:
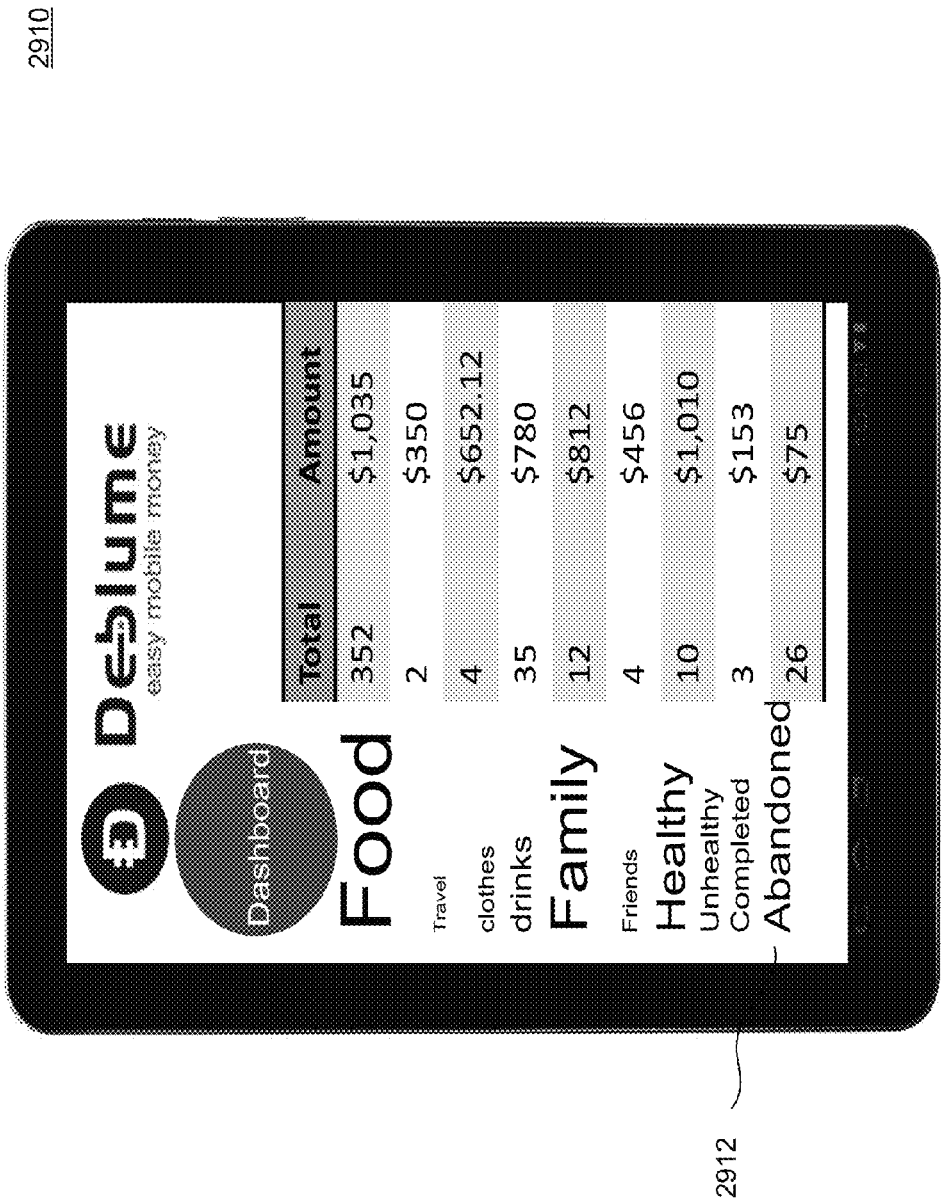

FIGS. 29A-D illustrates interfaces 2902, 2904, 2906, and 2910 respectively for a merchant based on currently pending transactions and a further enhanced dashboard with additional information and options such as suggestions for purchases to be provided to users. Displays 2902, 2904, 2906 and 2910 are examples of merchant dashboards 812-814. As shown in FIG. 29C, display 2906 may include a total users & products purchased view with payment status 2908. FIG. 29D illustrates an example display 2910 where near realtime updates of incomplete or abandoned transactions are also displayed 2912.

In another embodiment of the present invention, components of the present invention described herein are implemented using well known computers, such as computer 3000 shown in FIG. 30. For example, methods 1100-1600 can be executed by computer(s) 3000.

The computer 3000 includes one or more processors (also called central processing units, or CPUs), such as a processor 3006. The processor 3006 is connected to a communication bus 3004.

The computer 3002 also includes a main or primary memory 3008, such as random access memory (RAM). The primary memory 3008 has stored therein control logic 3028A (computer software), and data.

The computer 3002 may also include one or more secondary storage devices 3010. The secondary storage devices 3010 include, for example, a hard disk drive 3012 and/or a removable storage device or drive 3014, as well as other types of storage devices, such as memory cards and memory sticks. The removable storage drive 3014 represents a floppy disk drive, a magnetic tape drive, a compact disk drive, an optical storage device, tape backup, flash disks, solid state digital drives etc. Additionally, or alternatively, computer 3002 may connect to secondary storage such as cloud storage and optical wide area network storage.

The removable storage drive 3014 interacts with a removable storage unit 3016. The removable storage unit 3016 includes a computer useable or readable storage medium 3024 having stored therein computer software 3028B (control logic) and/or data. Removable storage unit 3016 represents a floppy disk, magnetic tape, compact disk, DVD, optical storage disk, or any other computer data storage device. The removable storage drive 3014 reads from and/or writes to the removable storage unit 3016 in a well known manner.

The computer 3002 may also include input/output/display devices 3022, such as monitors, keyboards, pointing devices, etc.

The computer 3002 further includes at least one communication or network interface 3018. The communication or network interface 3018 enables the computer 3002 to communicate with remote devices. For example, the communication or network interface 3018 allows the computer 3002 to communicate over communication networks or mediums 3024B (representing a form of a computer useable or readable medium), such as LANs, WANs, the Internet, etc. The communication or network interface 3018 may interface with remote sites or networks via wired or wireless connections. The communication or network interface 3018 may also enable the computer 3002 to communicate with other devices on the same platform, using wired or wireless mechanisms.

Control logic 3028C may be transmitted to and from the computer 3002 via the communication medium 3024B.

Any apparatus or manufacture comprising a computer useable or readable medium having control logic (software) stored therein is referred to herein as a computer program product or program storage device. This includes, but is not limited to, the computer 3002, the main memory 3008, secondary storage devices 3010, the removable storage unit 3016 and the carrier waves modulated with control logic 3030. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Example Embodiments

Food Facility Sensing Zone Example

FIG. 31A is a block diagram 3100 of the use of the disclosed commerce system in a food facility application, in accordance with an embodiment. FIG. 31A includes one or more user devices (3110, 3115 and 3117), a food facility router 3120, a transaction server 3140, a unique ID global registry 3130, a merchant exchange server 3150, and a food merchant server 3160. Food facility router 3120, transaction server 3140, merchant exchange service 3150 and merchant server 3160 are coupled together via a network 3190. Network 3190 may be a wireless network, a wireline network, or a combination thereof. These elements are described in detail above.

As illustrated in FIG. 31A, food facility router 3120 has an associated sensing zone 3125. Sensing zone 3125 is made up of geofence boundary coordinates such as latitude and longitude (a1,a2;b1,b2;c1,c2;d1,d2). As would be appreciated by a person of ordinary skill in the art, a sensing zone may be defined as virtual and valid for all coordinates within a bounded area. FIG. 20, described above, illustrates an exemplary sensing zone 2004 defined by coordinates A, B, C, and D. Applications can have a merchant sensing zone 3125 defined by a geofence as shown in relation to FIG. 20. Merchants may use a WIFI router (e.g., 3120) to define the boundaries of the geofence, or use near field communications (NFC) or GPS based methods. The merchant sensing zone 3125 may be a portion of the area covered by WIFI router 3120. Merchant sensing zone 3125 may have different boundaries than the physical boundaries of the merchant retail location. For example, in the example shown in FIG. 20, sensing zone 2004 extends beyond the merchant location physical boundary 2006.

A merchant sensing zone (e.g., 3125) may have one or more subsensing zones. The one or many subsensing zones (e.g., 3126, 3127, and 3128) may be utilized to indicate areas of interest within a location such as 'front of store' or 'cashier booths'. A merchant subsensing zone may inherit all or some of the sensing zone setup attributes of the parent merchant sensing zone (e.g., 3125).

In addition, a secondary type of sensing zone referred to as a content access and storage sensing zone may be used within the system. The content access and storage sensing zone outlines areas where a user may use spontaneous device storage for storing content products purchased in a merchant facility (e.g., an album or song).

In an embodiment, router 3120 may have a configuration identifying a sensing zone server. Sensing zone server is not illustrated in FIG. 31A. This embodiment of the router configuration is illustrated in FIG. 31E. The sensing zone server field points to a location that identifies the coordinates making up the sensing zone boundaries for the merchant. The system may be configured to access the sensing zone server data to determine whether a user is within a specific sensing zone.

As would be appreciated by a person of ordinary skill in the art, sensing zone server may be a component of transaction server 3140, unique ID server 3130 or may be a stand-alone server. Sensing zone server, when present, includes one or more geofence boundary tables. An exemplary geofence boundary table is illustrated in FIG. 31G. As shown in FIG. 31G, a sensing zone (e.g., merchant #1) has a set of associated coordinate values. The set of associated coordinate values may be defined by longitude and latitude values. These values provide an outline for the geofence boundary. Although only 4 coordinates are depicted, a person of skill in the art would recognize that any number of coordinates could be used to define the geofence. Additionally, a sensing zone has an associated key and a status. The sensing zone key is used to identify a particular merchant (or entity supplying the geofence). The status indicates the geofence is currently active or inactive.

FIG. 31F is a flowchart 31100 of a method for paying for a product using the disclosed commerce system, in accordance with an embodiment. Flowchart 31100 is described with continual reference to the operating environment of FIG. 31A. Although method 31100 is not limited to that embodiment.

In step 31102, a user enters a sensing zone with a facility. Merchant authorization and validation applications are initiated when a user device such as user device 3110 enters a sensing zone of a facility. The system generally defines a user as "within" or "outside" a sensing zone. FIG. 31B illustrates an exemplary screen shot displayed on a user device. As illustrated in FIG. 31B, the number of sensing zones (physical and virtual) in which a user is currently located is displayed to a user. In embodiments having content storage zones, the number of content storage zones available to a user may also be displayed as shown in FIG. 31C.

In this step, a user (device) is first discovered. Discovery may occur in a number of different ways. For example, a third party GPS based geofencing system may notify the router 3120 or notify transaction server 3140 that a user is detected. Router 3120 may also be configured with software to perform geofence device pinging to recognize that a device has entered the sensing zone. In another technique, a NFC system may determine that a device is within its field. As would be appreciated by a person of ordinary skill in the art, other techniques could be used to discover a user device.

The system must then determine whether a discovered user is within one or more sensing zones. In an embodiment, the router utilizes a geofence boundary table to determine whether a user is within the geofence. In this embodiment, the location of the discovered user device is compared to entries in the geofence boundary table to determine whether the user device is within one or more sensing zones of the merchant.

In this step, the user may be further associated with a subsensing zone such as the "front of the store." The system may then add the attributes of any subsensing zones to the attributes of the main sensing zone. As discussed above, a user device can exist in many physical and virtual sensing zones at the same device. The user may also be identified as being near other devices based on the sensing zones associated with those devices. A table of associations may be developed based on the user device's proximity to other devices or based on the devices existing in the same sensing or subsensing zone.

In a further example, router 3120 may also receive an access request from user device 3110. The access request may include device identifiers including but not limited to serial number, IMEI, cell phone number, MAC address. If the user device also has a ditnum, this data may also be provided in the access request from the user device.

A device may be assigned a security token to identify the device during the access session. If it is a new user and the serial number or other device identifier is seen as 'inactive' due to prior fraud activity, the new user is never given a unique ID (e.g. Ditnum) and further processing or transaction activity is halted for that device In alternate embodiments, merchants may send SMS messages to a user entering the merchant facility.

In step 31104, a determination is made whether the user is authorized and validated to access transaction server 3140. This step may include one or more different authorization and validation determinations. For example, router 3120 may have an access/approve table that is configured to assess the status of incoming traffic in realtime based on the status of the sensing zone. An example of the access/approve table is illustrated n FIG. 31H. In this example, #706 at 17:35:24 was denied because sensing zone 2 was determined to be inactive.

In step 31106, a determination is made whether the device 3110 has an associated unique ID (e.g., ditnum). For example, router 3120 may further have an authentication server defined as an authentication server. The authentication servicer for the router 3120 may be set to identify the unique ID registry server 3120. This configuration is illustrated in FIG. 31H. As illustrated in the example of FIG. 31H, the authentication server setting is set to the unique ID server location (ditnum. deblume.com). If the device does not have a unique ID (e.g. Ditnum) assigned, operation proceeds to step 31108. If the device does have a unique ID, operation proceeds to step 31122.

In step 31108, the user device security token or user device is assigned a unique ID from the unique ID registry 3130. The unique ID registry may further determine whether the device has been given an inactive status by any other sensing zone, merchants or third party fraud registries.

In step 31110, unique ID registry is updated with an association of device 3110 to the ditnum and the status of the unique ID. FIG. 31I illustrates a representative outline of the unique ID registry.

In step 31112, the user is enrolled into the system. This step is optional. Because the user is a new user and is considered "active, the user may be requested by core server 3140 to subscribe by means of enrolling user profile data information such as user ID/password and security challenge information. The security challenge information may be data such as a PIN. Additional enrollment data may be required from the user such as user life choice settings. In this step, transaction server 3140 associates the new user profile data to the unique ID. Transaction server 3140 may also perform an authorization analysis and if the data entered by the user passes the analysis such as profile completeness, the user is authorized and processing continues to step 31122. If the user is not authorized in this step, processing ends and the user may be sent a message indicating the failure.

In step 31122, a determination is made whether the unique ID is inactive. For example, the unique ID may be given an inactive status by a sensing zone, a merchant, and/or a third party fraud registry. If the unique ID is inactive, operation proceeds to step 31124. If the unique ID is active, operation proceeds to step 31126.

In step 31124, unique ID server 3130 notifies core server 3140 of the inactive status of the ditnum and a "user unauthorized" message is transmitted to the router 3120. Router 3120 then stops processing and in effect ignores device 3110 within the sensing zone.

In step 31126, router 3120 is sent a validation message indicating that the unique ID is valid. The validation message includes the unique ID as well as the merchant exchange server location.

In step 31128, the set of content to be displayed is determined. This step includes multiple actions. First, a device interface type is identified for the user device. For example, a ditnum device type may be compared to a table of interface types associated with device types. An interface choice template is then associated with the interface type. Second, the core server 3140 determines the products that the merchant associated with the sensing such has determined as being available to users. The merchant may update these products in real-time so that the assessment reflects the most up to date product offerings of the merchant. FIG. 31J illustrates an exemplary merchant product screen presented to a user. Products can also be sorted by frequency users choose that particular choice so coffee could be replaced as the topmost circle if over time the user picks that choice the most often.

Additionally, in this step, a comparison of user profile with product category types can be made to determine an even smaller subset of products to offer to the user. The system may further customize this set of choices by user prior purchase histories and other profile choices such as outlined in FIG. 31L. The purpose of this weaning of product choices is to get users to their most relevant product choices on a small sized device screen. A set of 'suggest' product offers available from the merchant and other merchants from other sensing zones outside the current sensing zone as shown in FIG. 31M may also be determined and presented to the user. A similar method of weaning the total list of options based on user profile data derives a list of 4-5 suggest options for the user and is populated into the suggest button choice. A set of donation choices may be added to the transaction summary as outlined in FIG. 31K as setup by user in their profile or setup by merchant for users without give settings preconfigured allowing the user to provide an additional give amount per transaction.

In step 31130, the user customized content is rendered in a template capable of being viewed on device 3110 and pushed to the user. FIGS. 31J, K, L, and M are examples of templates presented to the user. If the device type is identified as not supporting smartphone type interfaces, a non-smartphone USSD interactive menu may be presented to the user. FIG. 31D is an example of a non-smartphone USSD interactive menu.

In step 31132, transaction server 3140 receives an indication of transaction requests from the user including transaction to/from, transaction type (product, money, content, money equivalent, etc.), transaction action (e.g., give, buy, get, trade, invest, etc.), transaction notification and security settings.

In step 31134, transaction server 3140 transmits a process transaction request to merchant exchange 3150. A transaction notification may also be sent to the user device including transaction amount and transaction items purchased. The transaction notification may include a challenge to the user such as a PIN challenge. FIG. 31N illustrates a PIN challenge presented to the user.

In step 31136, merchant exchange server 3150 processes the transaction. In this step, the merchant exchange server determines the amount of product(s) purchased. Any merchant offers, discounts or realtime sensing zone based offers related to the total amount are applied. A transaction withdrawal instrument (financial or other instrument user chose to pay for products) for the transaction is then determined. If the withdrawal instrument is the user's online account then the user's online account is debited the amount. If the withdrawal instrument is a user's financial institution, then a withdrawal request is sent to the financial merchant 3170 and the amount is transferred from the financial merchant to the user's online account. If the merchant exchange server allows such equivalents, a user may use a financial equivalent payment amount to be withdrawn from their financial equivalents online account. A combination of the online account funds and the financial equivalent funds may be used to pay for the product. Upon completion of this step, the merchant exchanger server 3150 indicates whether the transaction is paid or unpaid. A transaction would be identified as unpaid if sufficient funds are not available through the identified withdrawal instructions.

In step 31138, a device in the merchant facility may be updated with the user's transaction status of "paid or unpaid." For example, a point of sale terminal such as element 3125 may be updated with the status. Additionally, a separate device in the merchant facility may be notified of the user products purchased and the transaction status of "paid" or "unpaid." FIG. 31O depicts a screen showing total users and products purchased. This screen may be provided to employees of the merchant as a tool during fulfillment of a purchase. In addition, the merchant may also be provided with a robust sensing zone, product, and delivery settings administrative control panel in which to configure or suggest other product offers as well as defining sensing zones. FIG. 31P depicts an exemplary settings administrative control panel. The merchant may use the merchant dashboard provided through the control panel for data visualization of product types sold (food, drinks, goods) and based on that understanding of the days sales, update the settings configurations of suggested products to respond to how users are purchasing that day.

In step 31140, employees of the merchant use the merchant screens to fulfill paid transactions and delivers products to the user. Product delivery may be physical such as handing the product to the user or executing a fulfillment request which may include delivering content to the user.

In step 31142, the user is provided a dashboard screen summarizing recent purchases. FIG. 31Q illustrates an exemplary user dashboard screen.

Grocery Store Withdrawal

FIG. 32A is a block diagram of the use of the commerce system in a grocery store application, in accordance with an embodiment. The operating environment of FIG. 32A includes a user device 3210, one or more of a withdrawal terminal 3215, a transaction server 3240, a unique ID global registry 3230, a merchant exchange server 3250, and a grocery store merchant server 3260. The transaction server 3240, merchant exchange server 3250 and grocery store merchant server 3260 are coupled together via a network 3290. Network 3290 may be a wireless network, a wireline network, or a combination thereof. These elements are described in detail above.

In this example, a user enters a grocery store facility 3205 and is an existing user with an online money account on transaction server 3240. As illustrated in FIG. 32A, the grocery store facility 3205 does not require a sensing zone in order to allow a withdrawal from the online account. A flowchart 32100 outlines operations in performing a grocery store withdrawal of funds using transaction server 3240.

In step 32102 a user A with user device 3210 accesses a set of interface choices and executes a process transaction request for a withdrawal of $20.00 from user A online money account.

In step 32104, user A is presented with a security challenge (e.g. request PIN number) as the security settings for challenge is configured. User A succeeds in correctly responding with the security response (e.g., PIN number).

In step 32106, user A, an associated device 1 (3210) and the user's associated unique ID (e.g. Ditnum) is validated in a Unique ID Server 3230 against a global registry of users and devices committing fraud (fraud blacklist) and if the unique ID passes the validation test, the unique ID is approved for the transaction. The approval is sent to transaction server 3240 to permit the transaction to proceed. If the user's unique ID is blacklisted, transaction processing ends after a notification (step 32108) to user.

In step 32110, transaction server 3240 executes a withdrawal from the user A 3210 online money account. User A is presented with interface choices by transaction server 3240 to determine the type of withdrawal instrument (in this case a choice of 3 withdrawal terminals—withdrawal terminal device 3215, payment terminal device 3217, and ATM 3219) the user wishes to use to withdraw the funds. Additional withdrawal instruments can be to withdraw to additionally enrolled financial instruments (a second checking account, for example) or to an additionally enrolled stock account. In this example, physical withdrawal terminals that are located in a grocery store facility are considered. Withdrawal terminals are not required to be users of the transaction server 3240 or otherwise enrolled on transaction server 3240.

In step 32112, based on user A's preferred withdrawal terminal, a user A device 3210 is used to request withdrawal by coupon code for grocery store scanner 3215, by unique ID transaction number and/or cellphone # to grocery store POS terminal 3217 or by unique ID (e.g. Ditnum) to grocery store ATM machine. Because in this instance the user's cellphone number or cellphone holds data such as a unique ID equal to an amount of money, the prior fraud challenge is important. Delivery completes with the 3215 grocery store scanner allowing the user to use a $20.00 credit or dispense an amount equal to $20.00 from the terminal. Delivery completes with a 3217 terminal when a user is provided a $20.00 POS credit and the grocery store clerk hands the user 1a $20.00 bill. Delivery completes with the 3219 terminal when an ATM has had the proper unique ID (e.g. Ditnum) transaction number entered, user agrees to pay ATM fee for this service and a $20.00 bill is dispensed from the ATM Machine.

In step 32114, the transaction server 3240 reports the successful withdrawal of $20.00 from user's online account and reports to 3260, the grocery store merchant server of the completed transaction as well as to 3250 merchant exchange of the status of 'completed' for the transaction. Additionally, 3250 merchant server and 3260 grocery store merchant perform an immediate 'reconcile' function that matches transactions completed with transactions abandoned and provides an immediate report via email, SMS, social media dashboard or other configured methods of reconcile report settings configured by merchant. This allows merchants to stem the tide of abandoned transactions rather than waiting for monthly reconcile reports.

In step 32116, the transaction server 3240 updates all user A social media dashboards and other reporting and data visualization mechanism with all analytics and other tagging data collected through the course of the transaction.

Toll Booth Example

Figure 33A:
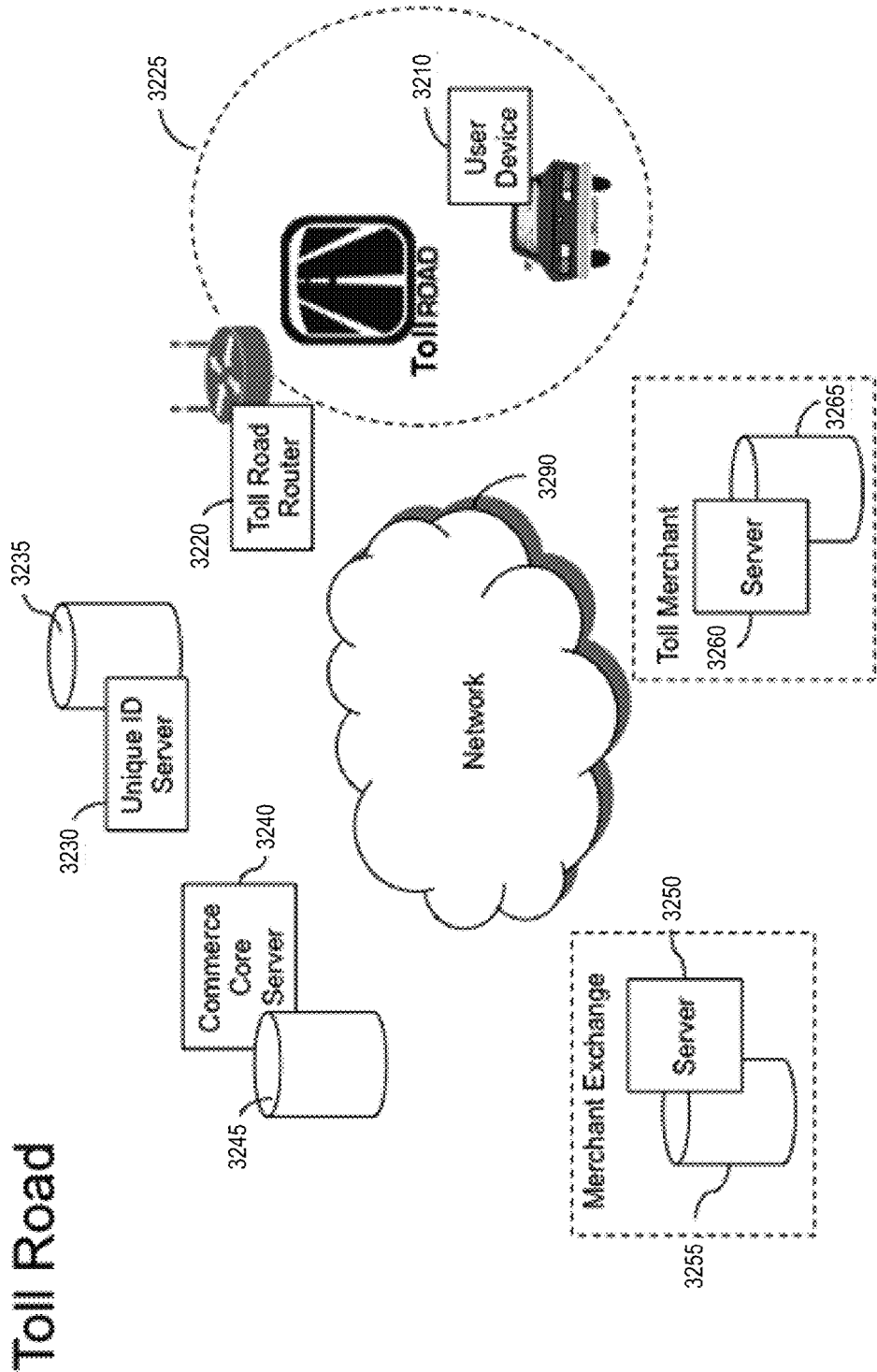

FIG. 33A is a block diagram of the use of the commerce system in a toll road application. In an embodiment, the toll road may have individual toll booths. Alternatively, the toll road may only have car sensing zones in which the toll road system detects a car and obtains toll without the need for physical booths. The operating environment of FIG. 33A includes a user device 3310, a toll road router 3320, a transaction server 3340, a unique ID global registry 3330, a merchant exchange service 3350, and a merchant server 3360. The toll road router 3320, transaction server 3340, merchant exchange service 3350 and merchant server 3360 are coupled together via a network 3390. Network 3390 may be a wireless network, a wireline network, or a combination thereof. These elements are described in detail above.

In this example, a user approaches a sensing zone 3325 on the toll road. The sensing zone may be created using techniques discussed herein. The user has a user device 3310 storing an existing unique ID (e.g. Ditnum) associated with a user. The toll road application is initiated when the user device 3310 enters the sensing zone 3325 of the toll road.

Figure 33B:
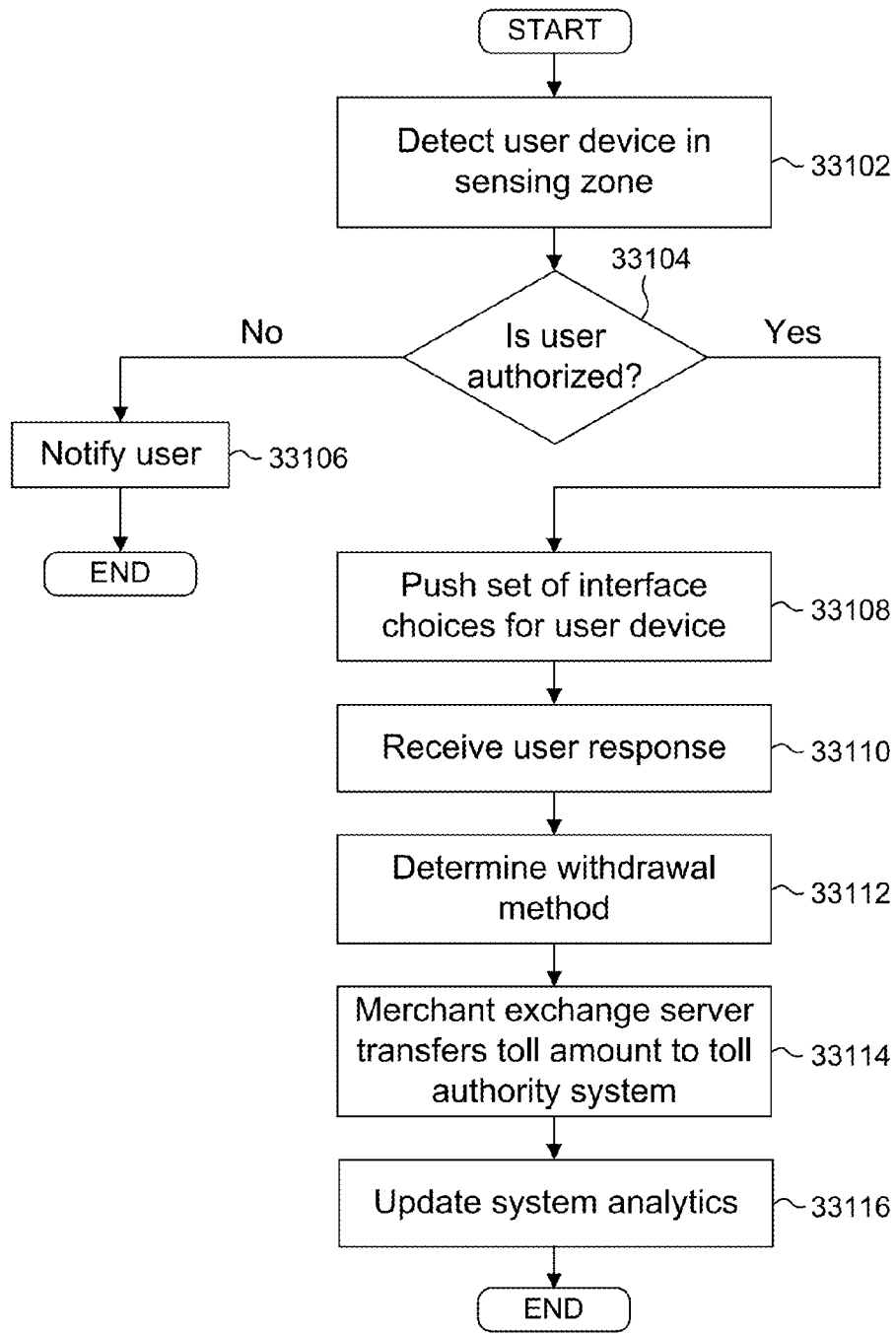

FIG. 33B is a flowchart 33100 of a method for paying a toll using the commerce system. Flowchart 33100 described with continual reference to the operating environment of FIG. 33A. Although method outlined in flowchart 33100 is not limited to that embodiment.

Flowchart 33100 begins in step 33102. In step 33102, a user device 3310 is detected in the sensing zone. In an embodiment, the toll road router 3320 receives an access request from user device 3310. This includes a set of discoverable device identifiers including but not limited to (serial number, IMEI, cellphone number, MAC address or other forms of device identifiers.) Alternatively, the toll road router 3320 may transmit periodic pings to devices in the sensing zone. In this embodiment, the device replies with the set of discoverable device identifiers.

In step 33104, a determination is made whether the user is authorized to access the commerce system. If the user is authorized, processing continues to step 33108. If the user is not authorized, processing ends. For example, a user may receive a message informing them of the authorization failure at a step 33106. For example, toll booth router 3320 transmits a validation message to the unique ID global registry 3330. The validation message includes the unique ID (e.g. Ditnum) received from the user device in step 33102 as well as the merchant (tollbooth) charge. In this step, the unique ID global registry determines whether the received unique ID is valid and authorized for the toll booth application. In this step, user permissions and profile associations may also be checked. For example, the user may have a profile set to autopay toll.

Figure 33C:
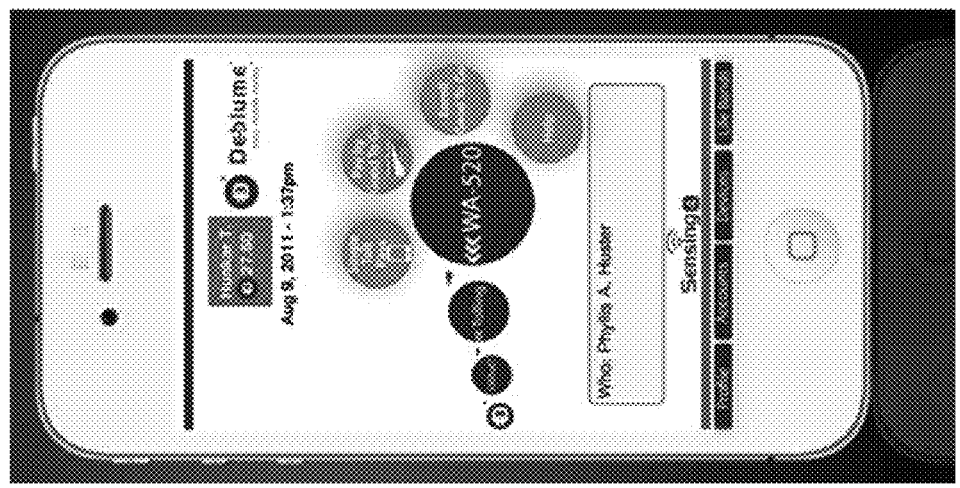
Figure 33D:
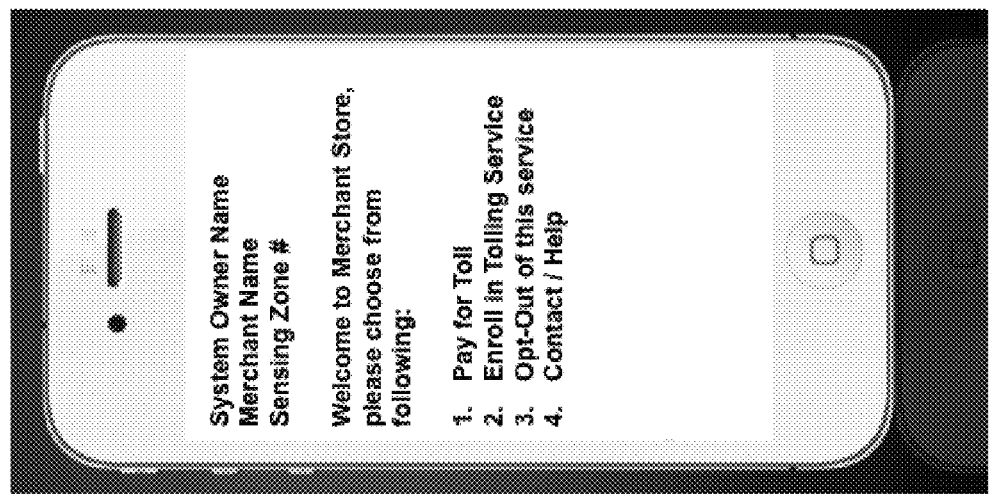
Figure 33E:
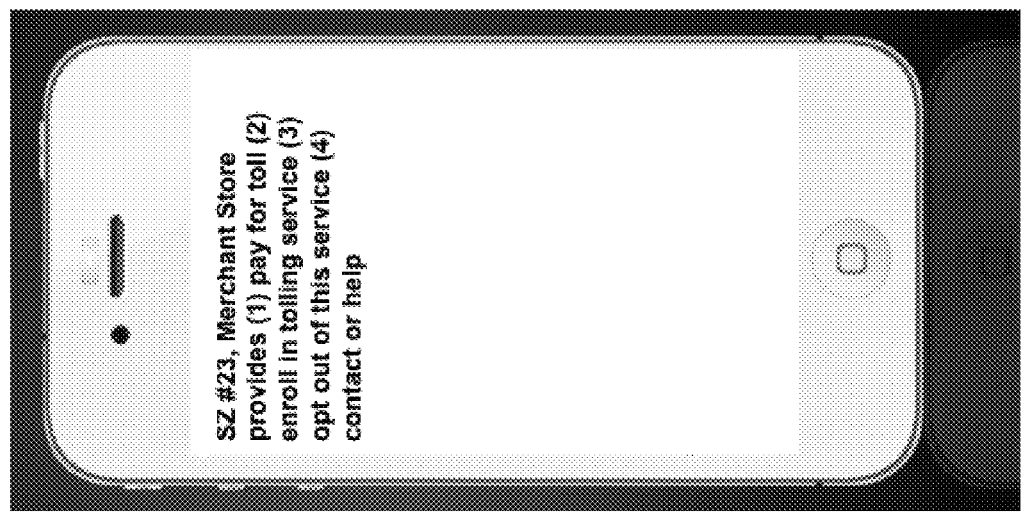
Figure 33F:
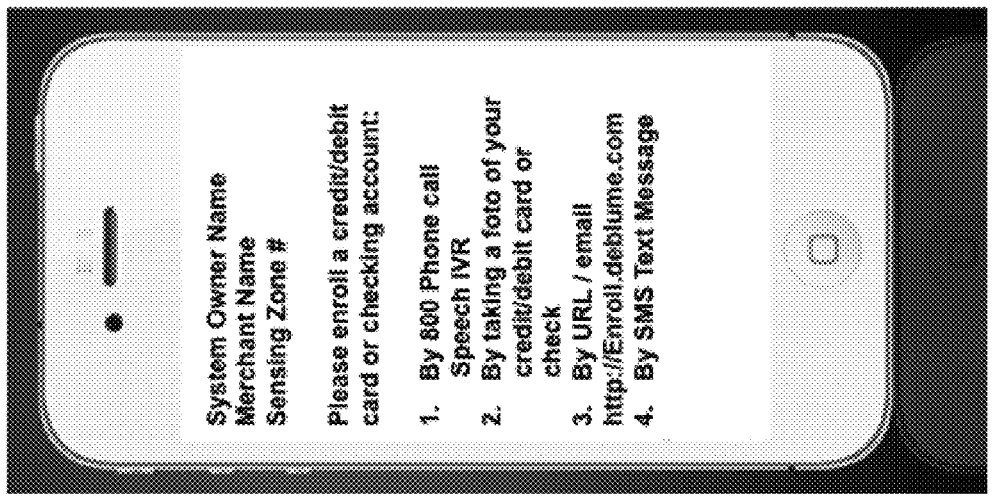
Figure 33G:
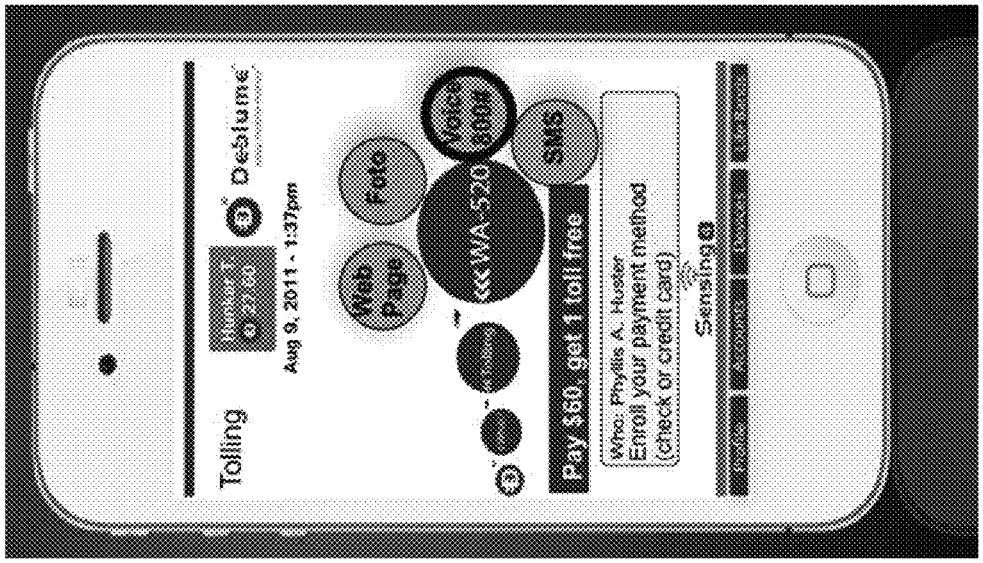

In step 33108, a set of interface choices are pushed to the user device. In an embodiment, the set of interface choices are customized. FIG. 33C illustrates an exemplary interface for the tolling application. To accommodate a non-smartphone user device, the core server 3340 can provide users a USSD standard push that presents a text based menu to the user. FIG. 33D illustrates an exemplary screen for a non-smartphone USSD. In addition or alternatively, to accommodate a non-smartphone user device without a wireless data plan, the core server 3340 can provide users a text message. FIG. 33E illustrates an exemplary screen having an SMS message. In embodiments, the system also allows enrollment of a delivery (financial instrument) to allow for such payment and can provide a menu of choices to quickly enroll a financial instrument to be associated with their user account. FIG. 33G illustrates exemplary enrollment options provided to a smartphone. FIG. 33F illustrates exemplary enrollment options provided to non-smart phone.

In step 33110, transaction parameters are received from the user and a determination is made whether to process the transaction. For example, a determination is made whether the user has sufficient funds for the transaction.

In step 33112, the withdrawal method for the user is determined. Possible withdrawal methods include the user's online account, a merchant exchange pulling account from a financial instrument and depositing it into the user's online account, or from a merchant server pulling the fees from an account on the merchant server. In an embodiment, a second user may agree to transfer money from his or her account to pay the toll for the first user.

Figure 33H:
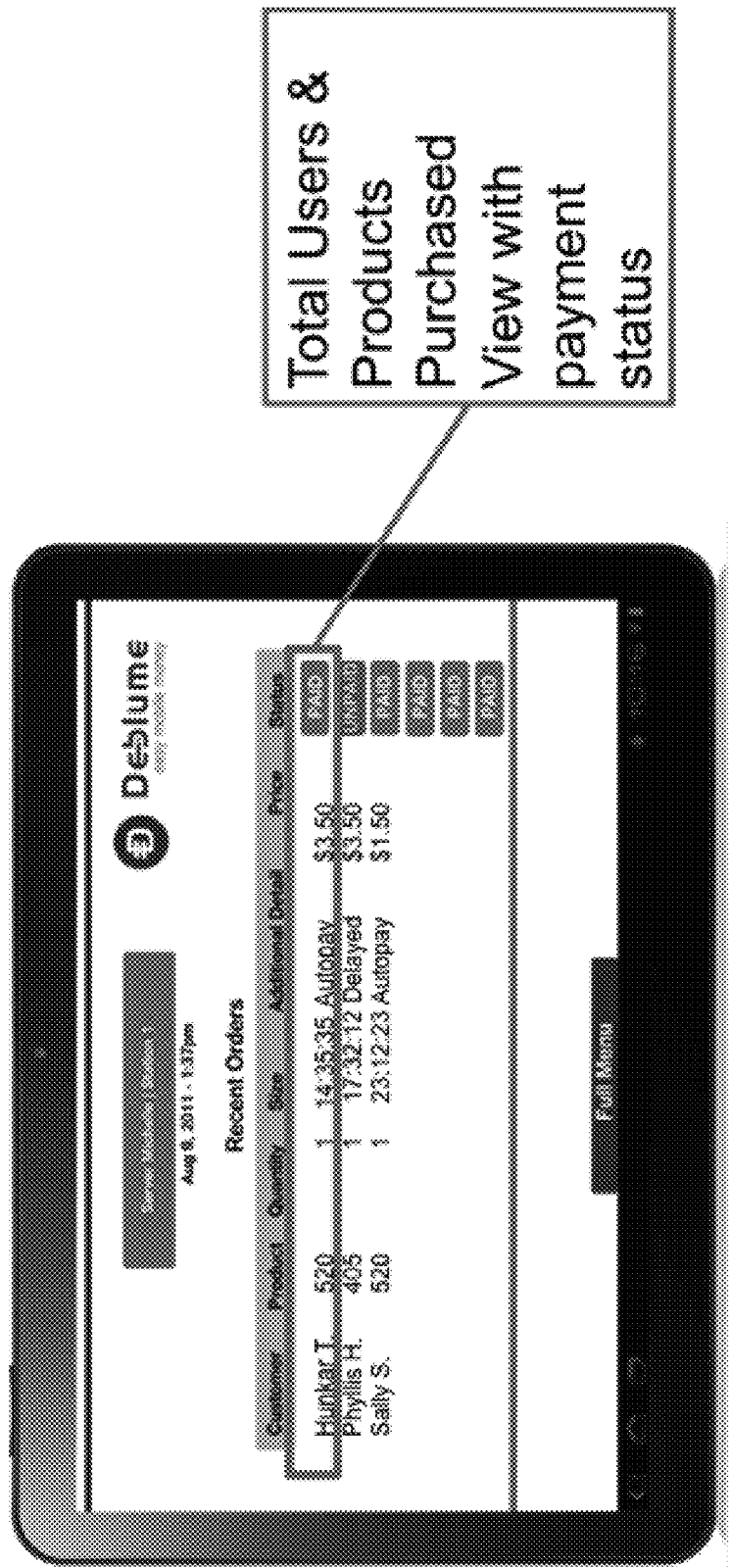

In step 33114, the merchant exchange server transfers the toll amount to a system operated by the toll authority. The transfer identifies the paying party, the toll location, and includes the toll amount. The toll authority system generates a record indicating that the user has paid. For example, FIG. 33H illustrates a screen or report that may be generated for the toll authority listing total users and products purchased.

In step 33116, the system updates analytics for the user. The user may be provided or may later access a screen (e.g., a dashboard) displaying statistics or information related to usage of the system.

Pure Web—Single User Send/Give Money

Figure 34A:
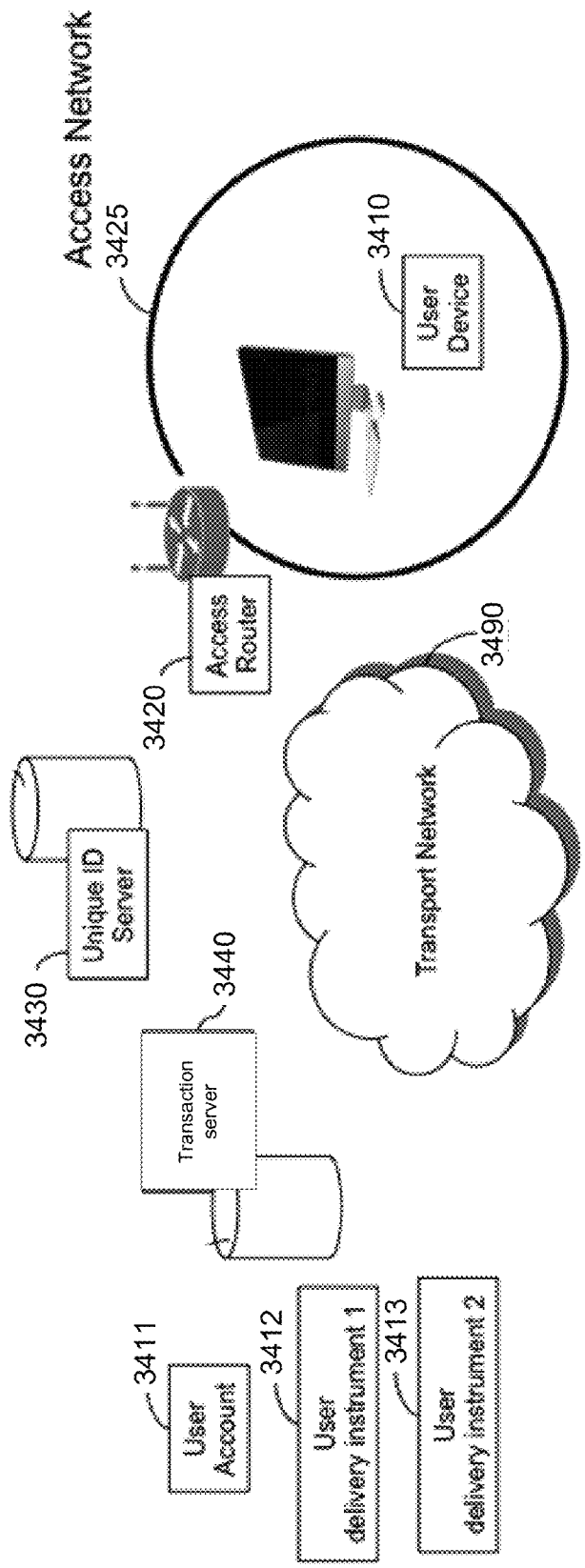

FIG. 34A is a block diagram of the use of the commerce system in a single user funds transfer application via the web. FIG. 34A includes a user device 3410, an Internet access router 3420, a transaction server 3440, and a unique ID global registry 3430. Transaction server 3440 includes a user account 3411 and one or more funds delivery instruments (e.g., instruments 3412 and 3413) associated with the user. The access router 3420 and transaction server 3440 are coupled together via a network 3490. A user accesses an application (web site) on a public data network such as the Internet using device 3410 through an access network 3425. For example, a user may enter a uniform resource locator (URL) such as http://www.deblume.com. Network 3490 may be a wireless network, a wireline network, or a combination thereof.

After accessing the commerce system web page, the user receives a page of interface choices. FIG. 34B illustrates an exemplary user interface presented to the user. In embodiments, the page includes a wheel of possibility (a list of choices rendered based on user's ongoing use of the system), a top choice, which is the choice that the user picks more often over the timespan of using the system (e.g., money in FIG. 34B). Finally, the page includes an active space. A user is permitted to drag and drop choices from the wheel of possibility onto the square active space. This active space interface differs from standard drag and drop web interfaces because the active space itself is configured with a set of programs and behaves differently depending on the user type accessing the page. Additionally, the active space can act as a kind of web commerce operating system, spawning additional applications once an object is dropped into the space. One other unique feature of the active space is that it appears to be a part of the HTML page but for HTML limitations is really a box floating above the page that is much more feature rich and capable of real-time application response capabilities such as sending an SMS or making a call as the user drops items in the active space.

For example, if the user has a 'very high' level of security set in their profile, then the active space will call them anytime someone is even accessing their active space. For this reason, the active space extends beyond normal HTML page functionality to a smart box that can behave in the same real-time way an operating system operates. The active space can also change based on which sensing zones the user is 'within', meaning certain active space functionalities expose or hide based on the user's sensing zone. In FIG. 34B, the user is located in four 'virtual' non-geographic sensing zones. Therefore, the active space of FIG. 34B is customized to only those 4 sensing zone functions. If, for example, one of those virtual sensing zones was a sensing zone for merchant A, then an item could arrive in the purple merchant offers bar below stating buy one get one free songs from the latest released album offered by the merchant.

Additionally, the active space allows one page of many interface choices to be quickly chosen. For example, a user may grab the smaller button "who" after money is chosen so they can determine who the money will be sent to. In this way the user is given hierarchical navigation ability in a semantic all available at one time way. This eliminates wasted hierarchical navigation and speeds the time a user takes to populate a commerce transaction choice.

For example, a user may drag money into the active space. In response, the user is provided a set of predetermined money amounts and/or a field to enter a unique exact money amount to transfer. FIG. 34C illustrates an exemplary money screen displayed to a user. For example, the user selects an amount and a transaction action to perform on the active space items loaded. For example, the user may select to send $20.00. FIG. 34D illustrates an exemplary screen displayed to the user. The user is next prompted for an indication of the recipient for the transfer. In embodiments, the user can drag as many recipients with any amount of people allowed to be included in the sending function. Additionally, the user is presented a transaction action next to the transaction item (green send next to line item) and the number of users wishing to send to (this number can be 1 or many), adding a line item functionality to line items in the active space. FIG. 34E illustrates this screen.

In addition to line item functionality, the system is configured to allow many robust transaction action choices such as giving, getting, sending, transferring, and withdrawing or suggesting money functions. For example, giving money can be setup to give $20.00 to a daughter every Friday as a weekly allowance. The transfer action can be scheduled to happen where it transfers money from one delivery instrument (financial institution) to another. Additionally, a "get" transaction action can allow one party to request money from another party (e.g., a child to request money from a parent). The add funds or withdraw action can be configured to work with standard legacy financial tools for such things including coin deposit machines, ATM machines or grocery store scanners.

In embodiments, a user can spawn as many multiple active spaces and request the same transaction actions be applied to all such instances of the active space (see the #1 below the active space and next to the shopping cart icon). This allows users to very quickly perform complex and multi-tiered funding transfers and allowing the active space to organize the order and priority of the aggregate total transaction actions (for example, first get money from a secondary user and then when that part completes continue to send the money to a $2^{nd}$ delivery instrument).

Upon the user's choosing the 'Done' button within the active space, the active space processes the transaction actions the user requested. In this case, the user had a pin request security level set in her profile and was then sent a pin challenge request before the transaction proceeds allowing a layer of security not otherwise included in most commerce systems. Notifications may include the transaction number (e.g., ditnum) enabling faster customer service if the transaction fails or if the user is the victim of fraud. FIG. 34F depicts an exemplary notification screen.

Because the user can enroll many different delivery instruments, the user is given a flexibility of transferring funds that single financial institutions cannot give the user. For instance, a user can send money from their checking account to their investment money market account.

Gas Station Autopay with Loyalty Discount Example

Figure 35A:
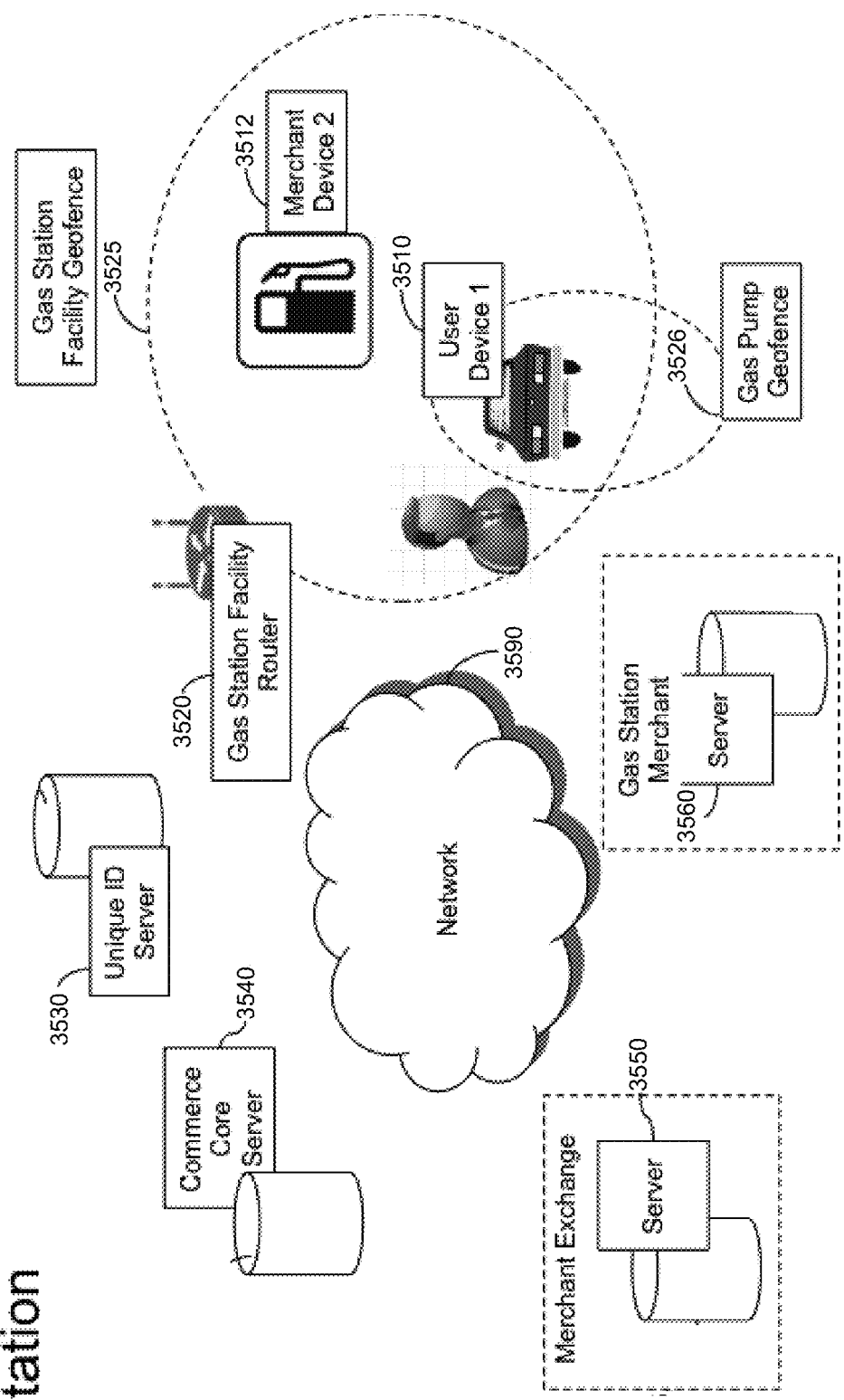
Figure 35B:
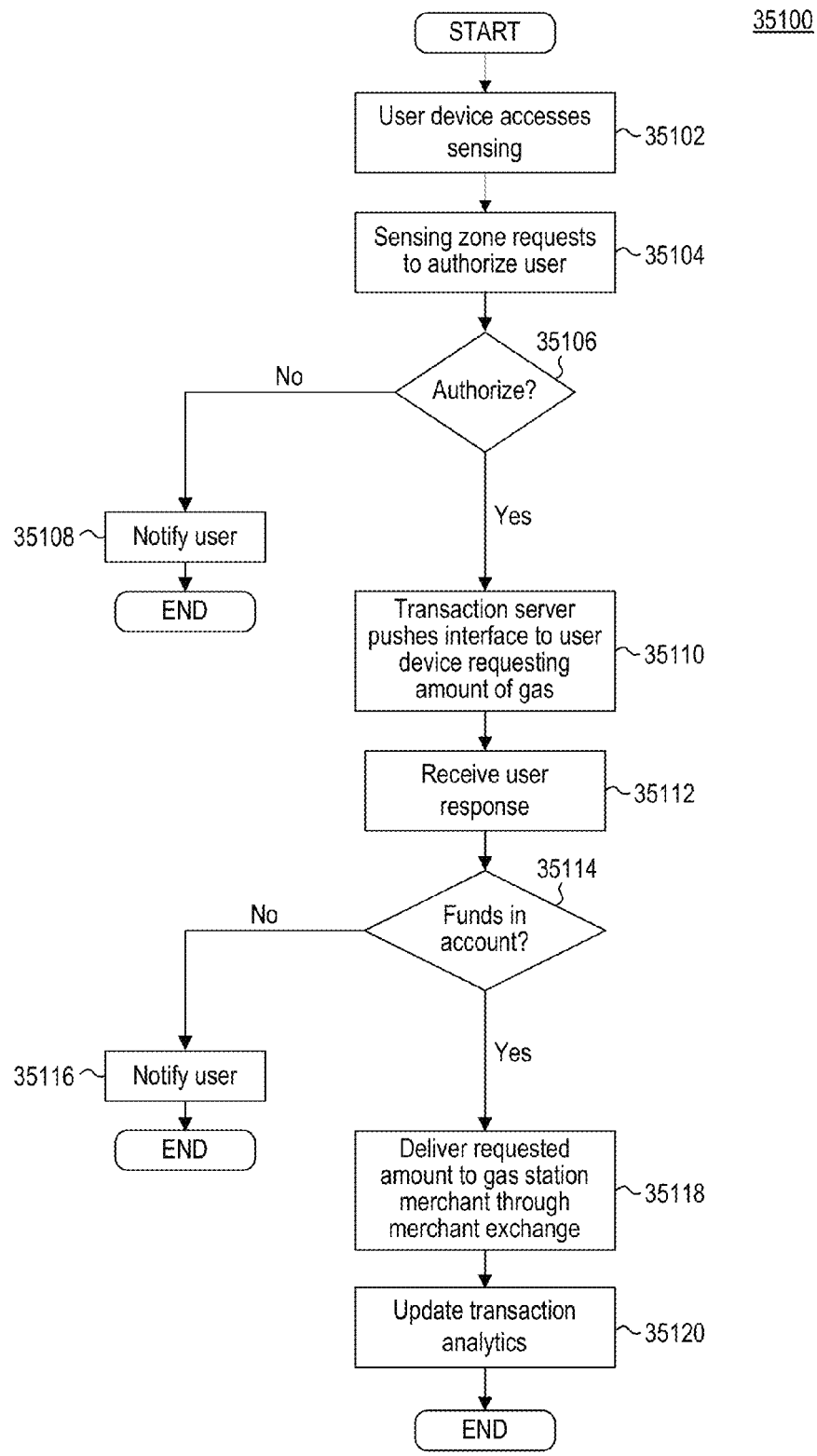

FIG. 35A is a block diagram of the use of the disclosed commerce system in a gas station autopay with loyalty discount application, in accordance with an embodiment. The operating environment of FIG. 35A includes a user device 3510, an Internet access router 3520, a gas station facility sensing zone (geofence) 3525, a transaction server 3540, a unique ID global registry 3530. A merchant exchange 3550 communicates with the gas station merchant 3560. Access router 3520, transaction server 3540, unique ID server 3530, merchant exchange 3550, and gas station merchant 3560 are coupled together via a network 3590. Network 3590 may be a wireless network, a wireline network, or a combination thereof. These elements are described in detail above.

The sequence of actions is outlined in the flowchart 35100.

In step 35102, a user device accesses a gas station facility sensing zone 3525. In step 35104, sensing zone 3525 or gas station facility router 3520 requests transaction server 3540 to authorize the user and/or user access device 3510.

In step 35106, transaction server 3540 and unique ID server 3530 operate to authorize the user and/or user access device 3510 for the requested transaction.

If the authorization fails, then in step 35108 the user 3510 and/or gas station facility router 3520 are notified of the authorization failure, and the processing is ended.

If the authorization is successful, then in step 35110 transaction server 3540 pushes an interface to the user access device 3510 requesting the amount of gas to be purchased. The interface, as illustrated in FIG. 35C, may include the amounts of the last gas transaction, amounts of any loyalty credits to be applied to the current transaction, and an input field (or other selection option) for the user to indicate the amount of gas to be purchased. If user 3510 has pin challenge notification off, the screens delivered can be 2 total screens. The first has the last gallons filled amount auto highlighted (thick line around interface choice 25 for example for 25 gallons last time the user filled up at this gas station) and if the user has enrolled a loyalty credits account with their online account profile, they will be provided an automatic loyalty credits message in the designated 'merchant offers box outlined "apply 0.10 per gal credit" below. When a user in a hurry makes a single click, that 'last fill amount' automatically moves to the active space, making it a one click transaction for a user with all profile elements and defaults previously setup.

In step 35112, the user response is received, and the transaction verification may be performed in association with the user and/or user access device 3510 unique ID.

In step 35114, transaction server 3540 determines whether sufficient funds for the transaction are available in the user's online money account. If no, then the transaction is terminated after a notification to the user and/or gas station (step 35116). If yes, then at step 35118, transaction server 3540 delivers the correct amount of funds from the user's online money account including the 0.10 per gallon loyalty credits discount to the gas station merchant 3560, through the merchant exchange 3550. A transaction notification, such as that shown in FIG. 35D, indicating the total amount of the transaction cost, minus the amount of loyalty credits applied.

In step 35120, the transaction analytics are updated with the transaction data.

Parking Lot Autopay

As illustrated in FIG. 36A, a user's car having a user access device 3610 may be parked in a parking space equipped with a sensing zone 3625. Sensing zone 3625 may be provided by a parking facility router 3620. A network 3690 interconnects parking facility router 3620, transaction server 3640, unique ID server 3630, a merchant exchange 3650, and a parking merchant server 36110. The user may purchase parking time from a parking merchant 36110. A sample screen, when a user's parking fee expires could be as follows in FIG. 36B below. This illustrates the intelligent nature of the transaction server 3640 in union with the sensing zone 3625 and the user device 3610 which may roam beyond the geofence 3625 but still continue to have interface choices or ongoing function services beyond that sensing zone.

Content Transfer

Figure 37B:
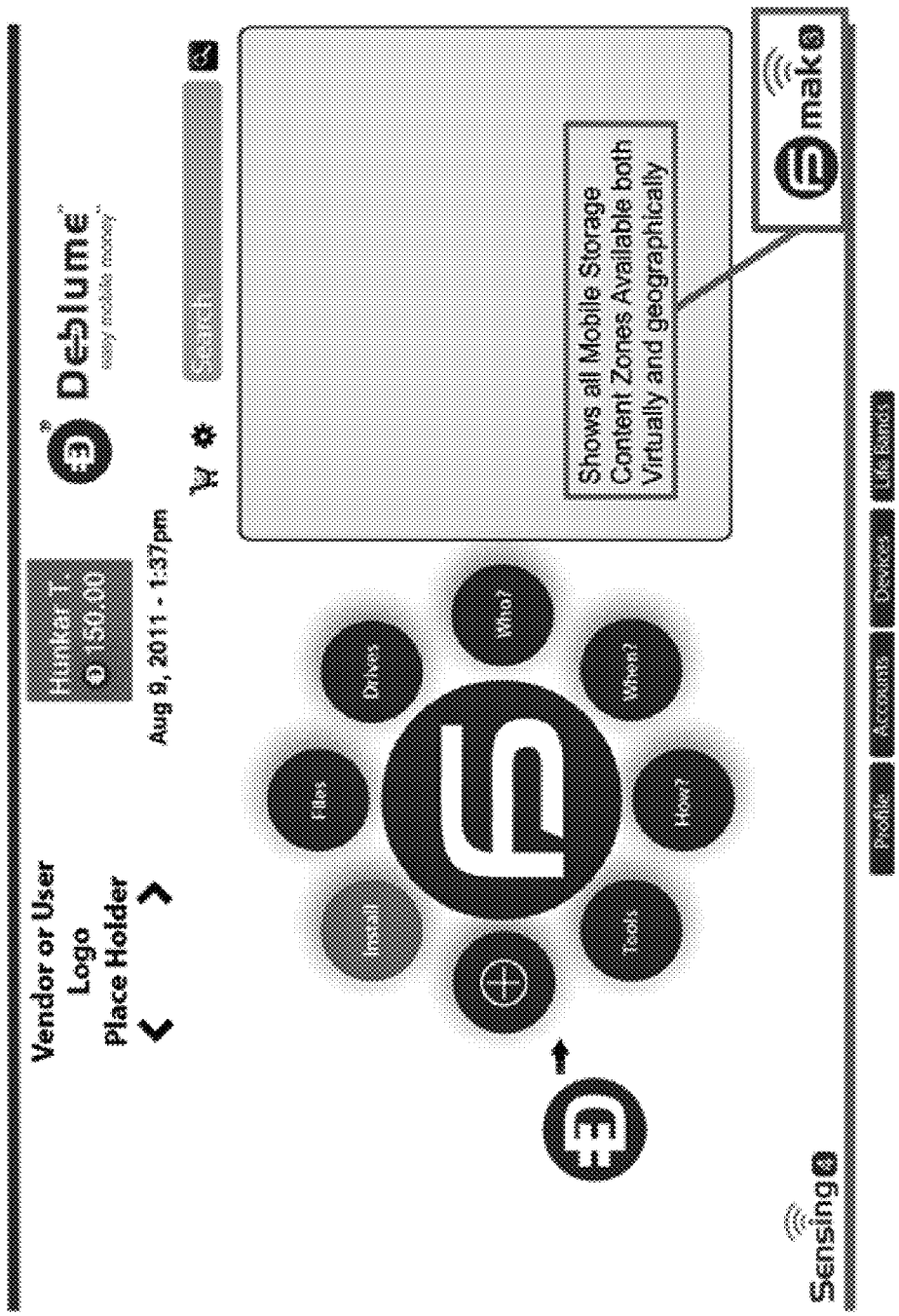

In the operating environment shown in FIG. 37A, user devices 3710 and 3715 are within a sensing area 3725 defined by a router 3720 in a coffee facility. A network 3790 interconnects router 3720, transaction server 3740, unique ID server 3730, content core server 37110, and one or more remote content servers 37200 and 37300. A user recognizes that she is within three different mobile storage content zone when the #3 by the FileSmak™ or FSMak™ icon on the bottom right of the user device 3719 and/or 3715 that is seen as shown in FIG. 37B. This Fsmak icon outlines all 'mobile spontaneous cloud storage' available both geographically and virtually to the user.

Figure 37C:
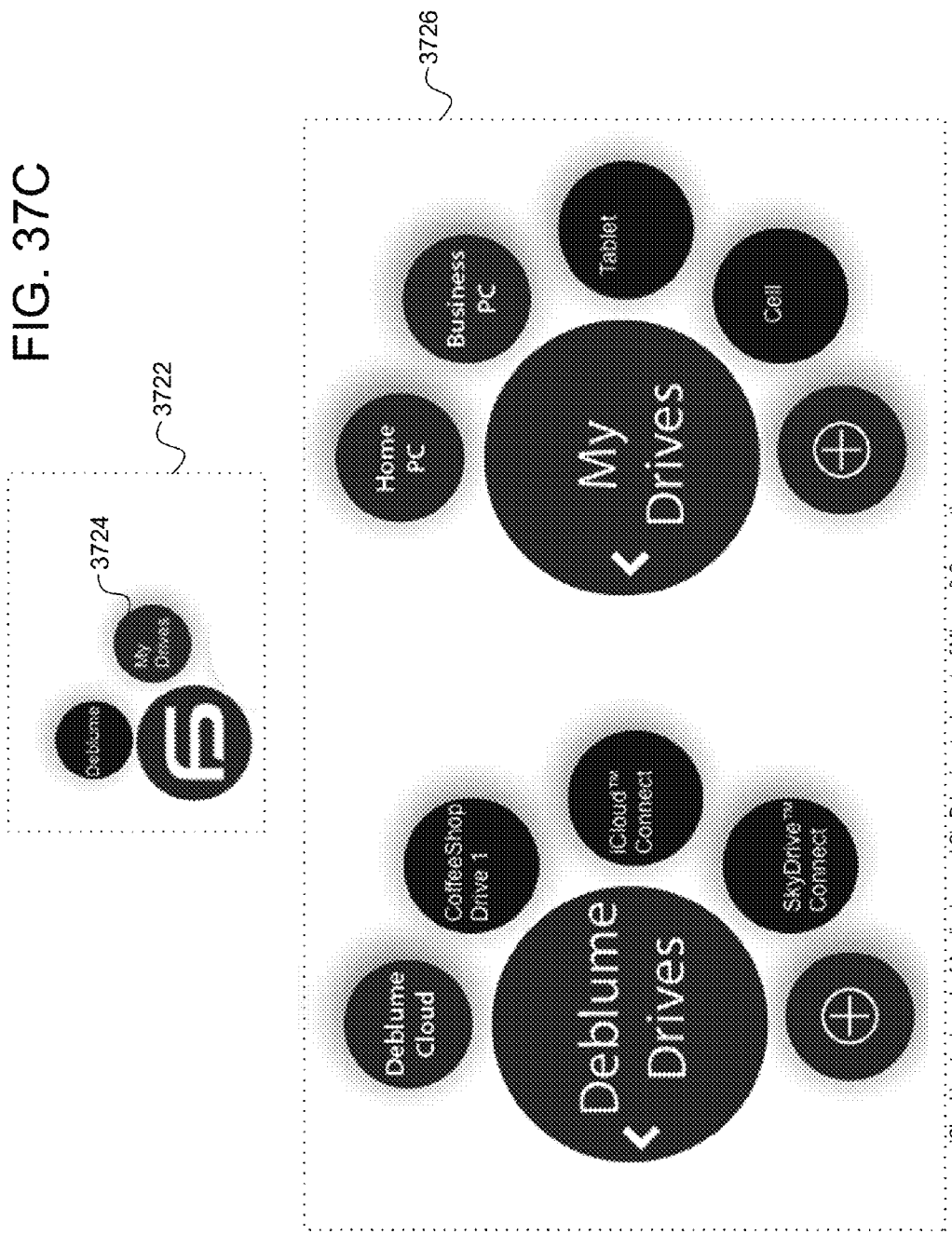

When the user clicks the DRIVES button 3724 in a menu 3722 as shown FIG. 37C, another display 3726 showing the two kinds of accessible drives is displayed. As illustrated a user may have access to both her own personal drives, and also to one or more cloud storage based drives.

Figure 37D:
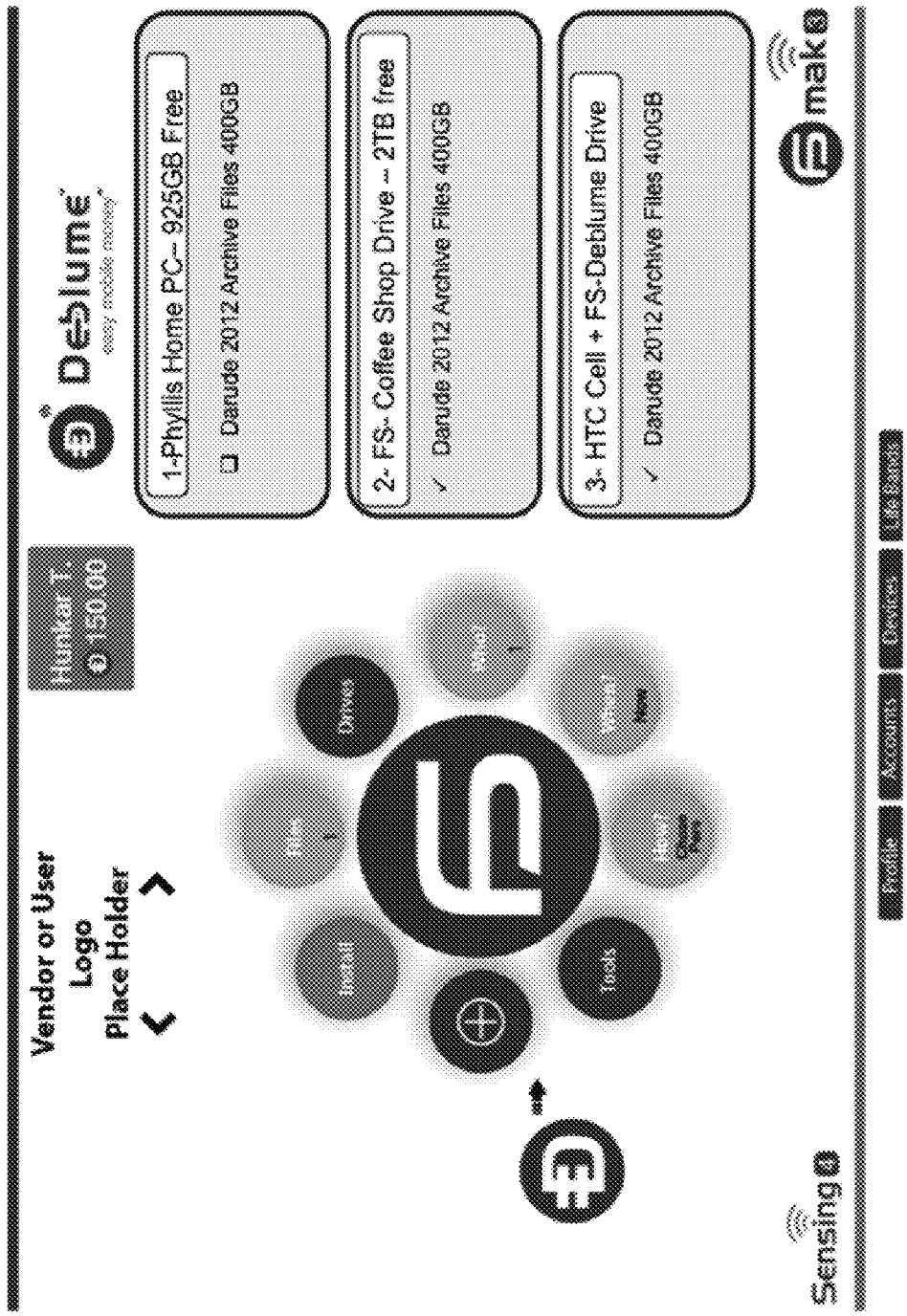

If two users with dissimilar cloud storage vendors want to share a large volume (e.g., 400 GB) of concert data from their favorite musician but have access only to minimal storage on their devices 3710 and 3715 within the coffee facility, they can use the mobile spontaneous storage enabled by the content storage zone. FIG. 37D shows how dragging a volume of content from the "Phyllis Home PC" enables it to be stored on the FS-CoffeeShopDrive, and based on sharing setup between this drive and a third user, with an HTC Cell, the same data is automatically copied to the FS-DeblumeDrive, making it possible for the two users to share a volume of data that their personal devices cannot manage, but having access on those device to home or other cloud based devices and an ability to easily navigate and move files using their local device which is virtually mapped to access these additional content storage locations.

Figure 37E:
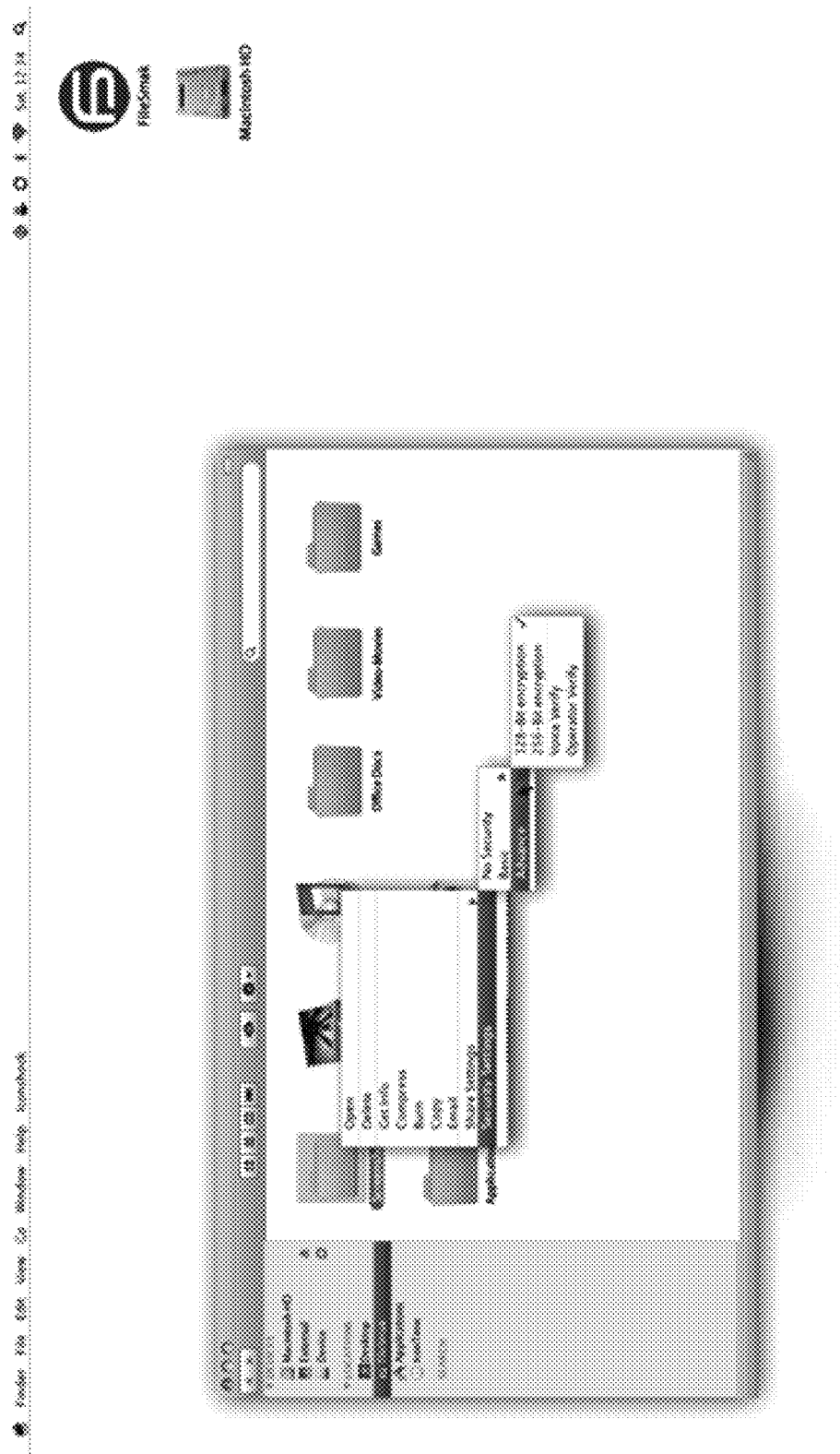
Figure 37F:
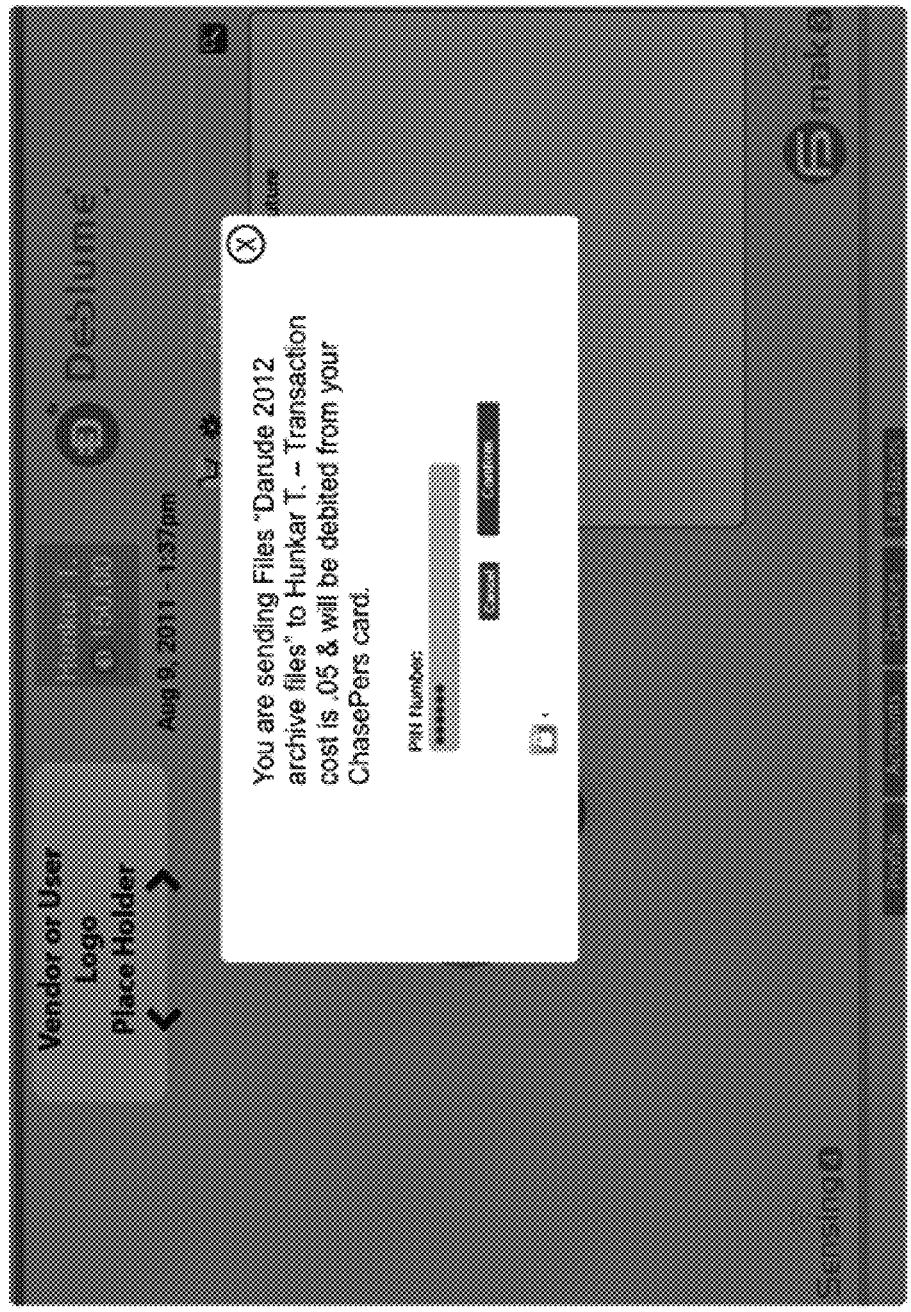

If a user wants to encrypt such data, an interface is provided whereby the user can easily choose the level of encryption desired for such content, as shown in FIG. 37E.

In order to show that such transactions may involve paying for a service, such as a $0.05 per transaction fee for having access to this mobile storage, the outlined transaction system can merely add a content payload to the transaction as defined by the user dragging and dropping items the user desires into the active space and clicking a "Done" button. This email shows that both the content and the payment of 0.05 for the transaction can be combined into a single transaction and the user is given notice that the content storage has been activated and the fee has been charged.

Content Purchase and Automatic Download

In another example application, a geographic sensing area and a non-geographic sensing area can interact to provide services to a user. In the operating environment shown in FIG. 38, a user clicks a button on a user device 3810 to automatically open the car door as the car rests within a geofence 3825 that could be configured in a user's home driveway. A user home router 3820 may be configured to provide the geofence 3825 over the user's home driveway. This same click could also trigger the automatic purchase of content located from remote content server 38200 because the user may have been configured to also be in a virtual 'non geographic' sensing zone of a music artist and chooses to auto-purchase all the artist released music immediately upon that artist releasing the music. As an example, if the artist released an album overnight and the user gets in his car in the morning to leave for work, and that single click opens the car door and triggers the movement of the content to the content core server 38110 coupled to the user device 3810 via user profile settings. The music can then be played using an auto music device 3812. Network 3890 interconnects user home router 3820, transaction server 3840, unique ID server 3830 content core server 38110, remote content server 38200, merchant exchange 3850, and other interacting network components. Similar applications apply, for example, to automatically checking in at a hotel by arriving near the lobby and then going straight to one's hotel room and using the geofence associated with the door, allowing the transaction server 3840 to trigger a geofence associated with the hotel room door to allow entry into the hotel room for the user who's device shows it has paid for the hotel room already as part of an autopayment that happened when the user entered the hotel lobby.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method to facilitate a transaction, comprising:
receiving, at a network-connected transaction server, a request to transfer one or more transaction items involving a first user account on the transaction server, wherein the transaction server is configured to receive requests from a plurality of user types corresponding to a plurality of transaction types, wherein the transaction items include money, money equivalents, loyalty credits, products, services, and content;
selecting a delivery instrument from one or more available delivery instruments associated with the first user account on the transaction server;
authorizing, by the transaction server, the request based at least upon a unique identifier including a unique transaction identifier associated with the request, a unique user device identifier associated with a user access device, and a unique user identifier, wherein the unique transaction identifier and the unique user device identifier provide a character sequence that represents a device fingerprint, information regarding the transaction items and, wherein the unique identifier includes analytics data encoding information on the user's purchase and payment behavior based on past performance, and wherein the unique user identifier has embedded logic configured to cause the unique user identifier to evolve over time based on its security level, so that the unique user identifier becomes more trusted as the user executes more transactions;
validating the transaction using embedded context in the character sequence of the unique identifier; and
transferring a quantity of the one or more transaction items into or out of the selected delivery instrument, wherein the quantity is determined at least based upon the authorized request, wherein the selected delivery instrument are repositories or accounts associated with respective users, merchants, financial or retail institutions, organizations, content providers, or direct users.

2. The method of claim 1, wherein the unique transaction identifier includes an identification of a geographic location associated with the transaction.

3. The method of claim 1, wherein the authorizing the request comprises:
determining a geographic location associated with the unique user device identifier;
comparing the determined geographic location associated with the unique user device identifier with a geographic region associated with the transaction included in the unique transaction identifier; and
permitting the transaction based upon the comparing.

4. The method in claim 3, wherein the authorizing the request further comprises:
writing a transaction record in a log file, wherein the transaction record associates the unique transaction identifier, the associated user identifier, and the associated user device identifier.

5. The method of claim 1, wherein the selecting a delivery instrument comprises:
selecting a financial instrument from the one or more available delivery instruments enrolled in the transaction server and associated with the first user account.

6. The method of claim 5, wherein the one or more available delivery instruments enrolled in the transaction server include a plurality of different financial and non-financial instrument types.

7. The method of claim 5, wherein the selecting is based upon the unique transaction identifier.

8. The method of claim 5 wherein the one or more available delivery instruments enrolled in the transaction server includes at least a money account and a merchant loyalty points account.

9. The method of claim 5, wherein the one or more available delivery instruments enrolled in the transaction server includes at least a money account and a content account associated with a content repository.

10. The method of claim 1, wherein the transferring comprises:
transferring a money amount and at least one of a money amount equivalent or content into or out of the first user account.

11. The method of claim 1, wherein the transferring comprises:
accessing a stored profile associated with the first user account; and
determining the quantity of the one or more transaction items based upon the accessed stored profile.

12. The method of claim 1, wherein the transferring comprises:
transferring the quantity of the one or more transaction items from the first user account to a third-party user using a programming-interface published by the third-party user.

13. The method of claim 12, wherein the third-party user does not have an associated delivery instrument enrolled in the transaction server.

14. The method of claim 1, further comprising:
determining a donation associated with the request, wherein the donation is in addition to the quantity of the one or more transaction items transferred to a second user; and
transferring the donation from the first user account to a third user.

15. The method of claim 14, wherein the donation and the third user are determined based upon the unique transaction identifier.

16. The method of claim 1, further comprising:
detecting a presence of the user access device within at least one of a geographically defined area or a virtual area associated with a second user;
determining a first user associated with the user access device and the first user account;
accessing merchant information associated with the second user to determine one or more available transaction choices;
pushing the one or more available transaction choices to the user access device;
receiving a selection of at least one of the available transaction choices from the first user, wherein the selection is communicated from the user access device to the transaction server; and
communicating the selection to a device associated with the second user.

17. The method of claim 16, wherein the pushed one or more transaction choices include an option to make a donation, and wherein the received selection includes a donation amount, and the method further comprising:
transferring the donation amount from the first user account to a third user.

18. The method of claim 16, further comprising:
selecting, interactively with the first user, suggested transaction choices from merchants in proximity to the geographically defined area or the virtual area, wherein the pushed one or more transaction choices include the selected suggested transaction choices.

19. The method of claim 16, wherein accessing merchant information associated with the second user comprises:
determining the one or more transaction choices based upon the merchant information associated with the second user and profile information of the first user.

20. The method of claim 16, wherein the merchant information is updated in real-time in response to ongoing merchant operations.

21. The method of claim 1, the method further comprising:
transferring content into or out of a second user account associated with the first user on the transaction server in response to the request.

22. The method of claim 21, wherein the transferring content into or out of a second user account comprises:
transferring the content out of a second user account associated with the first user and into a storage location accessible by a second user.

23. The method of claim 21, wherein the transferring content into or out of a second user account comprises:
transferring the content out of a second user account associated with the first user and into a storage location seen as local to the second user device, but logically associated with a storage location accessible by second user device.

24. The method of claim 1, wherein the transaction server provides a merchant exchange which enables the transaction server to communicate with a plurality of merchant types and their associated delivery instruments within the transaction.

25. The method of claim 1, wherein transferring further comprises transferring the quantity of the one or more transaction items between the selected delivery instrument and a second user account on the transaction server.

26. The method of claim 1, wherein the device fingerprint includes a global hash.

27. The method of claim 1, wherein the device fingerprint includes a legacy network number.

28. A system for facilitating a transaction, comprising:
at least one processor;
a network-connected transaction server configured to execute on the at least one processor and further configured to:
receiving, at a network-connected transaction server, a request to transfer one or more transaction items involving a first user account on the transaction server, wherein the transaction server is configured to receive requests from a plurality of user types corresponding to a plurality of transaction types, wherein the transaction items include money, money equivalents, loyalty credits, products, services, and content;
selecting a delivery instrument from one or more available delivery instruments associated with the first user account on the transaction server;
authorizing, by the transaction server, the request based at least upon a unique identifier including a unique transaction identifier associated with the request, a unique user device identifier associated with a user access device, and a unique user identifier, wherein the unique transaction identifier and the unique user device identifier provide a character sequence that represents a device fingerprint, information regarding the transaction items and, wherein the unique identifier includes analytics data encoding information on the user's purchase and payment behavior based on past performance, and wherein the unique user identifier has embedded logic configured to cause the unique user identifier to evolve over time based on its security level, so that the unique user identifier becomes more trusted as the user executes more transactions;
validating the transaction using embedded context in the character sequence of the unique identifier; and
transferring a quantity of the one or more transaction items into or out of the selected delivery instrument, wherein the quantity is determined at least based upon the authorized request, wherein the selected delivery instrument are repositories or accounts associated with respective users, merchants, financial or retail institutions, organizations, content providers, or direct users.

29. The system of claim 28, further comprising:
a unique identifier registry communicatively coupled to the transaction server and configured to generate the unique transaction identifier.

30. The system of claim 28, further comprising:
a merchant exchange communicatively coupled to the transaction server and configured to transfer a money amount or a money equivalent from the first user account to an account of a third-party using a software interface published by the third-party, wherein the account of the third-party is not registered on the transaction server.

31. The system of claim 28, further comprising:
at least one user access device configured to:
detect its presence within a geographically or virtually defined area associated with a second user; and notify the transaction server regarding the detection.

32. The system of claim 28, further comprising:
at least one user access device configured to:
display a menu title and a plurality of menu options on a display of a mobile device, wherein the menu options are displayed as selectable areas arranged around the menu title;
receive a user input selecting one of the menu options;
determine a second menu title based upon the user input; and
display the second menu title and a plurality of second menu options on the display, wherein the second menu options are displayed as selectable areas arranged around the second menu title.

33. The system of claim 28 further comprising:
at least one user access device configured to:
displaying one or more objects on a display, wherein each of the objects represent a transaction choice;
displaying an input area on the display;
receiving a user input, wherein the user input places at least one of the one or more objects in the displayed input area;
responsive to the user input, starting one or more processes to process the respective transaction choices corresponding to the at least one of the one or more objects placed in the displayed input area; and
displaying a result on the display upon completion of at least one of the one or more processes.

34. A non-transitory computer readable storage medium storing instructions that, when executed by a processor, causes the processor to perform a method to facilitate a transaction, comprising;
receiving, at a network-connected transaction server, a request to transfer one or more transaction items involving a first user account on the transaction server, wherein the transaction server is configured to receive requests from a plurality of user types corresponding to a plurality of transaction types, wherein the transaction items include money, money equivalents, loyalty credits, products, services, and content;

selecting a delivery instrument from one or more available delivery instruments associated with the first user account on the transaction server;

authorizing, by the transaction server, the request based at least upon a unique identifier including a unique transaction identifier associated with the request, a unique user device identifier associated with a user access device, and a unique user identifier, wherein the unique transaction identifier and the unique user device identifier provide a character sequence that represents a device fingerprint, information regarding the transaction items and, wherein the unique identifier includes analytics data encoding information on the user's purchase and payment behavior based on past performance, and wherein the unique user identifier has embedded logic configured to cause the unique user identifier to evolve over time based on its security level, so that the unique user identifier becomes more trusted as the user executes more transactions;

validating the transaction using embedded context in the character sequence of the unique identifier; and transferring a quantity of the one or more transaction items into or out of the selected delivery instrument, wherein the quantity is determined at least based upon the authorized request, wherein the selected delivery instrument are repositories or accounts associated with respective users, merchants, financial or retail institutions, organizations, content providers, or direct users.

* * * * *